(12) United States Patent
McGrane et al.

(10) Patent No.: US 12,207,672 B2
(45) Date of Patent: Jan. 28, 2025

(54) COMPOUNDS THAT MODULATE GPR92 RECEPTOR ACTIVITY AND PET FOOD PRODUCTS CONTAINING THE SAME

(71) Applicant: MARS, INCORPORATED, McLean, VA (US)

(72) Inventors: Scott Joseph McGrane, Leicestershire (GB); Matthew Ronald Gibbs, Leicestershire (GB); Carlos Juan Hernangomez de Alvaro, Leicestershire (GB); Jerry Wallace Skiles, Oradell, NJ (US)

(73) Assignee: MARS, INCORPORATED, McLean, VA (US)

( * ) Notice: Subject to any disclaimer, the term of this patent is extended or adjusted under 35 U.S.C. 154(b) by 901 days.

(21) Appl. No.: 17/273,782

(22) PCT Filed: Sep. 6, 2019

(86) PCT No.: PCT/US2019/050091
§ 371 (c)(1),
(2) Date: Mar. 5, 2021

(87) PCT Pub. No.: WO2020/051551
PCT Pub. Date: Mar. 12, 2020

(65) Prior Publication Data
US 2021/0315244 A1  Oct. 14, 2021

Related U.S. Application Data

(60) Provisional application No. 62/728,229, filed on Sep. 7, 2018.

(51) Int. Cl.
*A23L 27/20* (2016.01)
*A23K 20/105* (2016.01)
(Continued)

(52) U.S. Cl.
CPC .......... *A23L 27/202* (2016.08); *A23K 20/105* (2016.05); *A23K 50/42* (2016.05); *A23K 50/48* (2016.05); *A23L 27/88* (2016.08)

(58) Field of Classification Search
CPC ....... A23L 27/202; A23L 27/88; A23K 50/42; A23K 50/48; A23K 20/105
See application file for complete search history.

(56) References Cited

U.S. PATENT DOCUMENTS

| | | |
|---|---|---|
| 2,887,387 A | 5/1959 | Rusoff |
| 5,186,964 A | 2/1993 | Gierhart et al. |

(Continued)

FOREIGN PATENT DOCUMENTS

| | | |
|---|---|---|
| EP | 0075463 A3 | 9/1984 |
| EP | 0750849 A1 | 1/1997 |

(Continued)

OTHER PUBLICATIONS

Geraldo, Role of lysophosphatidic acid and it receptor in health and disease, Signal Transduction and Targeted Therapy, 2021, 6 (45), pp. 1-18 (Year: 2021).*

(Continued)

*Primary Examiner* — Changqing Li
(74) *Attorney, Agent, or Firm* — Baker Botts L.L.P.

(57) ABSTRACT

A flavor composition comprising at least one compound that modulates, increases and/or enhances the activity of a GPR92 receptor that can be used to enhance palatability of pet food products is described herein. Also disclosed herein are methods for identifying said compounds.

10 Claims, 34 Drawing Sheets

Specification includes a Sequence Listing.

(51) Int. Cl.
   *A23K 50/42* (2016.01)
   *A23K 50/48* (2016.01)
   *A23L 27/00* (2016.01)

(56) References Cited

U.S. PATENT DOCUMENTS

| | | | |
|---|---|---|---|
| 5,480,877 A * | 1/1996 | Mosher, Jr. | A61K 31/661 514/134 |
| 2003/0017528 A1 | 1/2003 | Chen et al. | |
| 2009/0274684 A1 | 11/2009 | Griffin et al. | |
| 2010/0266691 A1 * | 10/2010 | Karin | A61P 19/08 514/8.1 |
| 2011/0269851 A1 * | 11/2011 | Bortlik | A23F 3/40 426/442 |
| 2012/0276563 A1 | 11/2012 | Wieland | |
| 2013/0247233 A1 | 9/2013 | Gaitanaris et al. | |
| 2014/0234486 A1 * | 8/2014 | De Ratuld | A23K 50/42 426/56 |

FOREIGN PATENT DOCUMENTS

| | | |
|---|---|---|
| FR | 2 831 769 B1 | 7/2004 |
| JP | H 0614711 A | 1/1994 |
| JP | 2006-513702 A | 4/2006 |
| JP | 2013-512664 A | 4/2013 |
| RU | 95105523 A1 | 3/1997 |
| RU | 2 558 537 C2 | 8/2015 |
| RU | 2 577 409 C2 | 3/2016 |
| WO | WO 2004/040000 A2 | 5/2004 |
| WO | WO 2005/119263 A2 | 12/2005 |
| WO | WO 2006/003877 A1 | 1/2006 |
| WO | WO 2006/040534 A2 | 4/2006 |
| WO | WO 2011/067202 A1 | 6/2011 |
| WO | WO 2012/028243 A1 | 3/2012 |
| WO | WO 2014/199114 A1 | 12/2014 |
| WO | WO 2017/181008 A1 | 10/2017 |

OTHER PUBLICATIONS

Altschul et al., "Basic Local Alignment Search Tool," J. Mol. Biol. 215:403-410 (1990).
Altschul et al., "Gapped BLAST and PSI-BLAST: a new generation of protein database search programs," Nucleic Acids Res. 25(17):3389-3402 (1997).
Berman et al., "The Protein Data Bank," Nucleic Acids Research 28(1):235-242 (2000).
Bystrova et al., "Functional expression of the extracellular-Ca2+-sensing receptor in mouse taste cells," Journal of Cell Science, vol. 123, Issue 6, pp. 972-982, Mar. 2010.
Cartoni et al., "Taste Preference for Fatty Acids Is Mediated by GPR40 and GPR120," J. Neurosci., 30(25):8376-8382 (2010).
Choi et al., "GPR93 activation by protein hydrolysate induces CCK transcription and se-cretion in STC-1 cells," Am. J. Physiol. Gastrointest. Liver Physiol., 292:G1366-G1375 (2007).
Choi et al., "Identification of a protein hydrolysate responsive G protein-coupled receptor in enterocytes," Am. J. Physiol. Gastrointest. Liver Physiol., 292:G98-G112 (2007).
Clemmensen et al., "The GPCR, class C, group 6, subtype A (GPRCA6A) receptor: from cloning to physiological function," British Journal of Pharmacology, Mar. 2014, 171(S):1129-1141.
Cline, "Perspectives for Gene Therapy: Inserting New Genetic Information into Mammalian Cells by Physical Techniques and Viral Vectors," Pharmac. Ther. 29:69-92 (1985).
Cohen et al., "Receptor-Mediated Transport of DNA into Eukaryotic Cells," Meth. En-zymol. 217:618-644 (1993).
Cunningham et al., "High-Resolution Epitope Mapping of hGH-Receptor Interactions by Alanine-Scanning Mutagenesis," Science 244:1081-1085 (1989).
Eswar et al., "Comparative Protein Structure Modeling Using Modeller," Curr Protoc Bio-informatics (Supplement 15):5.6.1-5.6.30, 30 pages (2006).
Faure et al., "Molecular determinants of non-competitive antagonist binding to the mouse GPRC6A receptor," Cell Calcium, vol. 46, Issues 5-6, Nov.-Dec. 2009, pp. 323-332 (Abstract only).
Haid et al., "Gustatory sensory cells express a receptor responsive to protein breakdown products (GPR92)," Histochem. Cell Biol., 140:137-145 (2013).
International Search Report mailed Dec. 9, 2019 in International Application No. PCT/US2019/050091 (7 pgs.).
International Search Report mailed Jul. 5, 2017 in International Application No. PCT/US2017/027626 (4 pgs.).
Karlin et al., "Applications and statistics for multiple high-scoring segments in molecular sequences," Proc. Natl. Acad. Sci. USA 90:5873-5877 (1993).
Karlin et al., "Methods for assessing the statistical significance of molecular sequence fea-tures by using general scoring schemes," Proc. Natl. Acad. Sci. USA 87:2264-2268 (1990).
Lee et al., "Structural insights into ligand recognition and selectivity for class A, B, and C GPCRs," Eur J Pharmacol. Sep. 15, 2015;763(Pt B): 196-205. Epub May 14, 2015.
Li et al., "The sequence and de novo assembly of the giant panda genome," Nature, 463(7279):311-317 (2010).
Loeffler et al., "Gene Transfer into Primary and Established Mammalian Cell Lines with Lipopolyamine-Coated DNA," Meth. Enzymol. 217:599-618 (1993).
Oh et al., "Identification of Farnesyl Pyrophosphate and N-Arachidonylglycine as Endogenous Ligands for GPR92," Journal of Biological Chemistry, 283(30):21054-21064 (2008).
Pearson et al., "Improved tools for biological sequence compari-son," Proc. Natl. Acad. Sci. USA 85:2444-2448 (1988).
Pontius et al., "Initial sequence and comparative analysis of the cat genome," Genome Research, 17(11):1675-1689 (2007).
Torelli et al., "ADVANCE and ADAM: two algorithms for the analysis of global similari-ty between homologous informational sequences," CABIOS 10(1):3-5 (1994).
Wellendorph et al., "Deorphanization of GPRC6A: A Promiscuous I-α-Amino Acid Receptor with Preference for Basic Amino Acids," Molecular Pharmacology Mar. 2005, 67(3):589-597 (Abstract Only).
Wellendorph et al., "Molecular basis for amino acid sensing by family C G -protein-coupled receptors," British Journal of Pharmacology, vol. 156, Issue 6, Mar. 2009, pg. 869-884.
Wellendorph et al., "Molecular cloning, expression, and sequence analysis of GPRC6A, a novel family G-protein coupled receptor," Gene, vol. 335, Jun. 23, 2004, pp. 37-46 (Abstract only).
Wellendorph et al., "The rat GPRC6A: Cloning and characteriza-tion," Gene, vol. 396, Issue 2, Jul. 15, 2007, pp. 257-267 (Abstract only).
Williams et al., "Unique Ligand Selectivity of the GPR92/LPA5 Lysophosphatidate Re-ceptor Indicates Role in Human Platelet Activation," The Journal of Biological Chemistry 284(25):17304-17319 (2009).
Yang et al., "The I-TASSER Suite: protein structure and function prediction," Nature Methods 12(1):7-8 (2015).

* cited by examiner

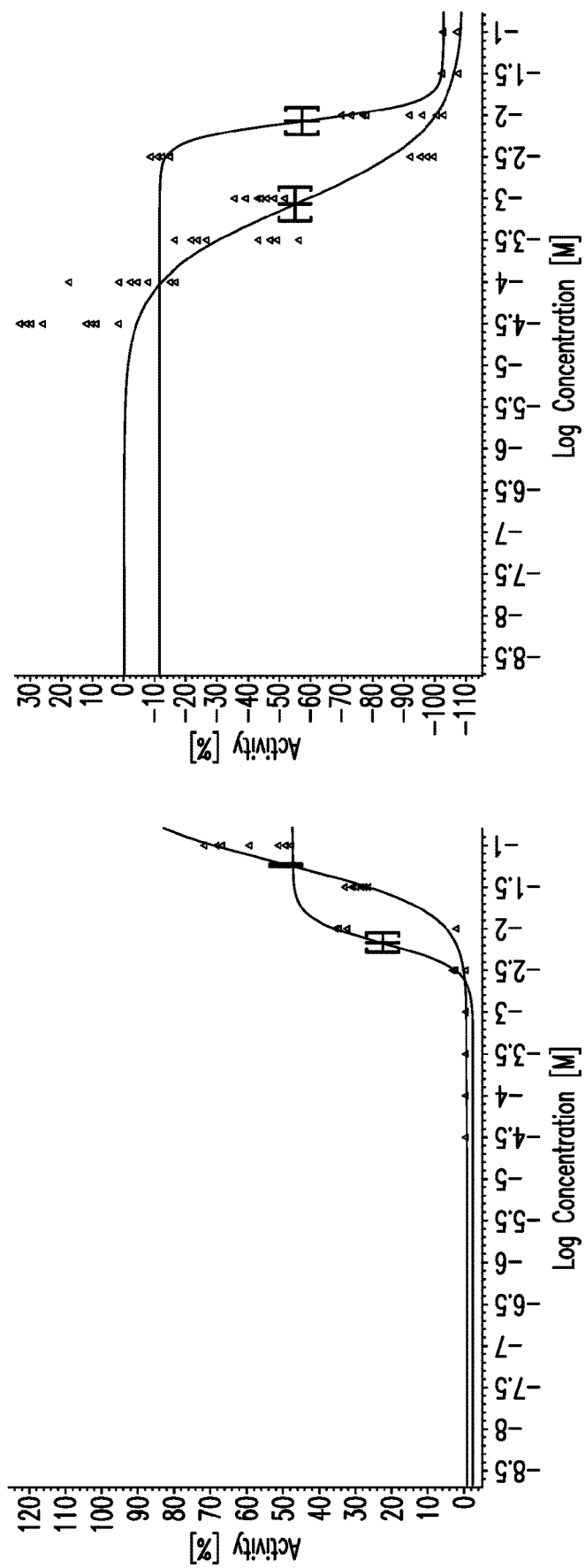

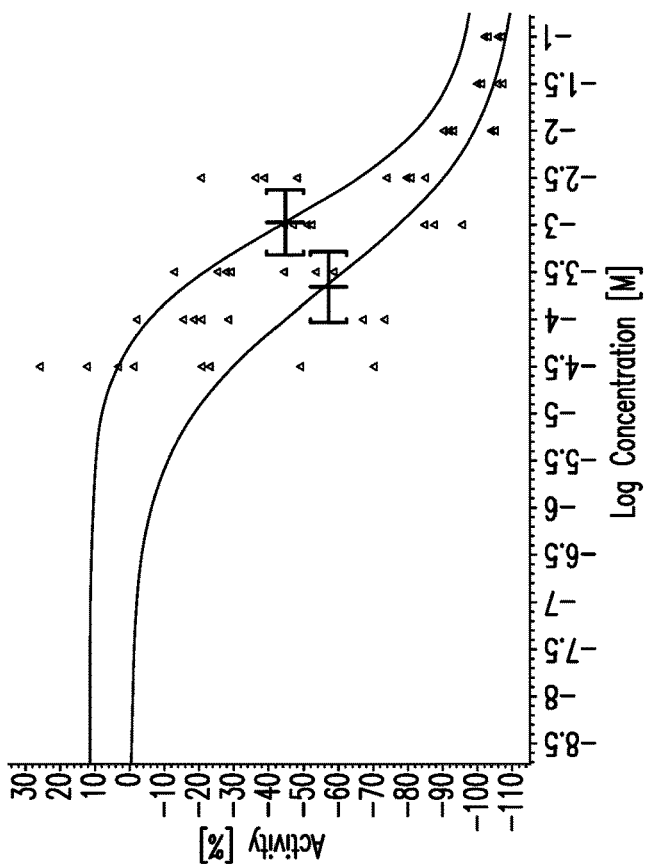
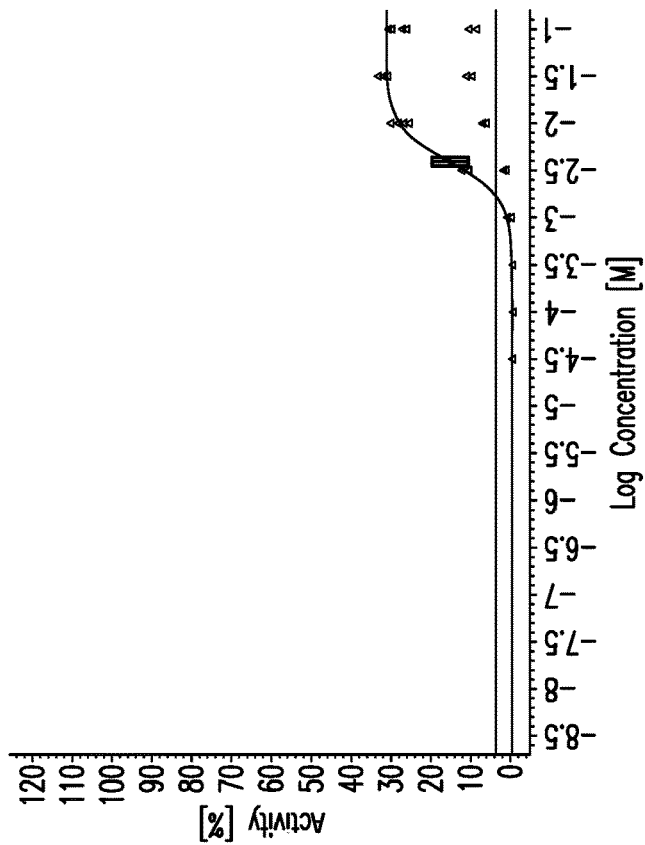
FIG. 2A
FIG. 2B
FIG. 2C
| fGPR92_AGO | | Mock AGO | | fGPR92_PAM | Mock_PAM |
|---|---|---|---|---|---|
| Signal % at Max. Conc. | EC50 (M) | Signal % at Max. Conc. | EC50 (M) | Signal % at Max. Conc. | Signal % at Max. Conc. |
| 30.1 | 0.00393 | 9.9 | N/A | -106.0 | -102.3 |

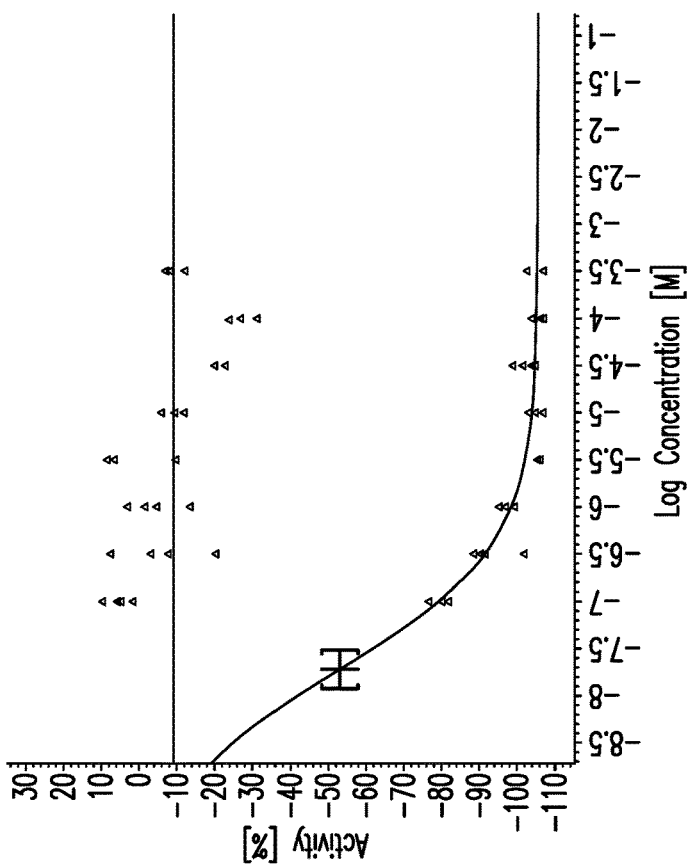
FIG. 3A
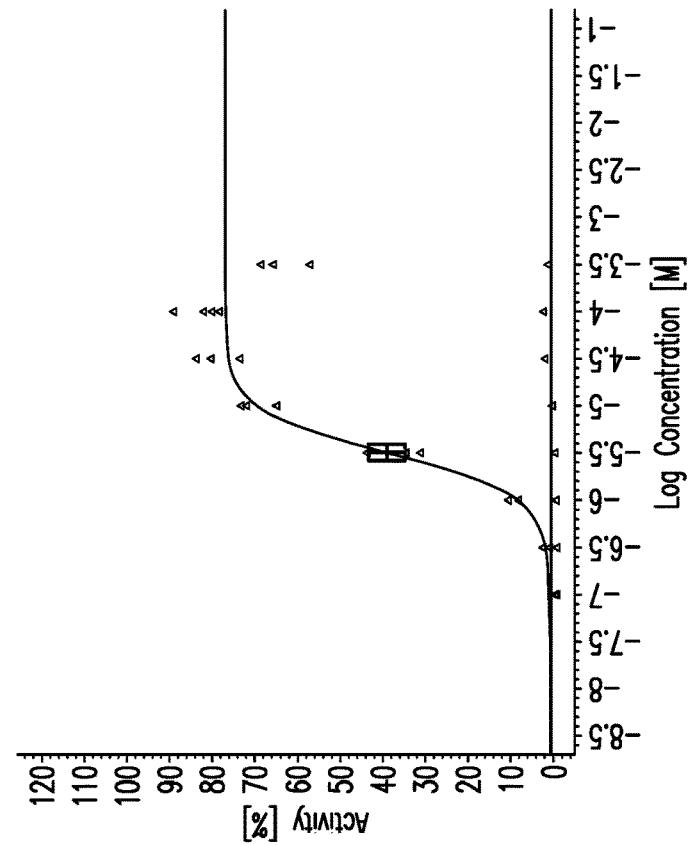
FIG. 3B
| fGPR92_AGO | | Mock AGO | | fGPR92_PAM | Mock_PAM |
|---|---|---|---|---|---|
| Signal % at Max. Conc. | EC50 (M) | Signal % at Max. Conc. | EC50 (M) | Signal % at Max. Conc. | Signal % at Max. Conc. |
| 66.1 | 3.2E-06 | 1.2 | N/A | -106.3 | -7.9 |
FIG. 3C

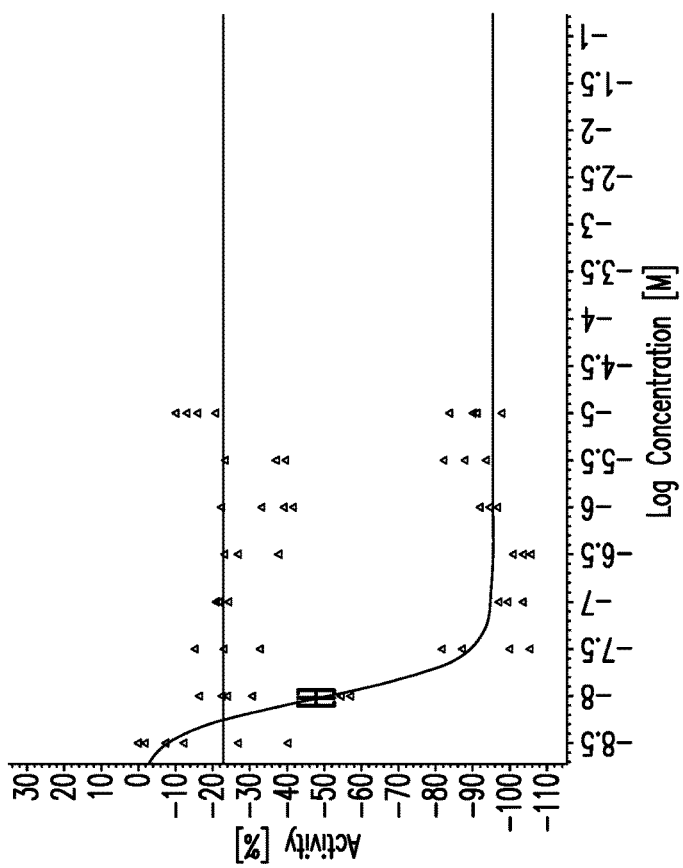
FIG. 4A
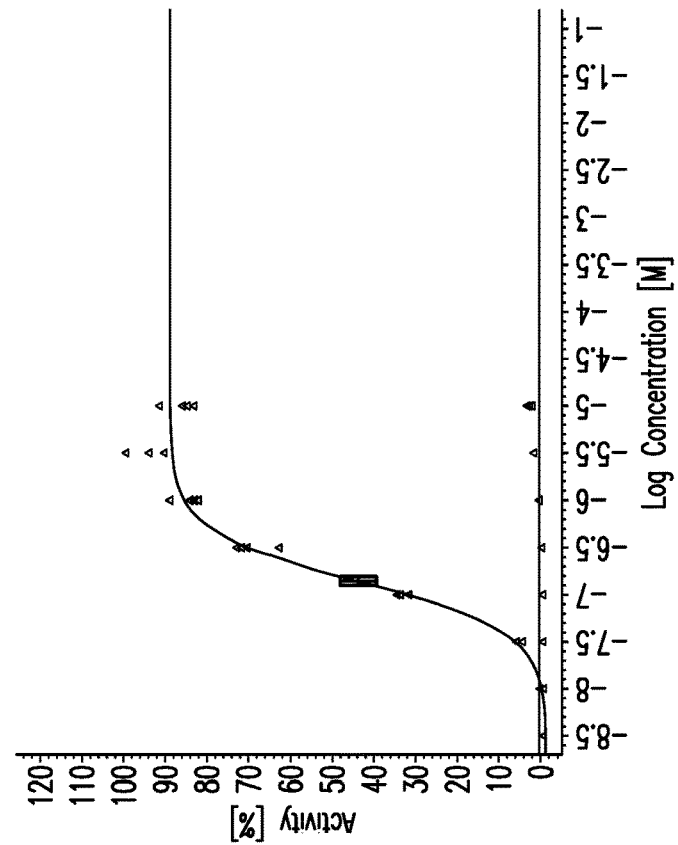
FIG. 4B
| fGPR92_AGO | | Mock AGO | | fGPR92_PAM | Mock_PAM |
|---|---|---|---|---|---|
| Signal % at Max. Conc. | EC50 (M) | Signal % at Max. Conc. | EC50 (M) | Signal % at Max. Conc. | Signal % at Max. Conc. |
| 66.5 | 3.06E-07 | 0.6 | N/A | -105.3 | 8.9 |
FIG. 4C

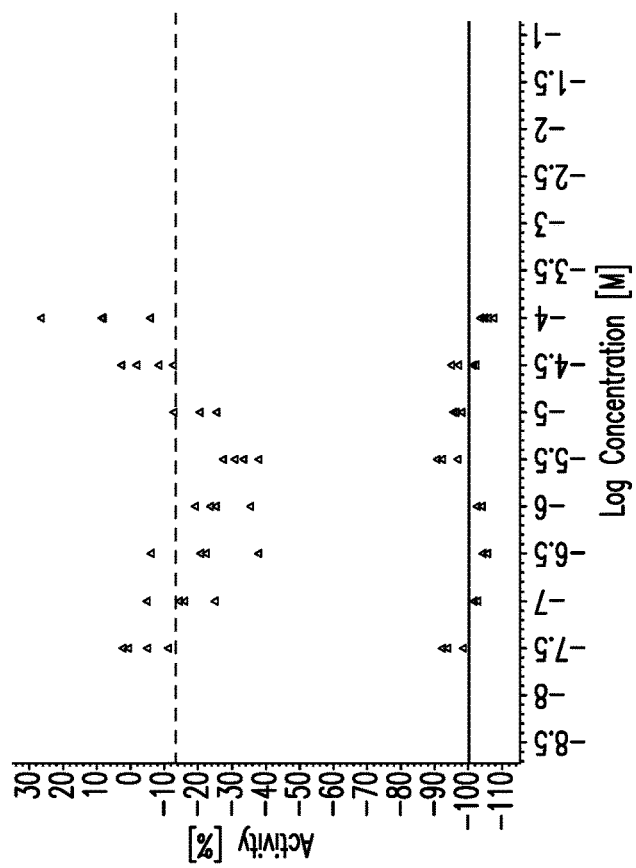
FIG. 5A
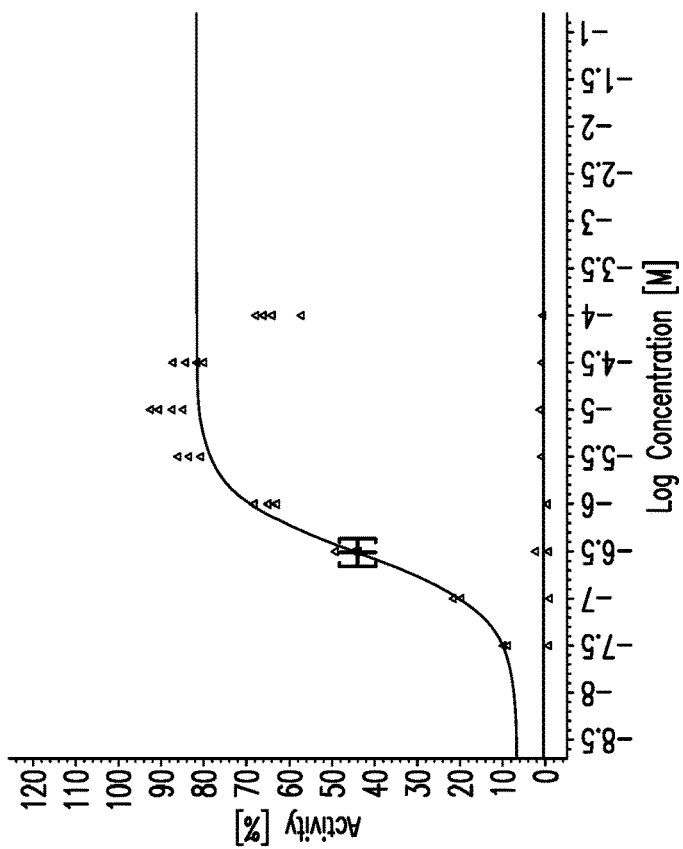
FIG. 5B
| fGPR92_AGO | | Mock AGO | | fGPR92_PAM | Mock_PAM |
|---|---|---|---|---|---|
| Signal % at Max. Conc. | EC50 (M) | Signal % at Max. Conc. | EC50 (M) | Signal % at Max. Conc. | Signal % at Max. Conc. |
| 85.5 | 1.37E-07 | 3.1 | N/A | -90.2 | -15.5 |
FIG. 5C

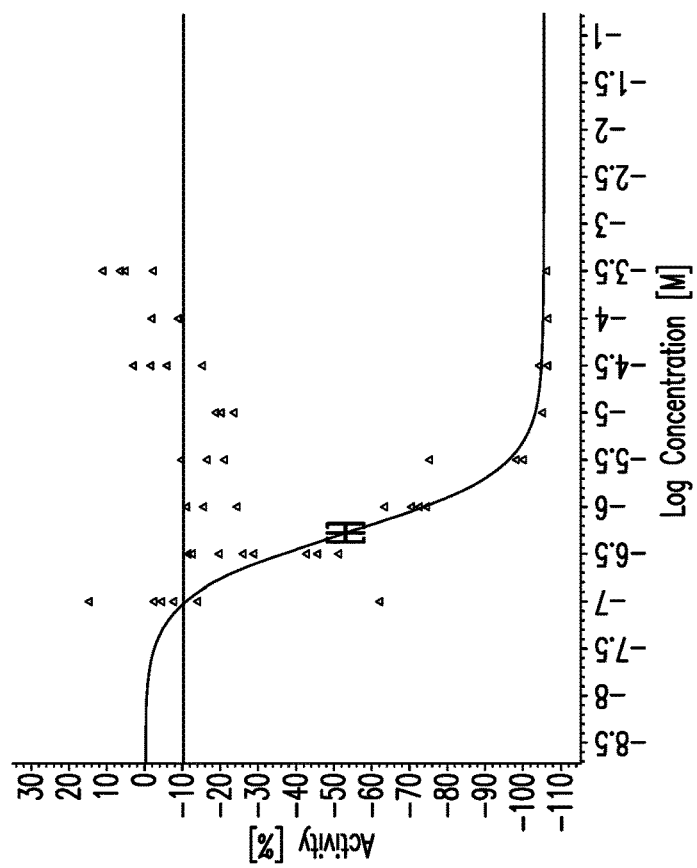
FIG. 6A
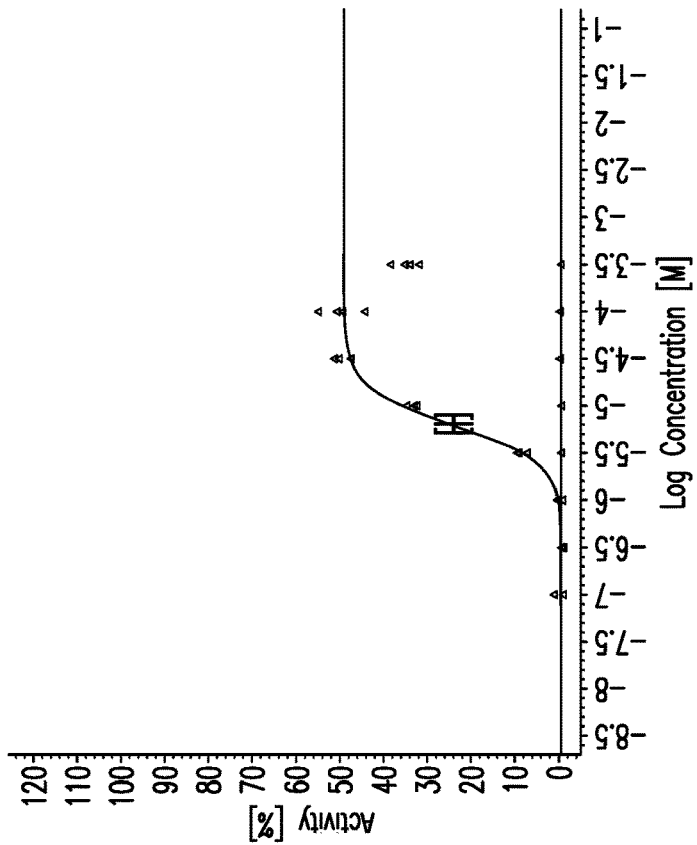
FIG. 6B
| fGPR92_AGO | | Mock AGO | |
|---|---|---|---|
| Signal % at Max. Conc. | EC50 (M) | Signal % at Max. Conc. | EC50 (M) |
| 34.4 | 6.3E-06 | -0.2 | N/A |
| fGPR92_PAM | | Mock_PAM | |
|---|---|---|---|
| Signal % at Max. Conc. | | Signal % at Max. Conc. | |
| -106.1 | | 6.5 | |
FIG. 6C

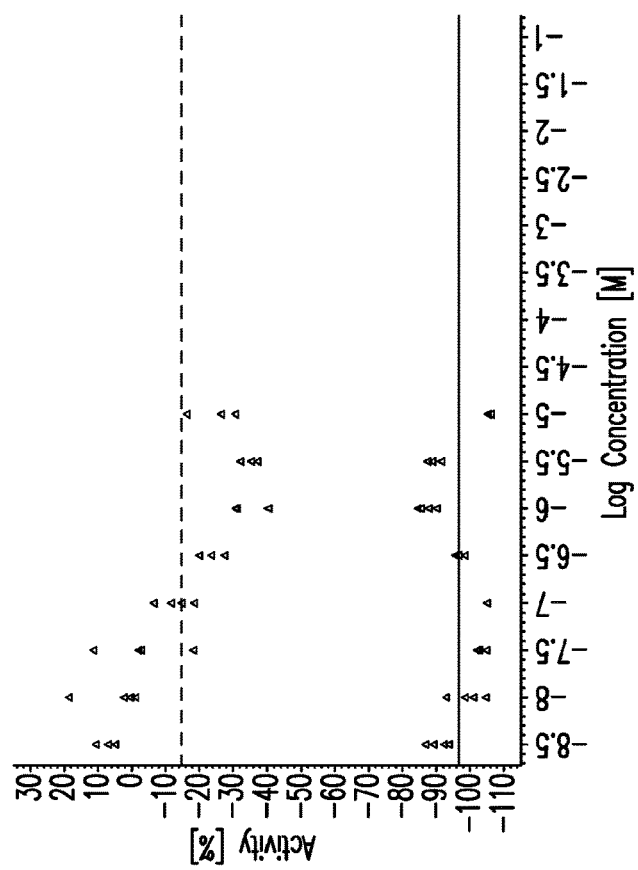
FIG. 7A
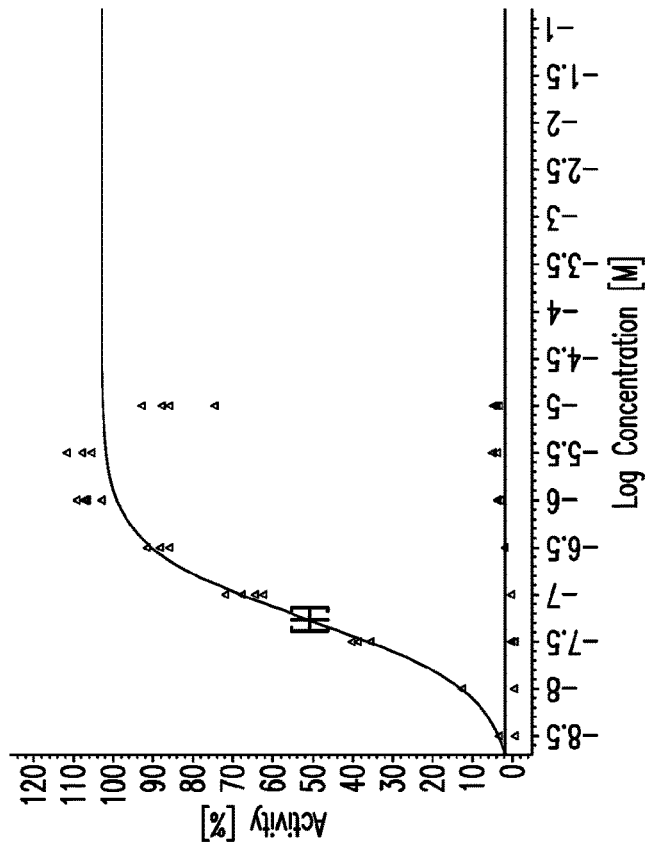
FIG. 7B
| fGPR92_AGO | | Mock AGO | | fGPR92_PAM | Mock_PAM |
|---|---|---|---|---|---|
| Signal % at Max. Conc. | EC50 (M) | Signal % at Max. Conc. | EC50 (M) | Signal % at Max. Conc. | Signal % at Max. Conc. |
| 88.0 | 5.33E-08 | 4.1 | N/A | -105.4 | -126.5 |
FIG. 7C

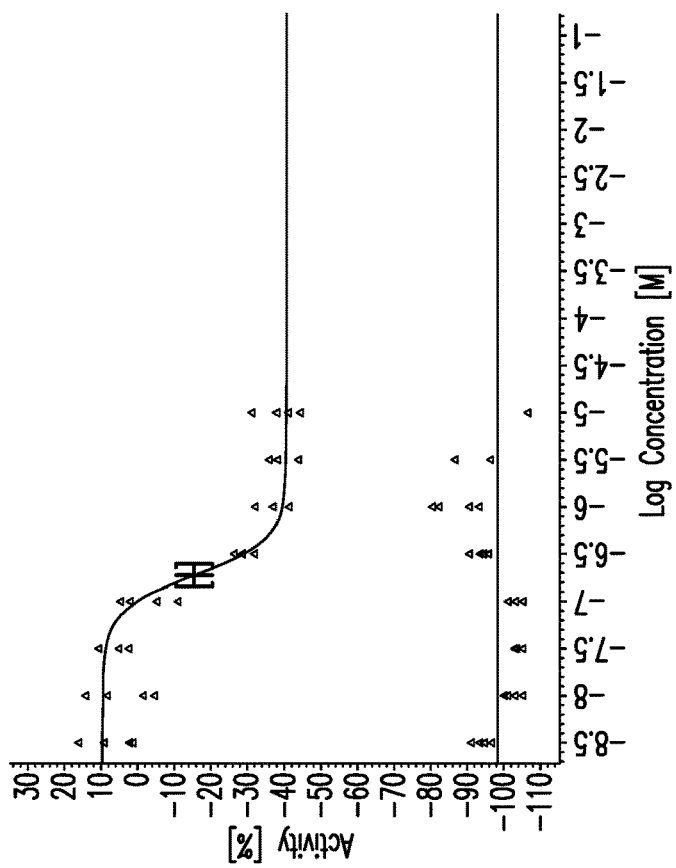
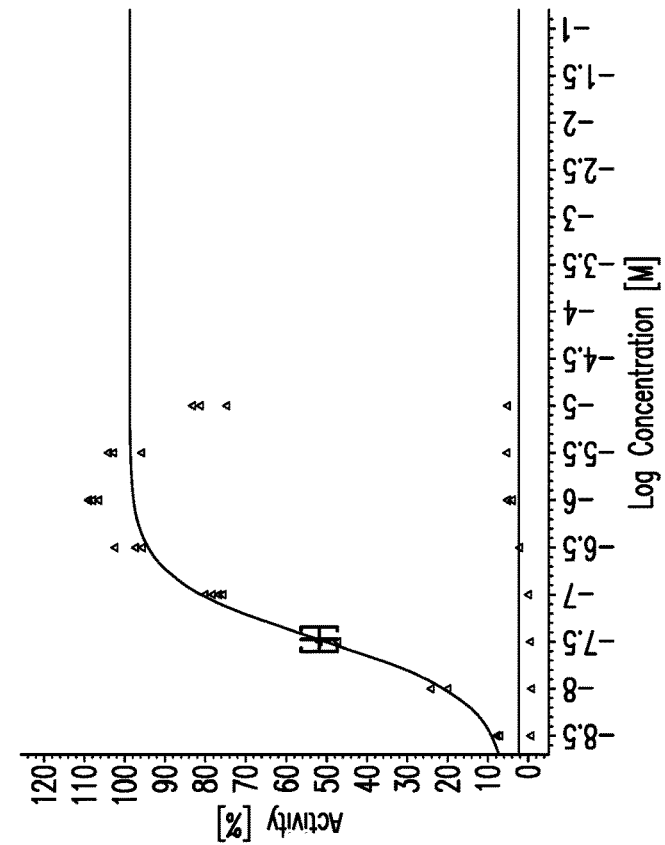
FIG. 8A
FIG. 8B
FIG. 8C
| fGPR92_AGO | | Mock AGO | | fGPR92_PAM | Mock_PAM |
|---|---|---|---|---|---|
| Signal % at Max. Conc. | EC50 (M) | Signal % at Max. Conc. | EC50 (M) | Signal % at Max. Conc. | Signal % at Max. Conc. |
| 81.9 | 3.34E-08 | 5.3 | N/A | -106.0 | -39.1 |

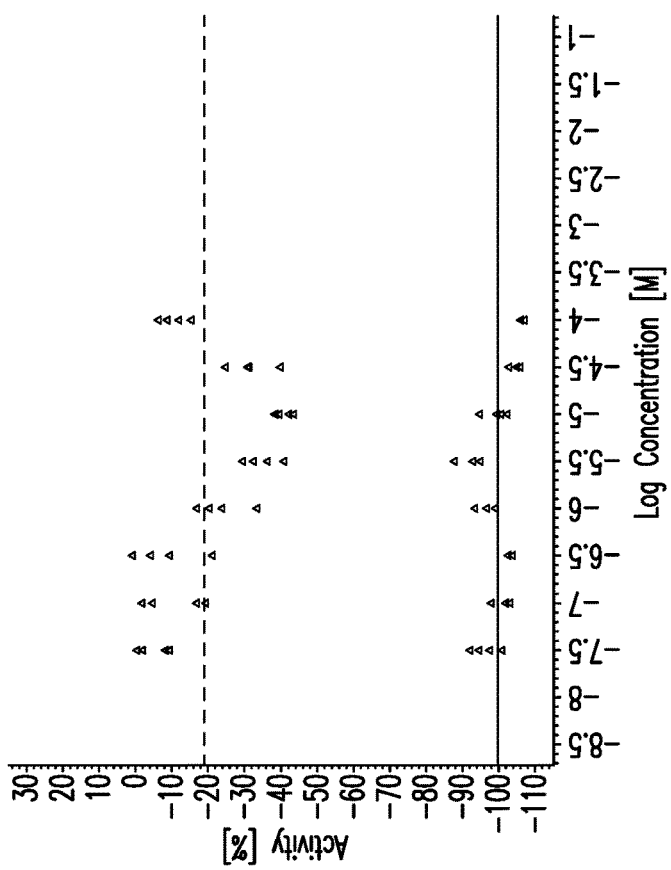
FIG. 9A
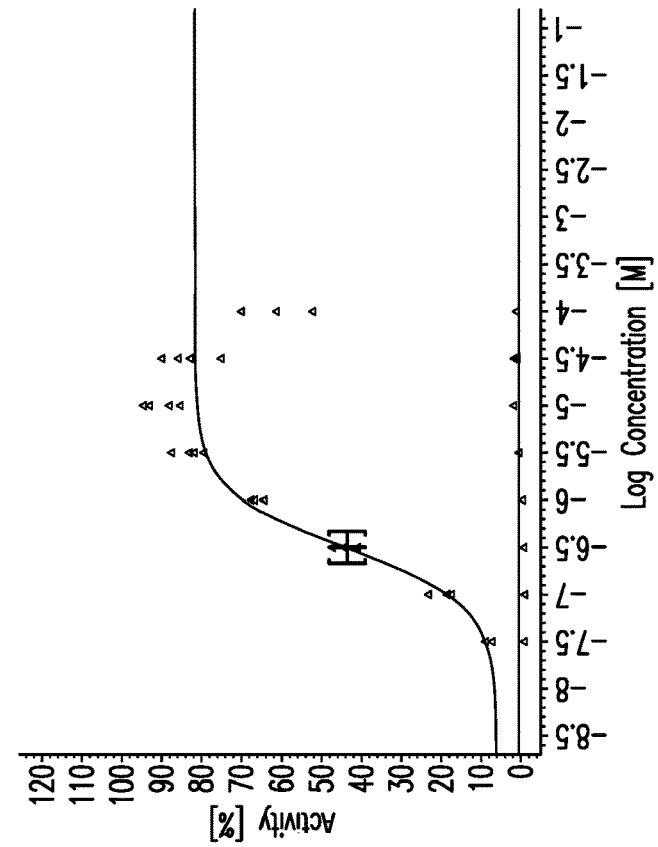
FIG. 9B
| fGPR92_AGO | | Mock AGO | | fGPR92_PAM | Mock_PAM |
|---|---|---|---|---|---|
| Signal % at Max. Conc. | EC50 (M) | Signal % at Max. Conc. | EC50 (M) | Signal % at Max. Conc. | Signal % at Max. Conc. |
| 61.6 | 3.1E-07 | 1.5 | N/A | -106.0 | -10.0 |
FIG. 9C

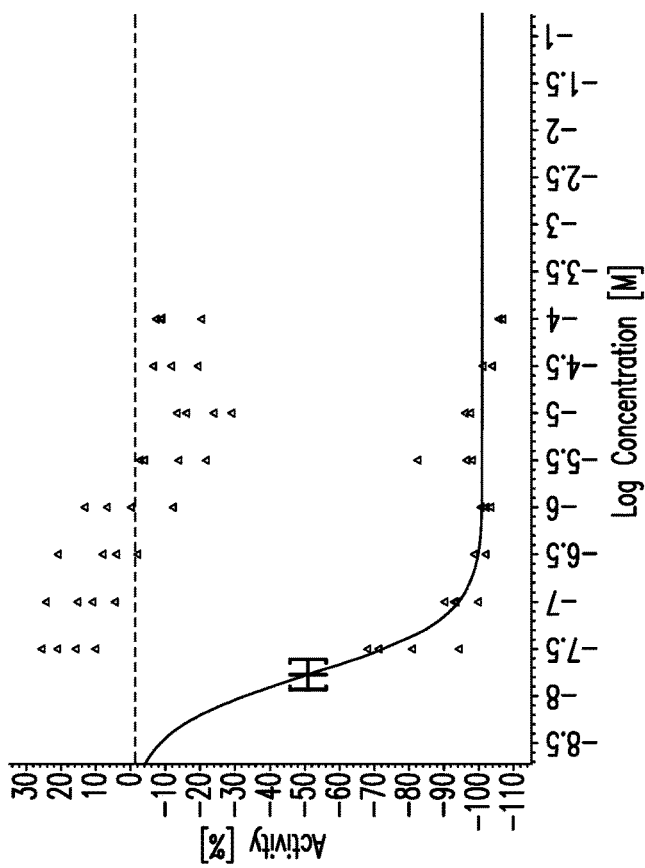
FIG. 10A
FIG. 10B
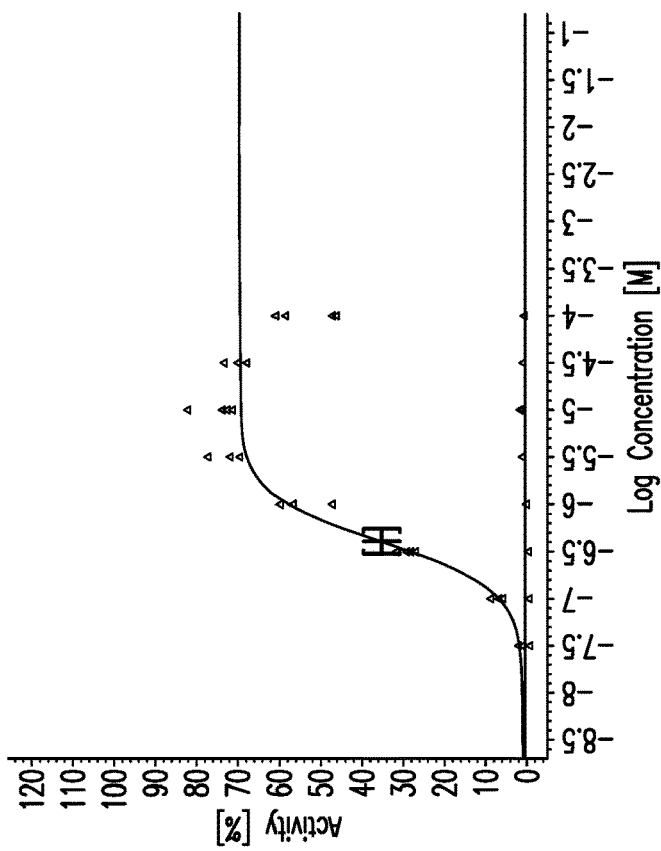
FIG. 10C
| fGPR92_AGO | | Mock AGO | |
|---|---|---|---|
| Signal % at Max. Conc. | EC50 (M) | Signal % at Max. Conc. | EC50 (M) |
| 58.7 | 4E-07 | 0.9 | N/A |
| fGPR92_PAM | Mock_PAM |
|---|---|
| Signal % at Max. Conc. | Signal % at Max. Conc. |
| -106.5 | -8.4 |

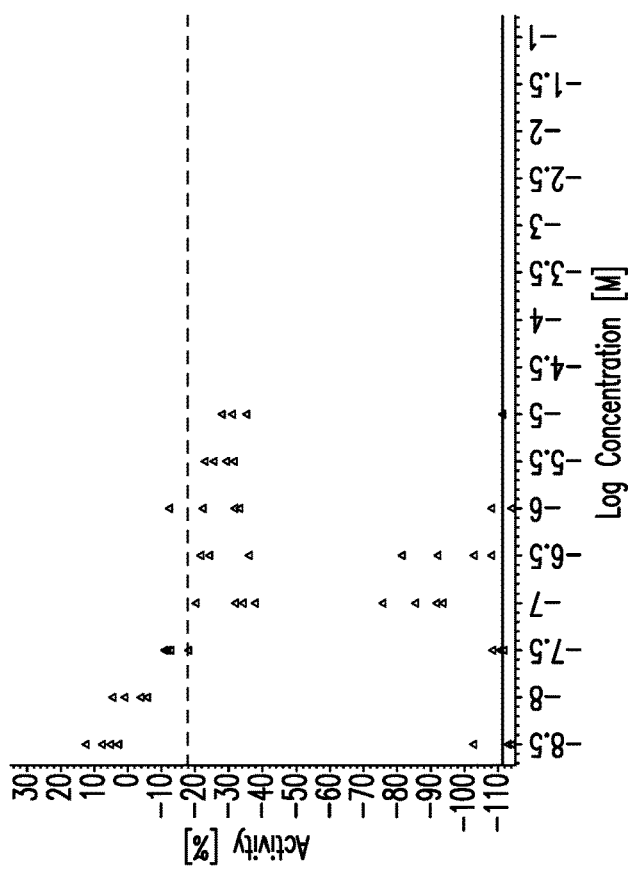
FIG. 11A
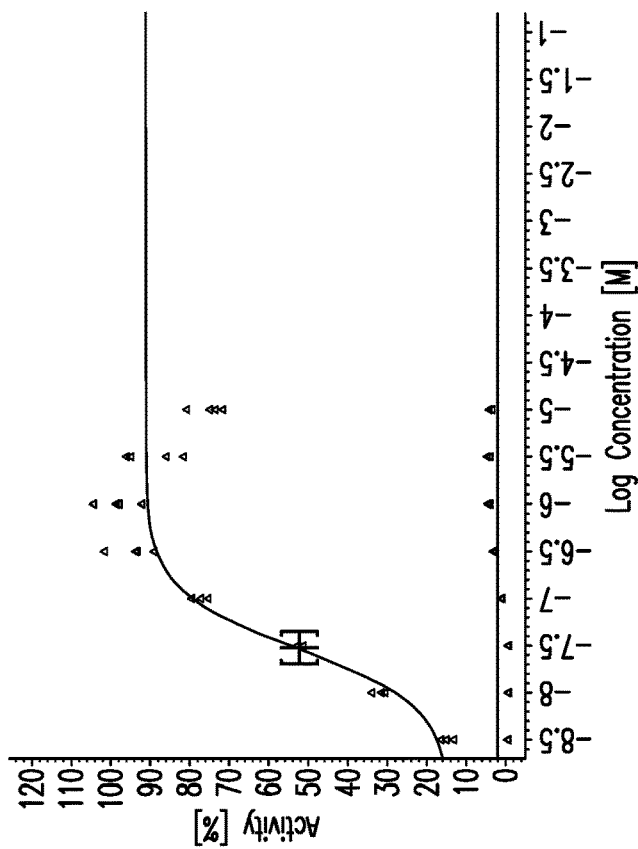
FIG. 11B
| fGPR92_AGO | Mock AGO | | |
|---|---|---|---|
| Signal % at Max. Conc. | EC50 (M) | Signal % at Max. Conc. | EC50 (M) |
| 75.1 | 2.9E-08 | 4.2 | N/A |
| fGPR92_PAM | Mock_PAM |
|---|---|
| Signal % at Max. Conc. | Signal % at Max. Conc. |
| -116.9 | -30.7 |
FIG. 11C

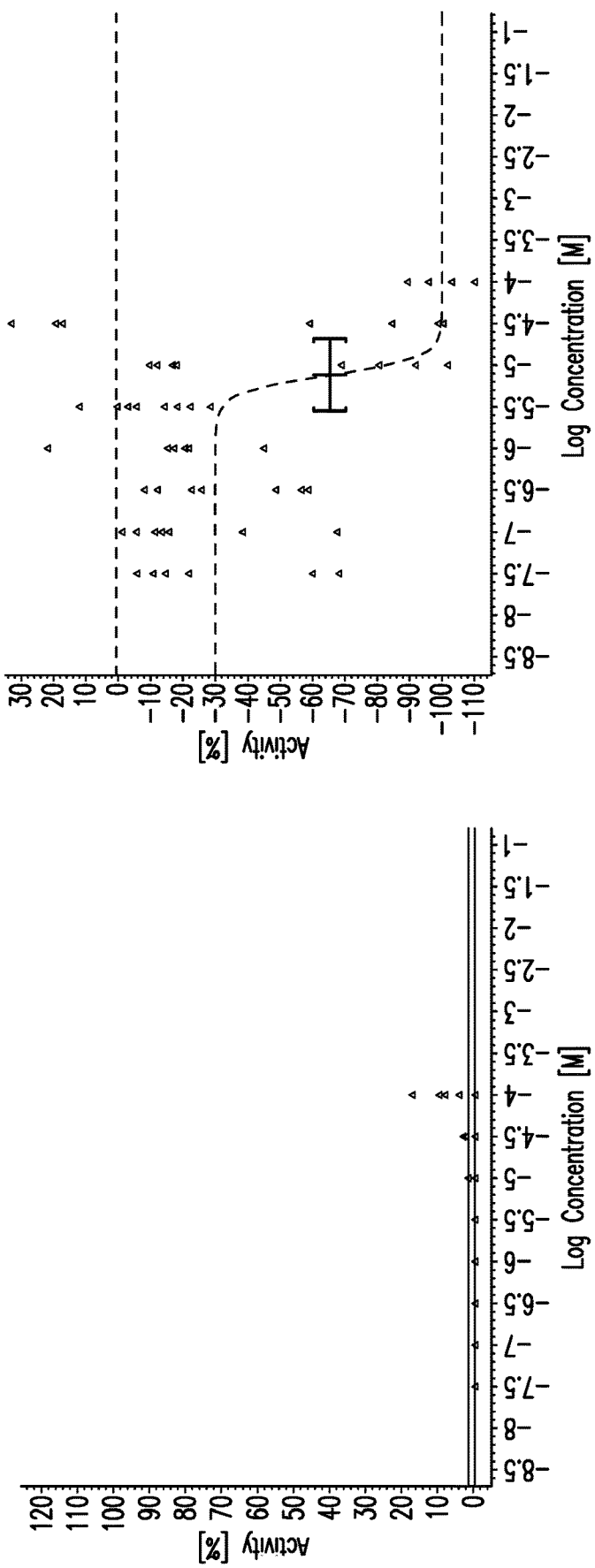

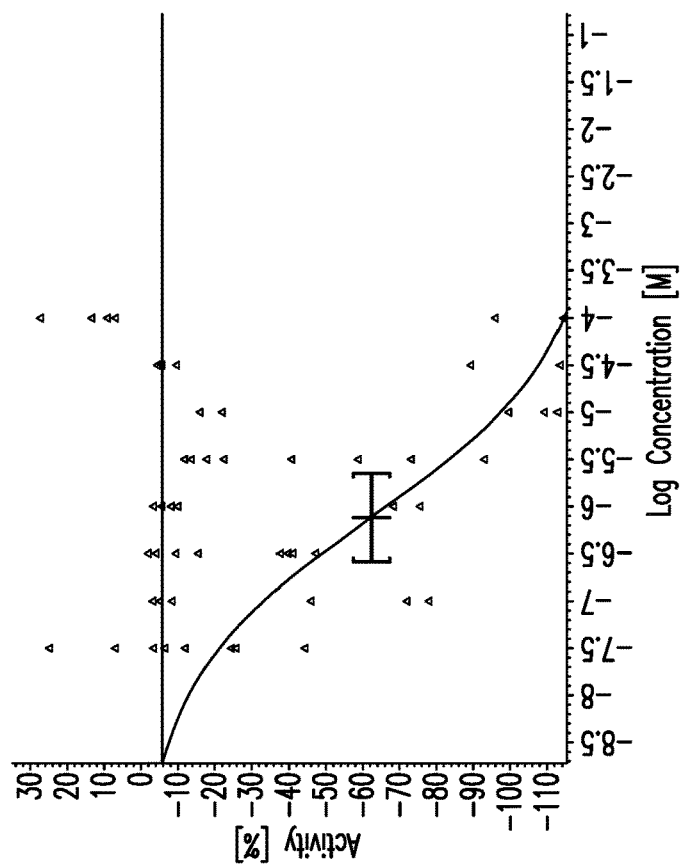
FIG. 13A
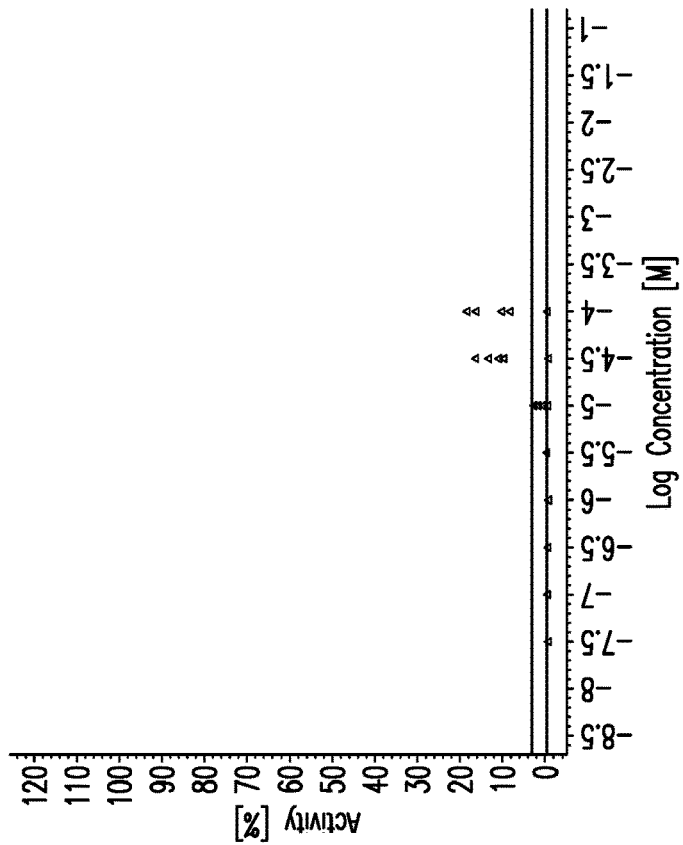
FIG. 13B
FIG. 13C
| fGPR92_AGO | | Mock AGO | | fGPR92_PAM | | Mock_PAM | |
|---|---|---|---|---|---|---|---|
| Signal % at Max. Conc. | EC50 (M) | Signal % at Max. Conc. | EC50 (M) | Signal % at Max. Conc. | | Signal % at Max. Conc. | |
| 13.5 | N/A | −0.5 | N/A | −113.8 | | 11.6 | |

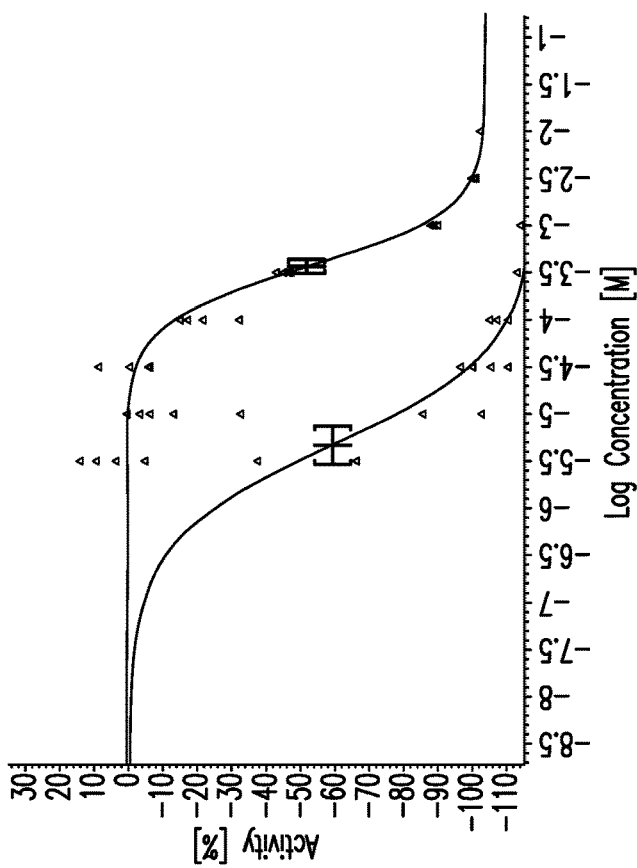
FIG. 14A
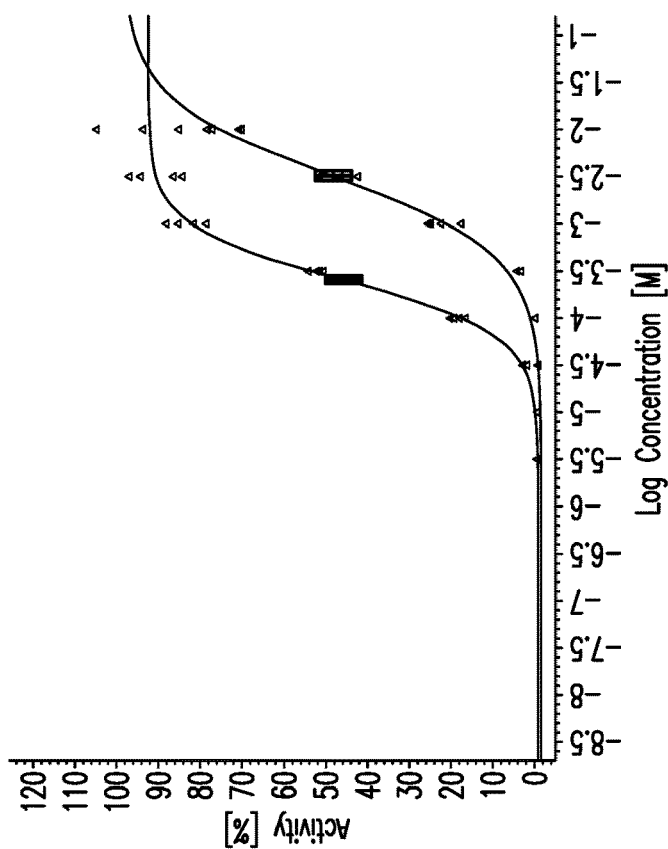
FIG. 14B
| fGPR92_AGO | | Mock AGO | | fGPR92_PAM | Mock_PAM |
|---|---|---|---|---|---|
| Signal % at Max. Conc. | EC50 (M) | Signal % at Max. Conc. | EC50 (M) | Signal % at Max. Conc. | Signal % at Max. Conc. |
| 93.6 | 2.5E-04 | 74.2 | 3.2E-03 | -117.4 | -101.9 |
FIG. 14C

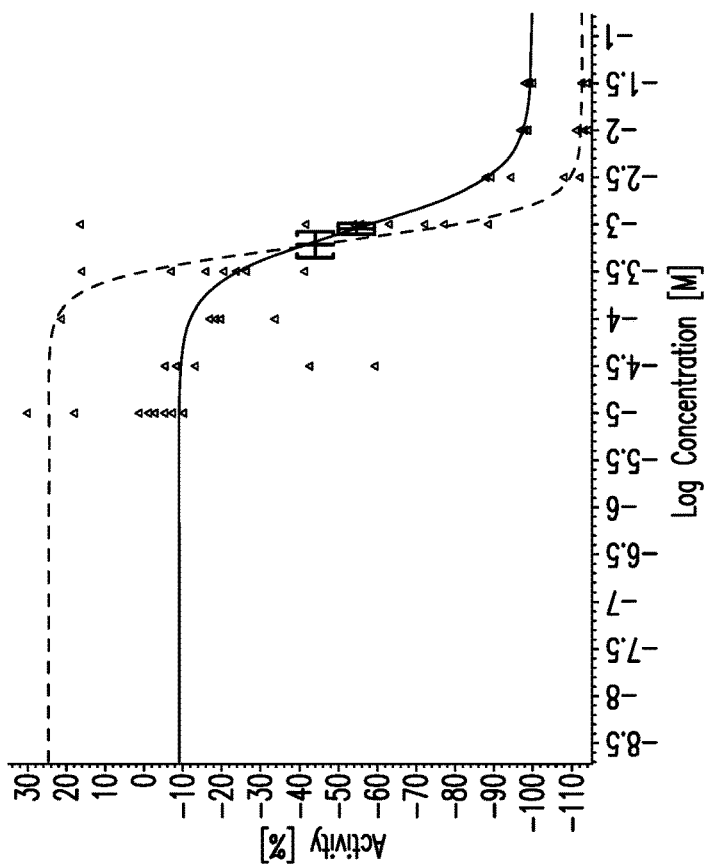
FIG. 15A
FIG. 15B
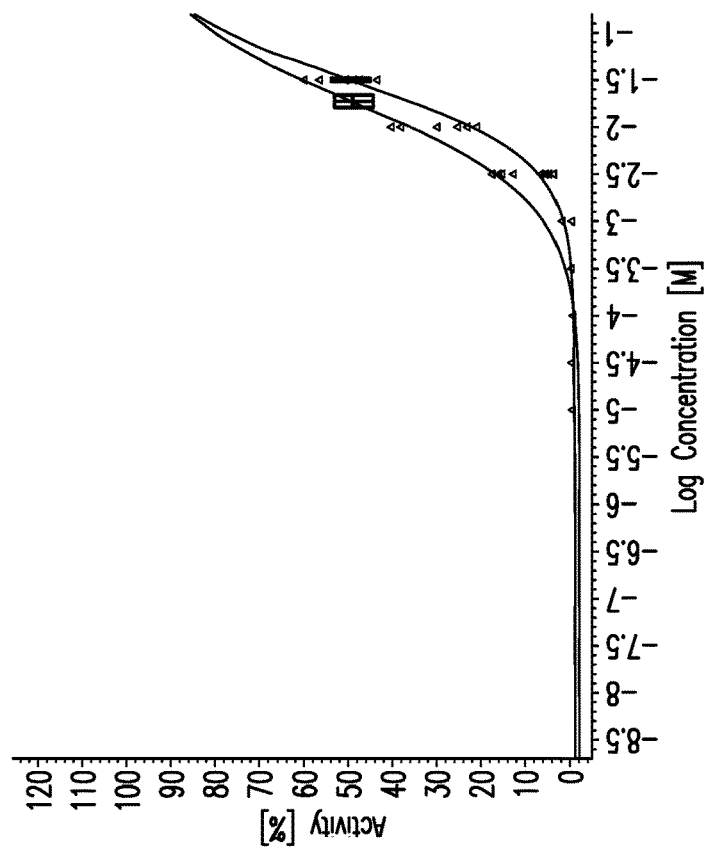
FIG. 15C
| fGPR92_AGO | | Mock AGO | | fGPR92_PAM | Mock_PAM |
|---|---|---|---|---|---|
| Signal % at Max. Conc. | EC50 (M) | Signal % at Max. Conc. | EC50 (M) | Signal % at Max. Conc. | Signal % at Max. Conc. |
| 56.6 | 1.8E-02 | 48.4 | 3.1E-02 | -114.5 | -98.5 |

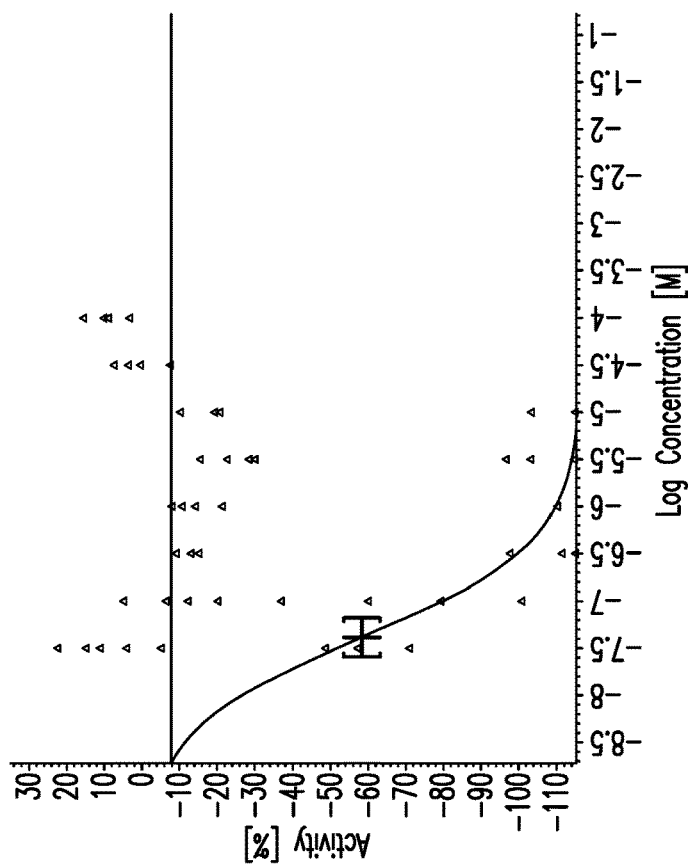
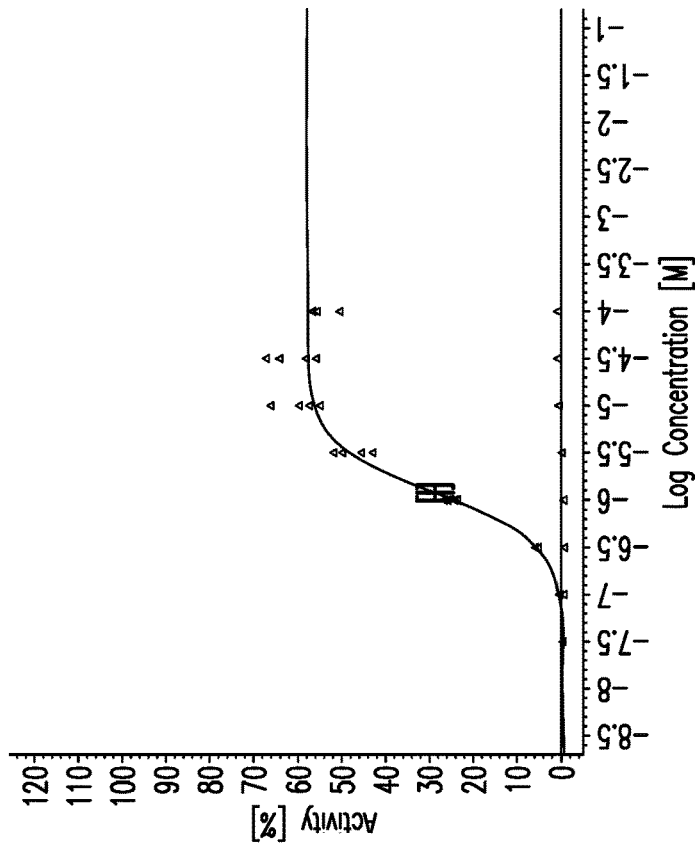
FIG. 16A
FIG. 16B
FIG. 16C
| fGPR92_AGO | | Mock AGO | | fGPR92_PAM | Mock_PAM |
|---|---|---|---|---|---|
| Signal % at Max. Conc. | EC50 (M) | Signal % at Max. Conc. | EC50 (M) | Signal % at Max. Conc. | Signal % at Max. Conc. |
| 53.4 | 1.2E-06 | 0.7 | N/A | -117.2 | 10.0 |

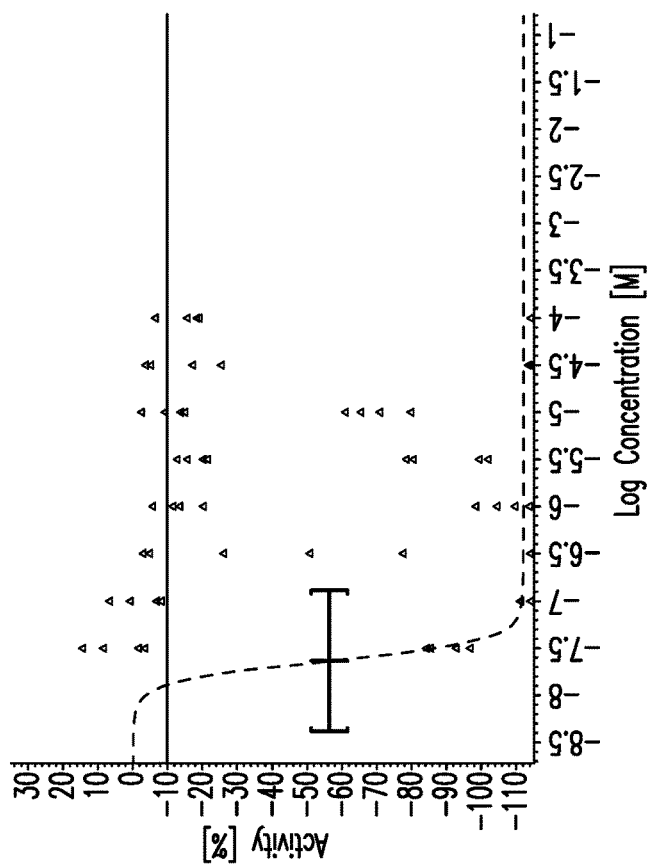
FIG. 17A
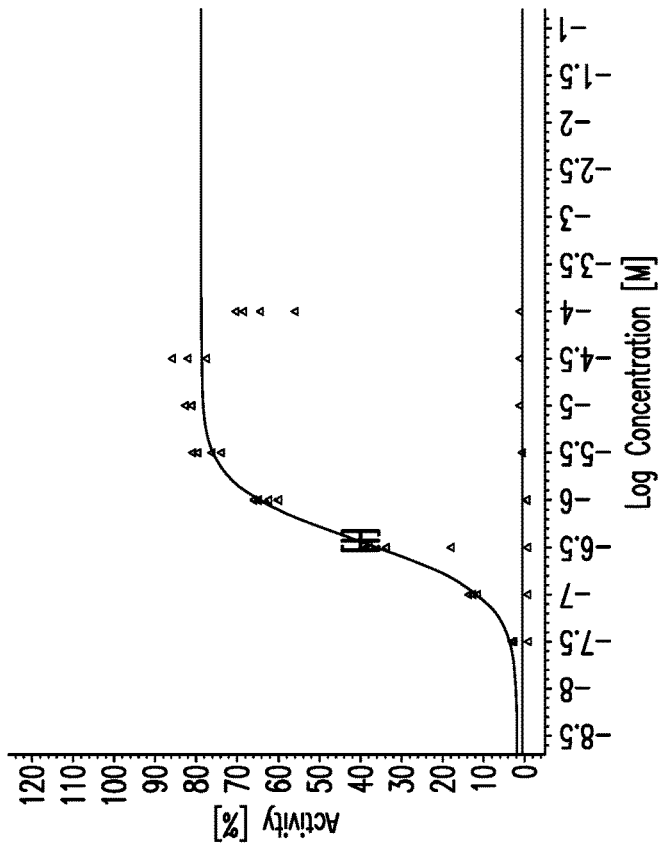
FIG. 17B
| fGPR92_AGO | | Mock AGO | | fGPR92_PAM | Mock_PAM |
|---|---|---|---|---|---|
| Signal % at Max. Conc. | EC50 (M) | Signal % at Max. Conc. | EC50 (M) | Signal % at Max. Conc. | Signal % at Max. Conc. |
| 34.4 | 6.3E-06 | -0.2 | N/A | -106.1 | 6.5 |
FIG. 17C

| fGPR92_AGO | | Mock AGO | | fGPR92_PAM | | Mock_PAM | |
|---|---|---|---|---|---|---|---|
| Signal % at Max. Conc. | EC50 (M) | Signal % at Max. Conc. | EC50 (M) | Signal % at Max. Conc. | EC50 (M) | Signal % at Max. Conc. | |
| 17.6 | 3.02E-05 | 0.03 | N/A | N/D | | N/D | |

| fGPR92_AGO | | Mock AGO | | fGPR92_PAM | | Mock_PAM |
|---|---|---|---|---|---|---|
| Signal % at Max. Conc. | EC50 (M) | Signal % at Max. Conc. | EC50 (M) | Signal % at Max. Conc. | Signal % at Max. Conc. | |
| 10.5 | 2.4E-06 | 0.5 | N/A | N/D | N/D | N/D |

| Compound ID | Max Test Conc (mM) | fGPR92_AGO Signal % at Max. Conc. | fGPR92_AGO EC50 (M) | Mock_AGO Signal % at Max. Conc. | Mock_AGO EC50 (M) |
|---|---|---|---|---|---|
| [LPA 14:0]; 14:0 Lyso PA ; myristoyl lysophosphatidic acid | 0.01 | 85.5 | 1.4E-07 | 3.1 | N/A |
| [LPA 18:2]; -(+)-sn-1-O-linoleoyl-glyceryl-3-phosphate (Linoleoyl LPA) Linoleoyl LPA | 0.01 | 88.0 | 5.3E-08 | 4.1 | N/A |
| [LPA 18:3]; D-(+)-sn-1-O-linolenoyl-glyceryl-3-phosphate | 0.01 | 81.9 | 3.3E-08 | 5.3 | N/A |
| alkyl-glycerol phosphate; AGP (16:0); Cayman Item №: 10010188 | 0.01 | 75.1 | 2.9E-08 | 4.2 | N/A |
| [LPA 16:0]; palmitoyl lysophosphatidic acid | 0.1 | 66.5 | 3.1E-07 | 0.6 | N/A |
| Octadecenyl phosphate: 9Z-Octadecenyl phosphate | 0.1 | 61.6 | 3.1E-07 | 1.5 | N/A |
| alkyl-glycerol phosphate; AGP (18:1); 18:1 Lyso PA 1-oleoyl-2-hydroxy-sn-glycero-3-phosphate | 0.1 | 58.7 | 4.0E-07 | 0.9 | N/A |
| L-Menthol | 0.1 | 8.7 | N/A | -0.4 | N/A |
| Cinnamic Aldehyde | 0.1 | 13.5 | N/A | -0.5 | N/A |
| 1-Octadecenyl Lysophosphatidic Acid | 0.1 | 53.4 | 1.2E-06 | 0.7 | N/A |
| 17:0 Lyso PA (17:0 LPA) | 0.1 | 68.7 | 3.6E-07 | 1.4 | N/A |
| 16:0 Lyso-PG 1-Palmitoyl-2-hydroxy-sn-glycero-3-phosphoglycerol | 0.1 | 66.1 | >0.0001 | 35.3 | >0.0001 |
| (R)-2-amino-3-((3-octylphenyl)amino)-3-oxopropyl dihydrogen phosphate (VPC 23019, Cayman) | 0.1 | 17.6 | 3.0E-05 | 0.0 | N/A |
| Sphingosine-1-Phosphate | 0.1 | 25.0 | >0.0001 | 0.2 | N/A |
| 20:4 LPA; D-(+)-sn-1-O-arachidonoyl-glyceryl-3-phosphate | 0.1 | 130.6 | 1.6E-05 | 9.3 | N/A |
| 1-Mercaptoundecylphosphoric acid | 0.1 | 79.6 | 8.7E-06 | 0.7 | N/A |
| Lysophosphatidic acid (LPA) [LPA C18:1] | 0.3 | 66.1 | 3.2E-06 | 1.2 | N/A |
| [LPA 18:0]; 18:0 Lyso PA; 1-stearoyl-2-hydroxy-sn-glycero-3-phosphate | 0.3 | 34.4 | 6.3E-06 | -0.2 | N/A |
| trans,trans-Farnesyl monophosphate | 0.3 | 10.5 | 2.4E-06 | 0.5 | N/A |
| Fish hydrolysate | 10 | 93.6 | 2.5E-04 | 74.2 | 3.2E-03 |
| GPR92 Peptone | 30 | 56.6 | 1.8E-02 | 48.4 | 3.1E-02 |
| Disodium pyrophosphate (Na2H2P2O7) | 100 | 50.5 | 6.7E-03 | 68.4 | 5.9E-02 |
| Sodium tripolyphosphate (Na5P3O10) | 100 | 30.1 | 3.9E-03 | 9.9 | N/A |

FIG. 24

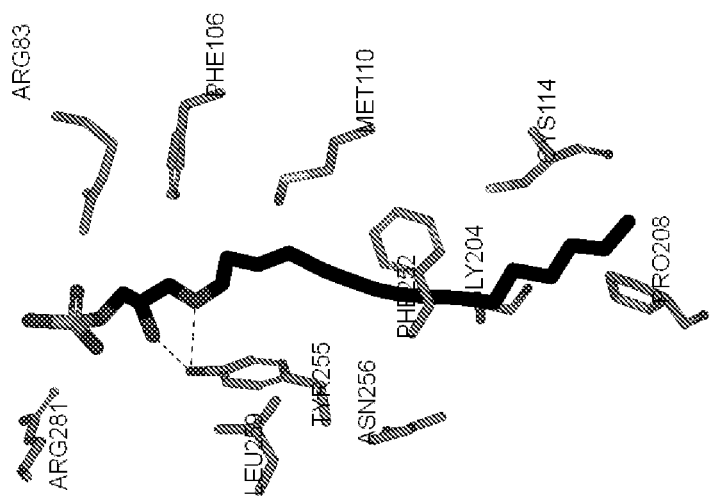
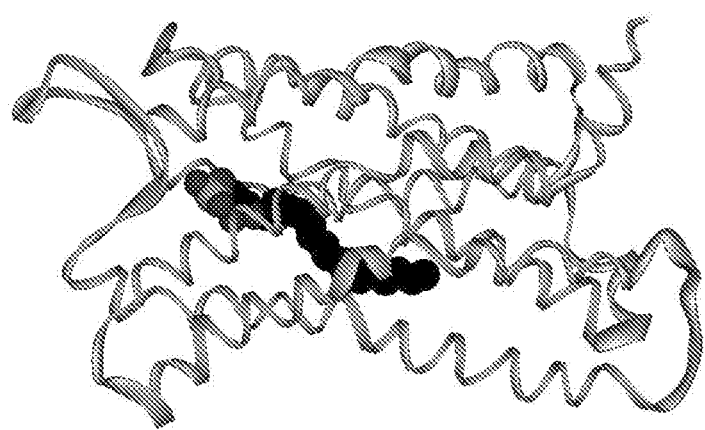
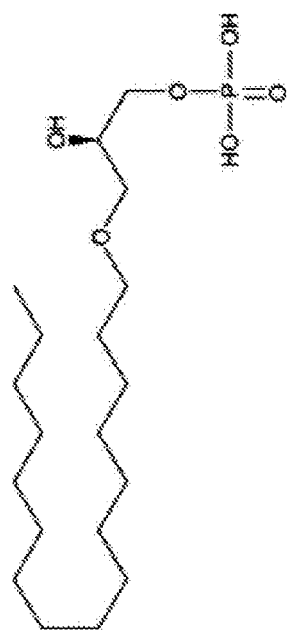
FIG. 29C
FIG. 29B
FIG. 29A

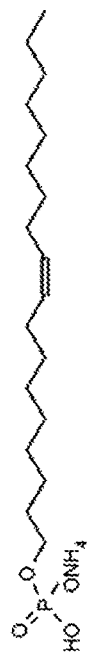
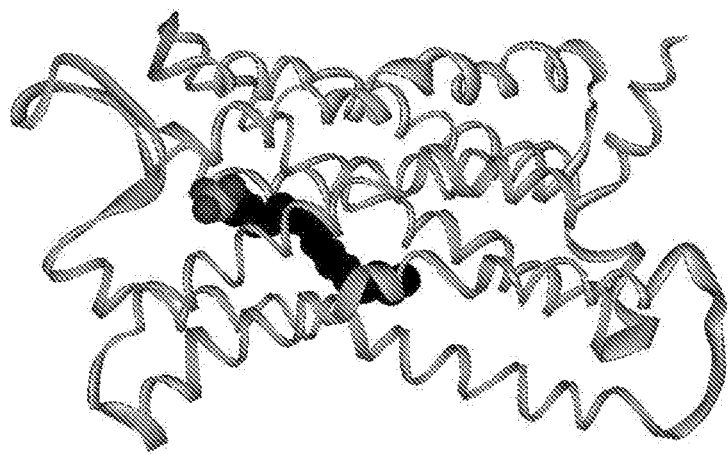
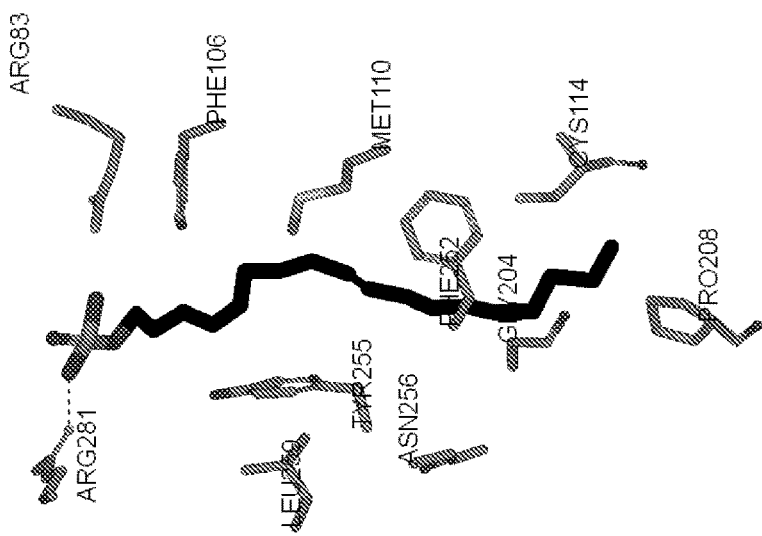
FIG. 30A
FIG. 30B
FIG. 30C

Feline GPR92 Nucleotide Sequence (SEQ ID NO: 1)

```
ATGTTGCCCAACTTCTACCAACAGTTCTGTTCCCCGTGCCCACCGCCTGCA
CATGGTGGCCTACAGCCTGGTGCTGCCGCAACGCGCTCCCCCTGGTCTTCCTGGCTGCGAGTGCACT
CGTCGTGAGCGTGTACATGTGCAACCTGCTCTTCACCCTGCTCTTCGCCGTGCCCATCTCCTACTACGCCCTG
CACTACTGGCCCTTCTCCGACCTCCGTGCCAGAACGGGCGGGCCGCGCTGCGCCGCCATCTGCAGCTGCATCTTCCTGACTCT
CATCAACGTGGACCGCTACGCGCTAGCCATCGTGCTGCCCGTGCCGGGCCGTGCCCCTCGTCCTGCAGCTACGGCCCTGCCTGG
GAGTGTGGGCGCGCTCATCCTCGTGTTCGCTGTGTCCTGTGCACAGGCCCTCGTCCTGCAGCTACGAGGCGCCAGGTGCGC
CTGTGCTTCGAGAGCTTCGGCGACAGGCTGTGGAAGGGCCAGCCGCGTGCTGCCCGTCGTGCTGGCCTTCCTGCTGCC
CCTGGTGCGGTCTCTGCTACTCGTCGGGCCGGTCTTTCTGCTCGTGTGCCTGTGCCCCGACAGCCCCAGCGGGTTACGGGCGCCGAAGACCG
TGCGCCTCCTGCGGCAACCTCGTCATCTTCCTGCGGATCCGGGGTTGCTGCCGCGGGGTCCTGCTGTTTGCCCGCCAACTGCCTGCT
AACCTGGCGGGCGAACAGCAAGGTCTGCAGCTTCAGCGCCGAGGCTGCACTCCAACACCCGGCTACCCGCCAACAGGACCTTGGCCA
AGACCCTGGTGTATTACTTCAGCGCGCTCGCCGAACAGCCCACTGAGACATCACGCTACCCCGGCTACCGCCAACAGGACCTTGGCCA
CCAACGGGGCTCAGGGGGCCGCTCGCCGAACACCCTCACCACCCCGGACTCGGCCCCTCAGG
CCCTCCAACGTGGGGACACCCTTAACCCAGCTCCCCGAGGACTCGGCCCCTCTGA
```

FIG. 31

Canine GPR92 Nucleotide Sequence (SEQ ID NO: 2)

ATGCTGACCGCCTCGGCCAACAGCTCCGTCCCCCATGCCCGACTACCGGGTCACCGCCTGCACATGGTGGCCTACAGCCTGGT
GCTGGCCGCGGGGCTCCCCCCTCAACGCGCTGGCCTGTCTTCCTGGCTGCGCGCTGTCCGCGCTGCACTCCCGTGCCCTGACT
GCAACCTGGCCGGCCAGCCTCTCTTCACGCTGCTCTGCCCGTCGCATCTCCTACGCCCTCCTACTACGGCCCTTCTCCGAC
CTCCTGTGTCAGACGGCCGGCCGTCTTCCAGACCAACATGTACGGCAGCTGCATCTTCCTGACCCTCATTAACGTGGACCGCTACGC
GGCCATCGTGCACCCTGCCGGCGCTGCGTCCTGGTGCAGCCGCCCCTGCCAGCCTGCTGCCCGTGTGCTGTGGG
TGTTCCGCTGCCCTGTGTGCCTGGTGCAGCCGCCTACGACGGGCCTGTGCTTCGAGAGCTTCGGC
GACAAGCTGTGGAAGGGCGGGTCTTCTGGACCCTGCCGCTCGTGCCGCTCGGCGGGGAGGCGCTGGGCGCGGCATGCTCTACTC
GTCGGCCGGGTCTTCTCCTGCTGTCGTTCCTGCCCTACAACGCGCACCAGCCTGGCCGTCTACGGCGCGACCTGGTGGCGGGCAGC
TCGTCATCTTCCGCCAGCCGCCGTGCGCCGTCAGGTGCTTCATGGTGCTTGACTGCCAACTGCTGACCCGCTGTGACTACTT
GAGGCGCCGAGGGCTTCCGCAACACCCTGGGCACTTGGCCACCTTGGCCACCAAGGCCCTGTGTACTGGGGCGCAGGGGCGC
CAGCGCCGAGCGCTGCGGCTCACCGAGACCATCGCATGCGCCGGTCCCCGCGTCCTCCCCGGGGACGCCC
TGGCCGAGCGCCGGGAGGACTCGGCCCTCTGA

FIG. 32

Human GPR92 Nucleotide Sequence (SEQ ID NO: 3)

ATGTTAGCCAACAGCTCCTCAACCAACAGTTCTGTTCTCCCGTGTCCTGACTACCGACCTGTTCCTGGTCCTGGTCACTGGTGGTCTACAG
CTTGGTGCTGCTGGCTGCCGGGCTCCCCCCTCAAGCGCGCTAGCCCTCTTCCTGGGTCTTCCTGGCGCGTCGGTGCACTCGGTGGTGAGCCGTGT
ACATGTAACCTGGCGCGGCCAGCGACCTGCTCTTCACCCTCGTGCCGTTCGTCGTCGTCTCGCCTACTACGACCACTGTCACCACTGGCCCTTC
CCCGACCTCCTGTGCCAGACGACGGGCGCCATCGTGCCAGATGAACATGTACGGCAGCTGCATCTTCCTGATGCTCATCGGCGTGTGGACCG
CTACGCCGCCATCGTCGTGCCGTGCACCCCGCTGCCGCCCGTGCACAGGCCCTCGTGCCGCCGTCGGGACCTGGGCGCCTATGCTTCGCTCA
TCCTGGTGTTTGCCGTGCTGTGGAAAGGCAGGCTCTTCTGCTGTCCGAGGCGCTGCTGCCCCTCGTGCCGGAGGCGCGCGCGCTTCCTGCTGG
TTCAGCGACGAGCTGTGACGCTGTGCTGCTCGTGCTGTGCCGAGATGCCCGAGGCGCAGAGCGGTCTACGGCTGGCGGCGCGCTGTGGGCGCC
CTACTCGTCGGGCCGAGTCTTCCTGCTGTCCTGCTGCCGATCCGCCGATCGCGTGCGGTGCGCCAACTGCTGCCCACCTGCTGACCCGTGGTA
AGCGGTCCCTGCCGCCCGATCGCCGGAGGGCTTCCGCAACACCCCGGGCCACCTGCCAGGACCCGCCGCCCAACGACCCAACGGACGCGGG
CTACTTTAGCGCCGGCGGCAATCCGAAAGGTCCGCGTCACCACCAGGCCCAGGCCGGATGCCGCCAGTCAGGGCGCTGCTCCGACCCTCCGAC
TCCCACTCTCTGTCTTCCTTCACACAGTGTCCCCAGGATTCCGCCCTCTGA

FIG. 33

Feline GPR92 Amino Acid Sequence (SEQ ID NO: 4)

MLPNSTNSSVPPANGSVPPCPDYRPTHRLHMVAYSLVLAAGLPLNALALWVFLRALRVHSVVSVYMCNLAASDLLFTLSLPVRISYYAL
HYWPFSDLLCQTAGAIFQTNMYGSCIFLTLINVDRYAAIVHPLRLRHLRRPVARLLCLGVWALILVFAVPTVLVHRPSSCSYGGGQVR
LCFESFGDRLWKGGLLPLVLLAEALGFLLPLAVLYSSGRVFWTLARPDATQSQRRRKTVRLLLANLVIFLLCFVPYNATLAVYGLLRG
NLVAANSKVCDRVRGVLMVLLAGANCVLDPLVYFSAEGFRNTLRGLGTPNRARTLATNGAQGALAEQPTETYITTPATAEQGLLR
PSNVGTPLTQLPEDSAL*

FIG. 34

Canine GPR92 Amino Acid Sequence (SEQ ID NO: 5)

MLTASANSSVPPCPDYRVTHRLHMVAYSLVLAAGLPLNALALWVFLRALRVHSVVSVYMCNLAASDLLFTLSLPVRISYYALHHWPFSD
LLCQTAGAVFQTNMYGSCIFLTLINVDRYAAIVHPLRLRHLRRPVARLLCLGVWALILVFAVPTVLVHRPSPCSYDGGRARLCFESFG
DKLWKGGLLPIVLLAEALGFLLPLAAMLYSSGRVFWTLARPDATRSRRRKTVRLLLANLVIFLLCFVPYNATLAVYGLLRGNLVAAGS
EASDRVRQVLMVLLASANCVLDPLVYFSAEGFRNTLRGLGTWHRARTLATNGAQGALAERLTETTCIAGPAPASREPPASSPGTP
LTQRREDSAL*

FIG. 35

Human GPR92 Amino Acid Sequence (SEQ ID NO: 6)

MLANSSSTNSSVLPCPDYRPTHRLHLVVYSLVLAAGLPLNALALWVFLRALRVHSVVSVYMCNLAASDLLFTLSLPVRLSYYALHHWPF
PDLLCQTTGAIFQMNMYGSCIFLMLINVDRYAAIVHPLRLRHLRRPVARLLCLGVWALILVFAVPAARVHRPSRCRYRDLEVRLCFES
FSDELWKGRLLPLVLLAEALGFLLPLAAVYSSGRVFWTLARPDATQSQRRRKTVRLLLANLVIFLLCFVPYNSTLAVYGLLRSKLVAA
SVPARDRVRGVLMVLLAGANCVLDPLVYFSAEGFRNTLRGLGTPHRARTSATNGTRAALAQSERSAVTTDATRPDAASQGLLRPSD
SHSLSSFTQCPQDSAL*

FIG. 36

SEQUENCE LISTING

```
<160> NUMBER OF SEQ ID NOS: 6

<210> SEQ ID NO 1
<211> LENGTH: 1122
<212> TYPE: DNA
<213> ORGANISM: Felis catus
<220> FEATURE:
<221> NAME/KEY: GPR92
<222> LOCATION: (1)..(1122)
<223> OTHER INFORMATION: Feline GPR92 nucleic acid sequence

<400> SEQUENCE: 1
atgttgccca actctaccaa cagttctgtt ccccctgcca acggttctgt tccccgtgc      60 cccgactacc ggcccaccca ccgcctgcac atggtggcct acagcctggt gctggccgca    120
gggctccccc tcaacgcgct ggccctctgg gtcttcctgc gcgcgctgcg agtgcactcc    180
gtcgtgagcg tgtacatgtg caacctggcg gccagcgacc tgctcttcac cctctcgctg    240
cccgtgcgca tctcctacta cgccctgcac tactggccct tctccgacct cctgtgccag    300
acggcgggcg ccatcttcca gacgaacatg tacggcagct gcatcttcct gactctcatc    360
aacgtggacc gctacgcggc catcgtgcac ccgctgcggc tgcgccacct gcggcggccc    420
cgcgtggcgc ggctgctctg cctgggagtg tgggcgctca tcctcgtgtt cgctgtgccc    480
accgtcctgg tgcacaggcc ctcgtcctgc agctacggcg gcggccaggt gcgcctgtgc    540
ttcgagagct tcggcgacag gctgtggaag ggcgggctgc tgccgctcgt gctgctggcc    600
gaggcgctgg gcttcctgct gcccctggtg gcggtgctct actcgtcggg ccgggtcttc    660
tggaccctgg cgcggcccga cgccacgcag agccagcggc ggcggaagac cgtgcgcctc    720
ctgctggcca acctcgtcat cttcctgctg tgcttcgtgc cctacaacgc cacgctggcg    780
gtgtacgggc tgctgcgggg caacctggtg gcggcgaaca gcaaggtctg cgatcgggtg    840
cgcggggtgc tgatggtgat ggtgctgttg gccggcgcca actgcgtgct agaccctctg    900
gtgtattact tcagcgccga gggtttccgc aacaccctgc gaggcctggg cactccgaac    960
cgcgccagga ccttggccac caacggggct caggggggcgc tcgccgaaca gcccactgag   1020
accacttaca tcaccaccccc ggctaccgcc gaacaggggc tgctcaggcc ctccaacgtg   1080
```

```
gggacaccct taacccagct ccccgaggac tcggccctct ga          1122
```

<210> SEQ ID NO 2
<211> LENGTH: 1101
<212> TYPE: DNA
<213> ORGANISM: Canis familiaris
<220> FEATURE:
<221> NAME/KEY: GPR92
<222> LOCATION: (1)..(1101)
<223> OTHER INFORMATION: Canine GPR92 nucleic acid sequence

<400> SEQUENCE: 2

```
atgctgaccg cctcggccaa cagctccgtc cccccatgcc ccgactaccg ggtcacccac    60
cgcctgcaca tggtggccta cagcctggtg ctggccgcgg ggctccccct caacgcgctg   120
gccctctggg tcttcctgcg cgcgctgcgc gtgcactccg tggtcagcgt gtacatgtgc   180
aacctggcgg ccagcgacct gctcttcacg ctctcgctgc ccgtgcgcat ctcctactac   240
gccctgcacc actggccctt ctccgacctc tgtgtcaga cggccggcgc cgtcttccag   300
accaacatgt acggcagctg catcttcctg accctcatta acgtggaccg ctacgcggcc   360
atcgtgcacc cactgcggct cgccaccctg cggcggcccc gcgtggcgcg gctgctgtgc   420
ctgggcgtgt gggcgctcat cctggtgttc gccgtgccca ccgtcctggt gcaccggccc   480
tcgccctgca gctacgacgg cggcggggcg cggctgtgct cgagagcttc ggcgacaag    540
ctgtggaagg gcgggctgct gccgctcgtg ctgctggccg aggcgctggg cttcctgctg   600
ccgctcgcgg ccatgctcta ctcgtcgggc cgggtcttct ggaccctggc gcggcccgac   660
gccacgcgga gccggcggcg gcggaagacc gtgcgcctcc tgctggccaa cctcgtcatc   720
ttcctgctgt gcttcgtgcc ctacaacgcc acgctggccg tctacgggct gctgcgggc    780
aacctggtgg cggccggcag cgaggccagc gaccgcgtgc gccaggtgct catggtgatg   840
gtgctgctgg ccagcgccaa ctgcgtgctg gaccgctgg tgtactactt cagcgccgag    900
ggcttccgca cacccgtgcg cggcctgggc acttggcacc gtgccaggac cttggccacc   960
aacggggcgc aggggcgct ggccgagcgg ctcaccgaga ccacctgcat cgccgggccg   1020
gctcccgcca gccgagagcc tccgcgcgtcc tccccgggg ggacgccctt gacccagcgc   1080
cgggaggact cggccctctg a                                           1101
```

<210> SEQ ID NO 3
<211> LENGTH: 1119
<212> TYPE: DNA
<213> ORGANISM: Homo sapiens
<220> FEATURE:
<221> NAME/KEY: GPR92
<222> LOCATION: (1)..(1119)
<223> OTHER INFORMATION: Human GPR nucleic acid sequence
<220> FEATURE:
<221> NAME/KEY: GPR92
<222> LOCATION: (1)..(1119)
<223> OTHER INFORMATION: Human GPR92 nucleic acid sequence

<400> SEQUENCE: 3

```
atgttagcca acagctcctc aaccaacagt tctgttctcc cgtgtcctga ctaccgacct    60
acccaccgcc tgcacttggt ggtctacagc ttggtgctgg ctgccgggct cccccctcaac   120
gcgctagccc tctgggtctt cctgcgcgcg ctgcgcgtgc actcggtggt gagcgtgtac   180
atgtgtaacc tggcggccag cgacctgctc ttcaccctct cgctgccgt tcgtctctcc    240
tactacgcac tgcaccactg gcccttcccc gacctcctgt gccagacgac gggcgccatc   300
```

-continued

```
ttccagatga acatgtacgg cagctgcatc ttcctgatgc tcatcaacgt ggaccgctac      360
gccgccatcg tgcacccgct gcgactgcgc cacctgcggc ggccccgcgt ggcgcggctg      420
ctctgcctgg gcgtgtgggc gctcatcctg gtgtttgccg tgcccgccgc ccgcgtgcac      480
aggccctcgc gttgccgcta ccgggacctc gaggtgcgcc tatgcttcga gagcttcagc      540
gacgagctgt ggaaaggcag gctgctgccc ctcgtgctgc tggccgaggc gctgggcttc      600
ctgctgcccc tggcggcggt ggtctactcg tcgggccgag tcttctggac gctggcgcgc      660
cccgacgcca cgcagagcca gcggcggcgg aagaccgtgc gcctcctgct ggctaacctc      720
gtcatcttcc tgctgtgctt cgtgccctac aacagcacgc tggcggtcta cgggctgctg      780
cggagcaagc tggtggcggc cagcgtgcct gcccgcgatc gcgtgcgcgg ggtgctgatg      840
gtgatggtgc tgctggccgg cgccaactgc gtgctggacc cgctggtgta ctactttagc      900
gccgagggct tccgcaacac cctgcgcggc ctgggcactc cgcaccgggc caggacctcg      960
gccaccaacg ggacgcgggc ggcgctcgcg caatccgaaa ggtccgccgt caccaccgac     1020
gccaccaggc cggatgccgc cagtcagggg ctgctccgac cctccgactc ccactctctg     1080
tcttccttca cacagtgtcc ccaggattcc gccctctga                            1119
```

<210> SEQ ID NO 4
<211> LENGTH: 373
<212> TYPE: PRT
<213> ORGANISM: Felis catus
<220> FEATURE:
<221> NAME/KEY: GPR92
<222> LOCATION: (1)..(373)
<223> OTHER INFORMATION: Feline GPR92 amino acid sequence

<400> SEQUENCE: 4

```
Met Leu Pro Asn Ser Thr Asn Ser Ser Val Pro Pro Ala Asn Gly Ser
1               5                   10                  15

Val Pro Pro Cys Pro Asp Tyr Arg Pro Thr His Arg Leu His Met Val
            20                  25                  30

Ala Tyr Ser Leu Val Leu Ala Ala Gly Leu Pro Leu Asn Ala Leu Ala
        35                  40                  45

Leu Trp Val Phe Leu Arg Ala Leu Arg Val His Ser Val Val Ser Val
    50                  55                  60

Tyr Met Cys Asn Leu Ala Ala Ser Asp Leu Leu Phe Thr Leu Ser Leu
65                  70                  75                  80

Pro Val Arg Ile Ser Tyr Tyr Ala Leu His Tyr Trp Pro Phe Ser Asp
                85                  90                  95

Leu Leu Cys Gln Thr Ala Gly Ala Ile Phe Gln Thr Asn Met Tyr Gly
            100                 105                 110

Ser Cys Ile Phe Leu Thr Leu Ile Asn Val Asp Arg Tyr Ala Ala Ile
        115                 120                 125

Val His Pro Leu Arg Leu Arg His Leu Arg Arg Pro Arg Val Ala Arg
    130                 135                 140

Leu Leu Cys Leu Gly Val Trp Ala Leu Ile Leu Val Phe Ala Val Pro
145                 150                 155                 160

Thr Val Leu Val His Arg Pro Ser Ser Cys Ser Tyr Gly Gly Gly Gln
                165                 170                 175

Val Arg Leu Cys Phe Glu Ser Phe Gly Asp Arg Leu Trp Lys Gly Gly
            180                 185                 190

Leu Leu Pro Leu Val Leu Ala Glu Ala Leu Gly Phe Leu Leu Pro
        195                 200                 205
```

-continued

```
Leu Val Ala Val Leu Tyr Ser Ser Gly Arg Val Phe Trp Thr Leu Ala
            210                 215                 220

Arg Pro Asp Ala Thr Gln Ser Gln Arg Arg Lys Thr Val Arg Leu
225                 230                 235                 240

Leu Leu Ala Asn Leu Val Ile Phe Leu Leu Cys Phe Val Pro Tyr Asn
                245                 250                 255

Ala Thr Leu Ala Val Tyr Gly Leu Leu Arg Gly Asn Leu Val Ala Ala
            260                 265                 270

Asn Ser Lys Val Cys Asp Arg Val Arg Gly Val Leu Met Val Met Val
                275                 280                 285

Leu Leu Ala Gly Ala Asn Cys Val Leu Asp Pro Leu Val Tyr Tyr Phe
            290                 295                 300

Ser Ala Glu Gly Phe Arg Asn Thr Leu Arg Gly Leu Gly Thr Pro Asn
305                 310                 315                 320

Arg Ala Arg Thr Leu Ala Thr Asn Gly Ala Gln Gly Ala Leu Ala Glu
                325                 330                 335

Gln Pro Thr Glu Thr Thr Tyr Ile Thr Thr Pro Ala Thr Ala Glu Gln
            340                 345                 350

Gly Leu Leu Arg Pro Ser Asn Val Gly Thr Pro Leu Thr Gln Leu Pro
                355                 360                 365

Glu Asp Ser Ala Leu
            370

<210> SEQ ID NO 5
<211> LENGTH: 366
<212> TYPE: PRT
<213> ORGANISM: Canis familiaris
<220> FEATURE:
<221> NAME/KEY: GPR92
<222> LOCATION: (1)..(366)
<223> OTHER INFORMATION: Canine GPR92 amino acid sequence

<400> SEQUENCE: 5

Met Leu Thr Ala Ser Ala Asn Ser Ser Val Pro Pro Cys Pro Asp Tyr
1               5                   10                  15

Arg Val Thr His Arg Leu His Met Val Ala Tyr Ser Leu Val Leu Ala
            20                  25                  30

Ala Gly Leu Pro Leu Asn Ala Leu Ala Leu Trp Val Phe Leu Arg Ala
        35                  40                  45

Leu Arg Val His Ser Val Val Ser Val Tyr Met Cys Asn Leu Ala Ala
    50                  55                  60

Ser Asp Leu Leu Phe Thr Leu Ser Leu Pro Val Arg Ile Ser Tyr Tyr
65                  70                  75                  80

Ala Leu His His Trp Pro Phe Ser Asp Leu Leu Cys Gln Thr Ala Gly
                85                  90                  95

Ala Val Phe Gln Thr Asn Met Tyr Gly Ser Cys Ile Phe Leu Thr Leu
            100                 105                 110

Ile Asn Val Asp Arg Tyr Ala Ala Ile Val His Pro Leu Arg Leu Arg
        115                 120                 125

His Leu Arg Arg Pro Arg Val Ala Arg Leu Leu Cys Leu Gly Val Trp
    130                 135                 140

Ala Leu Ile Leu Val Phe Ala Val Pro Thr Val Leu Val His Arg Pro
145                 150                 155                 160

Ser Pro Cys Ser Tyr Asp Gly Gly Arg Ala Arg Leu Cys Phe Glu Ser
                165                 170                 175

Phe Gly Asp Lys Leu Trp Lys Gly Gly Leu Leu Pro Leu Val Leu Leu
```

```
            180                 185                 190
Ala Glu Ala Leu Gly Phe Leu Leu Pro Leu Ala Met Leu Tyr Ser
            195                 200                 205

Ser Gly Arg Val Phe Trp Thr Leu Ala Arg Pro Asp Ala Thr Arg Ser
    210                 215                 220

Arg Arg Arg Lys Thr Val Arg Leu Leu Ala Asn Leu Val Ile
225                 230                 235                 240

Phe Leu Leu Cys Phe Val Pro Tyr Asn Ala Thr Leu Ala Val Tyr Gly
                245                 250                 255

Leu Leu Arg Gly Asn Leu Val Ala Ala Gly Ser Glu Ala Ser Asp Arg
            260                 265                 270

Val Arg Gln Val Leu Met Val Met Val Leu Leu Ala Ser Ala Asn Cys
            275                 280                 285

Val Leu Asp Pro Leu Val Tyr Tyr Phe Ser Ala Glu Gly Phe Arg Asn
            290                 295                 300

Thr Leu Arg Gly Leu Gly Thr Trp His Arg Ala Arg Thr Leu Ala Thr
305                 310                 315                 320

Asn Gly Ala Gln Gly Ala Leu Ala Glu Arg Leu Thr Glu Thr Thr Cys
                325                 330                 335

Ile Ala Gly Pro Ala Pro Ala Ser Arg Glu Pro Pro Ala Ser Ser Pro
            340                 345                 350

Gly Gly Thr Pro Leu Thr Gln Arg Arg Glu Asp Ser Ala Leu
            355                 360                 365

<210> SEQ ID NO 6
<211> LENGTH: 372
<212> TYPE: PRT
<213> ORGANISM: Homo sapiens
<220> FEATURE:
<221> NAME/KEY: GPR92
<222> LOCATION: (1)..(372)
<223> OTHER INFORMATION: Human GPR92 amino acid sequence

<400> SEQUENCE: 6

Met Leu Ala Asn Ser Ser Thr Asn Ser Ser Val Leu Pro Cys Pro
1               5                   10                  15

Asp Tyr Arg Pro Thr His Arg Leu His Leu Val Val Tyr Ser Leu Val
                20                  25                  30

Leu Ala Ala Gly Leu Pro Leu Asn Ala Leu Ala Leu Trp Val Phe Leu
            35                  40                  45

Arg Ala Leu Arg Val His Ser Val Val Ser Val Tyr Met Cys Asn Leu
    50                  55                  60

Ala Ala Ser Asp Leu Leu Phe Thr Leu Ser Leu Pro Val Arg Leu Ser
65                  70                  75                  80

Tyr Tyr Ala Leu His His Trp Pro Phe Pro Asp Leu Leu Cys Gln Thr
                85                  90                  95

Thr Gly Ala Ile Phe Gln Met Asn Met Tyr Gly Ser Cys Ile Phe Leu
            100                 105                 110

Met Leu Ile Asn Val Asp Arg Tyr Ala Ala Ile Val His Pro Leu Arg
        115                 120                 125

Leu Arg His Leu Arg Arg Pro Arg Val Ala Arg Leu Cys Leu Gly
    130                 135                 140

Val Trp Ala Leu Ile Leu Val Phe Ala Val Pro Ala Ala Arg Val His
145                 150                 155                 160

Arg Pro Ser Arg Cys Arg Tyr Arg Asp Leu Glu Val Arg Leu Cys Phe
                165                 170                 175
```

-continued

```
Glu Ser Phe Ser Asp Glu Leu Trp Lys Gly Arg Leu Leu Pro Leu Val
            180                 185                 190

Leu Leu Ala Glu Ala Leu Gly Phe Leu Leu Pro Leu Ala Ala Val Val
        195                 200                 205

Tyr Ser Ser Gly Arg Val Phe Trp Thr Leu Ala Arg Pro Asp Ala Thr
        210                 215                 220

Gln Ser Gln Arg Arg Arg Lys Thr Val Arg Leu Leu Leu Ala Asn Leu
225                 230                 235                 240

Val Ile Phe Leu Leu Cys Phe Val Pro Tyr Asn Ser Thr Leu Ala Val
                245                 250                 255

Tyr Gly Leu Leu Arg Ser Lys Leu Val Ala Ala Ser Val Pro Ala Arg
            260                 265                 270

Asp Arg Val Arg Gly Val Leu Met Val Met Val Leu Leu Ala Gly Ala
        275                 280                 285

Asn Cys Val Leu Asp Pro Leu Val Tyr Tyr Phe Ser Ala Glu Gly Phe
    290                 295                 300

Arg Asn Thr Leu Arg Gly Leu Gly Thr Pro His Arg Ala Arg Thr Ser
305                 310                 315                 320

Ala Thr Asn Gly Thr Arg Ala Ala Leu Ala Gln Ser Glu Arg Ser Ala
                325                 330                 335

Val Thr Thr Asp Ala Thr Arg Pro Asp Ala Ala Ser Gln Gly Leu Leu
            340                 345                 350

Arg Pro Ser Asp Ser His Ser Leu Ser Ser Phe Thr Gln Cys Pro Gln
        355                 360                 365

Asp Ser Ala Leu
        370
```

COMPOUNDS THAT MODULATE GPR92 RECEPTOR ACTIVITY AND PET FOOD PRODUCTS CONTAINING THE SAME

CROSS-REFERENCE TO RELATED APPLICATION

This application is a U.S. National Stage Patent Application under 35 U.S.C. § 371 of International Patent Application No. PCT/US2019/050091, filed on Sep. 6, 2019, which claims priority to U.S. Provisional Application Ser. No. 62/728,229 filed Sep. 7, 2018, the contents of each of which are incorporated by reference in their entireties.

SEQUENCE LISTING

This application contains a Sequence Listing which has been submitted electronically in ASCII format and is hereby incorporated by reference in its entirety. The ASCII copy, created on Aug. 27, 2019, is named "069269.0351 SEQ Listing.txt" and is 14,633 bytes in size.

FIELD

The presently disclosed subject matter relates to compounds that modulate a GPR92 receptor and flavor compositions comprising the same. The flavor compositions can be used to enhance or modify the palatability, taste and/or flavor of pet food products. The flavor compositions can include combinations of compounds and can be added to pet food products by various delivery systems.

BACKGROUND

Taste profiles for edible compositions include basic tastes such as sweet, salt, bitter, sour, umami and kokumi. Taste profiles have also been described as including free fatty acid tastes. Chemical compounds that elicit these tastes are often referred to as tastants. It is hypothesized that tastants are sensed by taste receptors in the mouth and throat which transmit signals to the brain where the tastants and resulting taste profiles are registered. Taste receptors include the GPR92 (also known as LPAS and LPARS) taste receptor, which is predicted to be a G-protein coupled cell surface receptor. The receptor contains seven transmembrane domains involved in the detection of specific compounds and a G-protein associated intracellular portion involved in signal transduction.

Pet food manufacturers have a long-standing desire to provide pet food products that have high nutritional value. In addition, and with particular regard to cat and dog foods, pet food manufacturers desire a high degree of palatability so that pets can receive the full nutritional benefit from their food. Domestic animals, especially cats, are notoriously fickle in their food preferences, and often refuse to eat a pet food product that it has accepted over time or refuse to eat any more than a minimal amount of a pet food product. This phenomenon may be, in part, due to the subtle differences in the sensory profiles of the raw material, which can be perceived by the domestic animals because of their gustatory and olfactory systems. As a result, pet owners frequently change types and brands of pet food in order to maintain their pets in a healthy and contented condition.

While there have been recent advances in taste and flavor technologies, there remains a need for compounds that can enhance or modify the palatability of pet food products by enhancing or modifying the taste, texture and/or flavor profiles of the pet food product. The enhancement or modification can be to increase the intensity of a desirable attribute, to replace a desirable attribute not present or somehow lost in the pet food product, or to decrease the intensity of an undesirable attribute. In particular, it is desirable to increase the intensity of a desirable tastant in a pet food product.

SUMMARY OF THE INVENTION

The presently disclosed subject matter is directed to flavor compositions and methods for making and modifying such compositions across a variety of pet food products. Specifically, the present disclosure is directed to a flavor composition comprising one or more compounds that enhance, increase and/or modulate the activity of a GPR92 receptor, e.g., a feline GPR92 receptor (fGPR92).

In certain embodiments, the flavor composition comprises one or more compounds of Formula I comprising the structure:

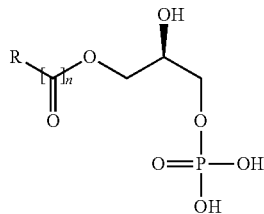

or any salt thereof,
wherein n is 0 or 1; and
R is a substituted or unsubstituted hydrocarbon chain having a carbon length of between about $C_2$ and about $C_{40}$.

In certain embodiments, the flavor composition comprises one or more compounds of Formula II comprising the structure:

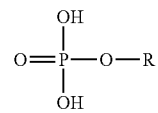

or any salt thereof,
wherein R is a substituted or unsubstituted hydrocarbon chain having a carbon length of between about $C_2$ and about $C_{40}$.

In certain embodiments, the hydrocarbon chain comprises zero to eight double bonds. In certain embodiments, one or more double bonds can be substituted with hydrogen, methyl, or $C_1$ to $C_{12}$ alkyl. In certain embodiments, one or more of the carbons in the hydrocarbon chain is substituted by an oxygen, sulfur, nitrogen, ketone, sulfone, sulfoxide, amide, urea, or sulfonamide. In certain embodiments, R is a substituted hydrocarbon chain that is substituted with one or more of H, $CH_3$, $C_1$-$C_{20}$ alkyl, COOH, $SO_3H$, CHO, C(O)$R_1$, C=$CR_1R_2$, C=NOH, OP(O)(OR$_1$)(OR$_2$), OR$^1$, SR$_1$, CN, COOR$_1$, CONR$_1R_2$, NO$_2$, NHOH, F, Cl, Br, I, and NR$_1R_2$, wherein $R_1$ and $R_2$ are each independently selected from H and branched or unbranched $C_1$-$C_6$ alkyl.

In certain embodiments, the compound of Formula I is selected from the group consisting of 1-(9Z-octadecenyl)-2-hydroxy-sn-glycero-3-phosphate (LPA C18:1), 1-myristoyl-2-hydroxy-sn-glycero-3-phosphate (LPA 14:0), 1-palmitoyl-2-hydroxy-sn-glycero-3-phosphate (LPA 16:0),
1-stearoyl-2-hydroxy-sn-glycero-3-phosphate (LPA 18:0),
D-(+)-sn-1-O-linoleoyl-glyceryl-3-phosphate (LPA 18:2).
D-H-sn-1-O-linolenoyl-glyceryl-3-phosphate (LPA 18:3),
1-oleoyl-2-hydroxy-sn-glycero-3-phosphate (LPA 18:1),
1-hexadecyl-2-hydroxy-sn-glycero-3-phosphate (AGP 16:0),
1-octadecyl Lysophosphatidic Acid (1-Octadecyl LPA),
1-heptadecanoyl-2-hydroxy-sn-glycero-3-phosphate (LPA 17:0),
(R)-2-amino-3-((3-octylphenyl)amino)-3-oxopropyl dihydrogen phosphate (VPC 23019, Cayman),
D-(+)-sn-1-O-arachidonoyl-glyceryl-3-phosphate (LPA 20:4),
any analog or derivative thereof and any combination thereof.

In specific embodiments, the compound of Formula II is selected from the group consisting of 9Z-octadecenyl phosphate, sphingosine-1-phosphate, 1-mercaptoundecylphosphoric acid, trans,trans-farnesyl monophosphate, and any analog or derivative thereof, and any combination thereof.

In certain embodiments, the flavor composition comprises disodium pyrophosphate ($Na_2H_2P_2O_7$), sodium tripolyphosphate ($Na_5P_3O_{10}$), fish hydrolysate, peptone, 16:0 lyso-PG 1-palmitoyl-2-hydroxy-sn-glycero-3-phosphoglycerol or any combination thereof.

The presently disclosed subject matter further provides a food product comprising any flavor composition disclosed herein, wherein the flavor composition is present in an amount effective to increase the palatability of the food product. In certain embodiments, the increase in palatability is determined by a panel of taste testers. In certain embodiments, the flavor composition is present at a concentration of from about 10 pM to about 1 M, from about 0.01 ppm to 1,000 ppm, or from about 0.01% to about 10% w/w in the food product. In certain embodiments, the flavor composition comprises one or more purified compound disclosed herein, and the flavor composition is present at a concentration of from about 1 nM to about 0.1 M in the food product. In certain embodiments, the flavor composition comprises a peptone or a hydrolysate, and the flavor composition is present at a concentration of from about 0.1% to about 10% in the food product. In certain embodiments, the food product comprises a pet food product. In certain embodiments, the pet food product is a feline pet food product or a canine pet food product. In certain embodiments, the pet food product is a wet pet food product. In certain embodiments, the pet food product is a dry pet food product.

The presently disclosed subject matter also provides a method of modulating activity of a feline GPR92 receptor comprising the amino acid sequence set forth in SEQ ID NO: 4, the method comprising contacting a flavor composition with the feline GPR92 receptor, wherein the composition binds to one or more amino acids of the feline GPR92 receptor selected from the group consisting of Arg83, Gly103, Phe106, Gln107, Met110, Cys114, Thr161, His165, Ala200, Gly204, Pro208, Phe248, Phe252, Tyr255, Asn256, Leu259, Arg281, Met285, Val288, Glu182 of a GPR92 receptor, and combinations thereof. In certain embodiments, the flavor composition binds to Arg83 of the feline GPR92 receptor. In certain embodiments, the flavor composition binds to one or more amino acids of the feline GPR92 receptor selected from the group consisting of Gly103, Phe106, Gln107, Met110, Cys114, and combinations thereof. In certain embodiments, the flavor composition binds to one or more amino acids of the feline GPR92 receptor selected from the group consisting of Thr161, His165, and combinations thereof. In certain embodiments, the flavor composition binds to one or more amino acids of the feline GPR92 receptor selected from the group consisting of Ala200, Gly204, Pro208, and combinations thereof. In certain embodiments, the flavor composition binds to one or more amino acids of the feline GPR92 receptor selected from the group consisting of Phe248, Phe252, Tyr255, Asn256, Leu259, and combinations thereof. In certain embodiments, the flavor composition binds to one or more amino acids of the feline GPR92 receptor selected from the group consisting of Arg281, Met285, Val288, and combinations thereof. In certain embodiments, the flavor composition binds to Glu182 of the feline GPR92 receptor.

The presently disclosed subject matter also provides a method of identifying a flavor composition that modulates activity of a feline GPR92 receptor comprising (a) contacting a test agent with the feline GPR92 receptor, (b) detecting an interaction between test compound and one or more amino acids in an interacting site of the feline GPR92, and (c) selecting as the flavor composition, a test agent that interacts with one or more amino acids. In certain embodiments, the method further comprises determining the activity of the feline GPR92 receptor after step (a). In certain embodiments, the method further comprises contacting a feline GPR92 receptor ligand to the GPR92 receptor. In certain embodiments, the test agent increases the activity of the feline umami receptor. In certain embodiments, the feline umami receptor is expressed by a cell, and wherein the test agent is contacted to the cell.

The presently disclosed subject matter provides for flavor compositions that modulates the activity of a GPR92 receptor identified according to the methods disclosed herein.

The presently disclosed subject matter also provides for food products comprising the flavor compositions as disclosed herein. In certain embodiments, the flavor composition is present at a concentration of from about 0.01% to about 10% weight/weight (w/w) in the food product.

The presently disclosed subject matter also provides a method of increasing palatability of a food product comprising admixing a food product with a flavor composition as disclosed herein, wherein the flavor composition is present in an amount effective to increase palatability of the food product. In certain embodiments, the increase in palatability is determined by a panel of taste testers.

The presently disclosed subject matter also provides a method of preparing a food product capable of increasing an activity of a GPR92 receptor, comprising admixing a food product with an effective amount of a flavor composition as disclosed herein. In certain embodiments, the flavor composition is present at a concentration of from about 10 pM to about 1 M in the food product. In certain embodiments, the flavor composition is present at a concentration of from about 0.01 ppm to 1,000 ppm in the food product. In certain embodiments, the flavor composition is present at a concentration of from about 0.01% to about 10% w/w in the food product. In certain embodiments, the flavor composition comprises one or more purified compound, and the flavor composition is present at a concentration of from about 1 nM to about 0.1 M in the food product. In certain embodiments, the flavor composition comprises peptone or fish hydrolysate, and the flavor composition is present at a concentration of from about 0.1% to about 10% in the food product.

The foregoing has outlined rather broadly the features and technical advantages of the present application in order that the detailed description that follows may be better understood. Additional features and advantages of the application will be described hereinafter which form the subject of the claims of the application. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of the application, both as to its organization and method of operation, together with further objects and advantages will be better understood from the following description.

BRIEF DESCRIPTION OF THE DRAWINGS

FIGS. 1A-1C show dose response curves for disodium pyrophosphate ($Na_2H_2P_2O_7$) under both agonist mode (A), positive allosteric mode (B) and signal % at maximum concentration and $EC_{50}$ values of the compound (C). Mock cells did not comprise a fGPR92 receptor.

FIGS. 2A-2C show dose response curves for sodium tripolyphosphate ($Na_5P_3O_{10}$) under both agonist mode (A), positive allosteric mode (B) and signal % at maximum concentration and $EC_{50}$ values of the compound (C).

FIGS. 3A-3C show dose response curves for lysophophatidic acid (LPA) [LPA C18:1] under both agonist mode (A), positive allosteric mode (B) and signal % at maximum concentration and $EC_{50}$ values of the compound (C).

FIGS. 4A-4C show dose response curves for [LPA 14:0]; 14:0 Lyso PA; myristoyl lysophosphatidic acid under both agonist mode (A), positive allosteric mode (B) and signal % at maximum concentration and $EC_{50}$ values of the compound (C).

FIGS. 5A-5C show dose response curves for [LPA 16:0]; palmitoyl lysophosphatidic acid under both agonist mode (A), positive allosteric mode (B) and signal % at maximum concentration and $EC_{50}$ values of the compound (C).

FIGS. 6A-6C show dose response curves for [LPA 18:0]; 18:0 Lyso PA; 1-stearoyl-2-hydroxy-sn-glycero-3-phosphate under both agonist mode (A), positive allosteric mode (B) and signal % at maximum concentration and $EC_{50}$ values of the compound (C).

FIGS. 7A-7C show dose response curves for [LPA 18:2]; -(+)-sn-1-O-linoleoyl-glyceryl-3-phosphate (Linoleoyl LPA) under both agonist mode (A), positive allosteric mode (B) and signal % at maximum concentration and $EC_{50}$ values of the compound (C).

FIGS. 8A-8C show dose response curves for [LPA 18:3]; D-(+)-sn-1-O-linolenoyl-glyceryl-3-phosphate under both agonist mode (A), positive allosteric mode (B) and signal % at maximum concentration and $EC_{50}$ values of the compound (C).

FIGS. 9A-9C show dose response curves for octadecenyl phosphate: 9Z-octadecenyl phosphate under both agonist mode (A), positive allosteric mode (B) and signal % at maximum concentration and $EC_{50}$ values of the compound (C).

FIGS. 10A-10C show dose response curves for alkylglycerol phosphate; AGP (18:1); 18:1 Lyso PA 1-oleoyl-2-hydroxy-sn-glycero-3-phosphate under both agonist mode (A), positive allosteric mode (B) and signal % at maximum concentration and $EC_{50}$ values of the compound (C).

FIGS. 11A-11C show dose response curves for alkylglycerol phosphate; AGP (16:0); Cayman Item No. 10010188 under both agonist mode (A), positive allosteric mode (B) and signal % at maximum concentration and $EC_{50}$ values of the compound (C).

FIGS. 12A-12C show dose response curves for L-menthol as a negative control under both agonist mode (A), positive allosteric mode (B) and signal % at maximum concentration and $EC_{50}$ values of the compound (C).

FIGS. 13A-13C show dose response curves for cinnamic aldehyde as a negative control under both agonist mode (A), positive allosteric mode (B) and signal % at maximum concentration and $EC_{50}$ values of the compound (C).

FIGS. 14A-14C show dose response curves for fish hydrolysate under both agonist mode (A), positive allosteric mode (B) and signal % at maximum concentration and $EC_{50}$ values of the compound (C).

FIGS. 15A-15C show dose response curves for GPR92 peptone under both agonist mode (A), positive allosteric mode (B) and signal % at maximum concentration and $EC_{50}$ values of the compound (C).

FIGS. 16A-16C show dose response curves for 1-octadecyl lysophosphatidic acid under both agonist mode (A), positive allosteric mode (B) and signal % at maximum concentration and $EC_{50}$ values of the compound (C).

FIGS. 17A-17C show dose response curves for lyso PA (17:0 LPA) at eight different dose levels under both agonist mode (A), positive allosteric mode (B) and signal % at maximum concentration and $EC_{50}$ values of the compound (C).

FIG. 24 shows a summary of the signal levels and $EC_{50}$ values of 21 samples and negative controls (menthol and cinnamaldehyde) under both agonist mode and positive allosteric mode. The $EC_{50}$ values are in Molar (M) concentration. N/A; not available.

FIGS. 29A-29C show in silico modeling of the binding of compound AGP 16:0 (1-hexadecyl-2-hydroxy-sn-glycero-3-phosphate) to the 7TM domain of feline GPR92. (A) Shows the structure of the binding compound, (B) shows a model of the compound binding to GPR92, and (C) shows the putative GPR92 amino acid residues that interact with the binding compound. Positively charged residues are present at the extracellular side of the GPR92 GPCR domain that coordinate phosphates of active phospholipids. The ligand positions the phosphate to potentially form electrostatic interactions with Arg281 and Arg83 and hydrogen bonds with Tyr255. The tail of the phospholipid extends through a long hydrophobic channel forming multiple hydrophobic interactions.

FIG. 30A-30C show in silico modeling of the binding of compound octadecenyl phosphate (9Z-octadecenyl phosphate) to the 7TM domain of feline GPR92. (A) Shows the structure of the binding compound, (B) shows a model of the compound binding to GPR92, and (C) shows the putative GPR92 amino acid residues that interact with the binding compound. Positively charged residues are present at the extracellular side of the GPR92 GPCR domain that coordinate phosphates of active phospholipids. The ligand forms a salt bridge to Arg281 and ARG83, hydrogen bonds with ARG281. The tail of the phospholipid extends through a long hydrophobic channel forming multiple hydrophobic interactions.

FIG. 31 depicts a feline GPR92 nucleotide sequence (SEQ ID NO: 1).

FIG. 32 depicts a canine GPR92 nucleotide sequence (SEQ ID NO: 2).

FIG. 33 depicts a human GPR92 nucleotide sequence (SEQ ID NO: 3).

FIG. 34 depicts a feline GPR92 amino acid sequence (SEQ ID NO: 4).

FIG. 35 depicts a canine GPR92 amino acid sequence (SEQ ID NO: 5).

FIG. 36 depicts a human GPR92 amino acid sequence (SEQ ID NO: 6).

DETAILED DESCRIPTION

Figures 18A, 18B:
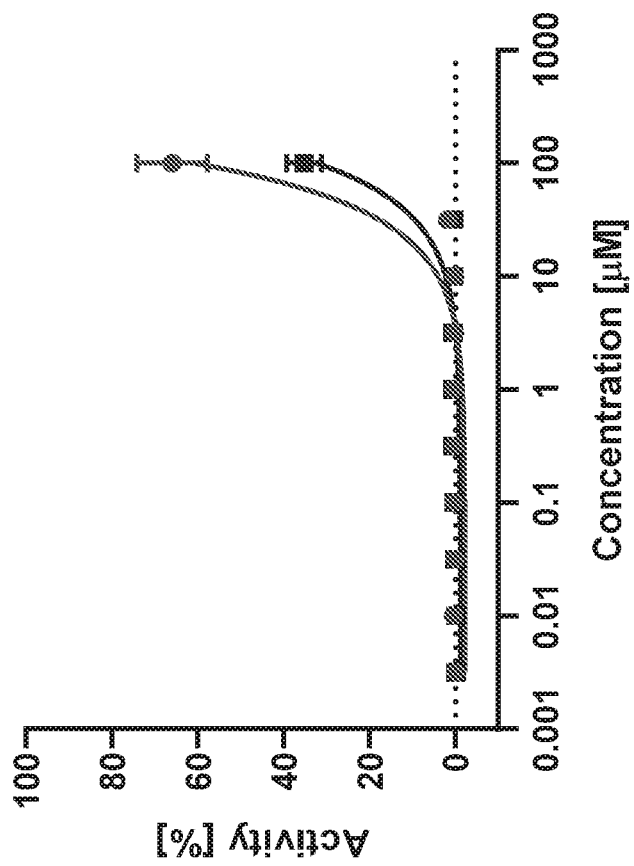
FIGS. 18A-18B show dose response curves for 16:0 lyso-PG 1-palmitoyl-2-hydroxy-sn-glycero-3-phosphoglycerol under an agonist mode (A) and signal % at maximum concentration and $EC_{50}$ values of the compound (B).
Figures 19A, 19B:
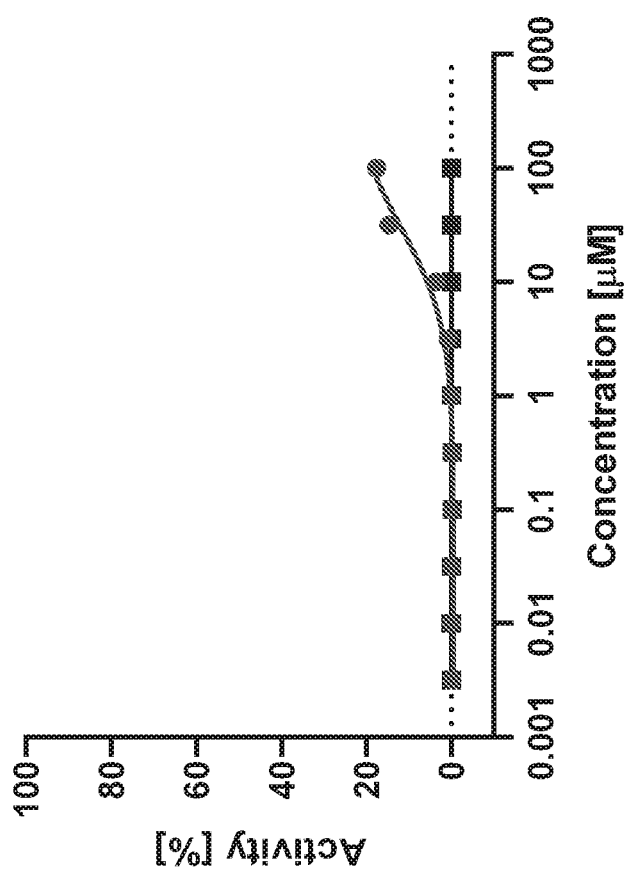
FIGS. 19A-19B show dose response curves for (R)-2-amino-3-((3-octylphenyl) amino)-3-oxopropyl dihydrogen phosphate (VPC 23019, Cayman) under an agonist mode (A) and signal % at maximum concentration and $EC_{50}$ values of the compound (B).
Figures 20A, 20B:
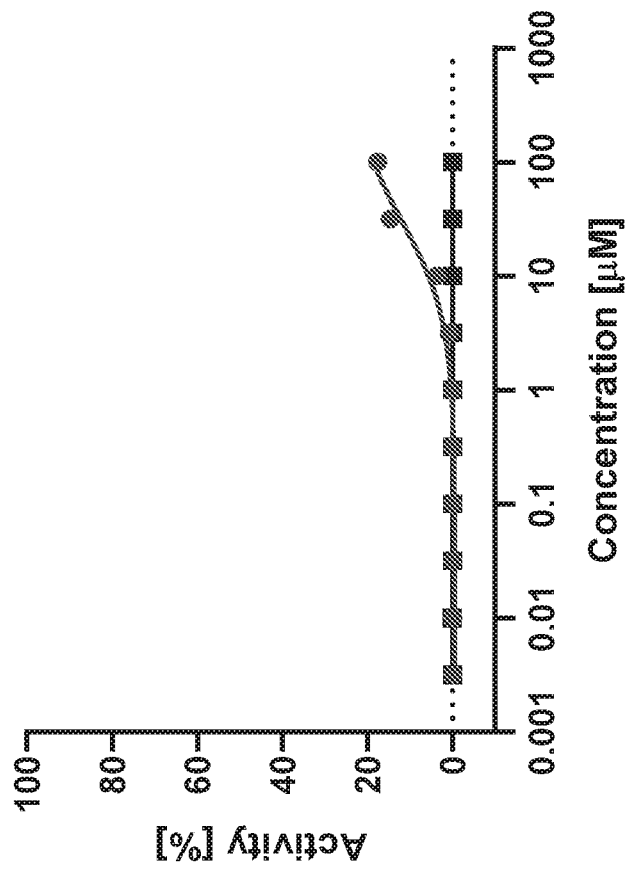
FIGS. 20A-20B shows dose response curve for sphingosine-1-phosphate under an agonist mode (A) and signal % at maximum concentration and $EC_{50}$ values of the compound (B).
Figures 21A, 21B, 21C:
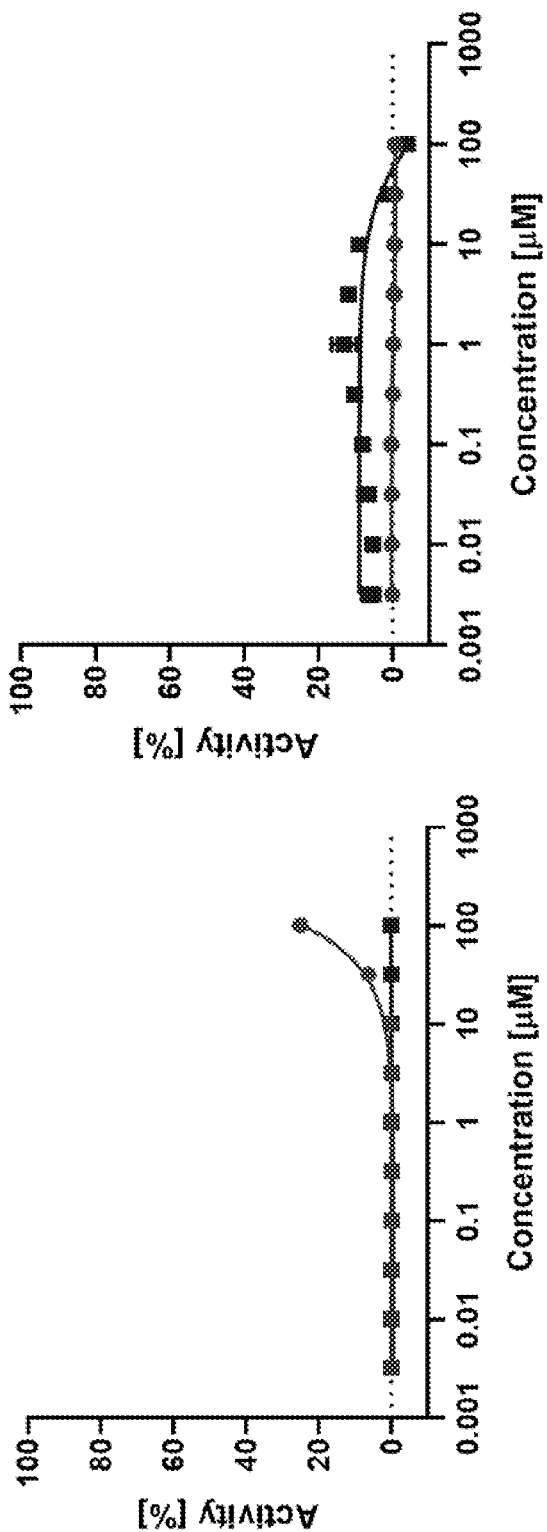
FIGS. 21A-21C show dose response curves for (S) 20:4 LPA; D-(+)-sn-1-O-arachidonoyl-glyceryl-3-phosphate under both agonist mode (A), positive allosteric mode (B) and signal % at maximum concentration and $EC_{50}$ values of the compound (C).
Figures 22A, 22B:
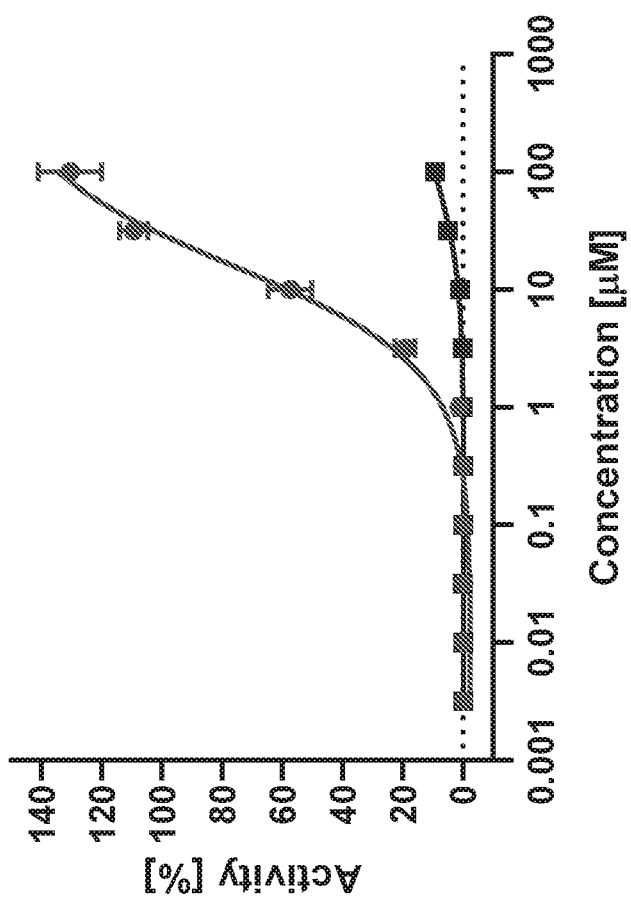
FIGS. 22A-22B show dose response curves for 1-mercaptoundecylphosphoric acid under agonist mode (A) and signal % at maximum concentration and $EC_{50}$ values of the compound (B).
Figures 23A, 23B:
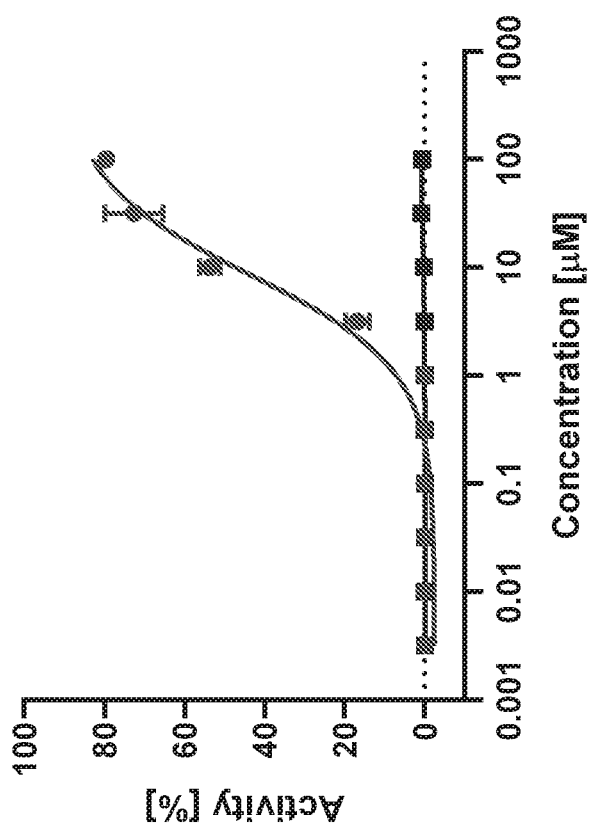
FIGS. 23A-23B show dose response curves for trans, trans-Farnesyl monophosphate under agonist mode (A) and signal % at maximum concentration and $EC_{50}$ values of the compound (B).

To date, there remains a need for a flavor modifier that can increase and/or enhance the palatability of various pet food products. The present application relates to flavor compositions that include at least one compound that modulates the activity of a GPR92 receptor, e.g., a feline GPR92 receptor (fGPR92). The flavor compositions can be used to increase the palatability and/or enhance or modify the taste of various pet food products such as a nutritionally-complete pet food, and can be added to pet food products by various delivery systems. The flavor compositions can further include combinations of compounds, including amino acids, nucleotides, and furanones (as described in International Application Nos. PCT/EP2013/072788 filed Oct. 31, 2013, PCT/EP2013/072789 filed Oct. 31, 2013, PCT/EP2013/072790 filed Oct. 31, 2013, and PCT/EP2013/072794 filed Oct. 31, 2013, each of which is incorporated by reference in its entirety), and/or umami receptor activating transmembrane compounds (as described in International Application No. PCT/US15/65036 filed Dec. 10, 2015, which is incorporated by reference in its entirety), and/or nucleotide derivatives (as described in International Application No. PCT/US15/65046 filed Dec. 10, 2015, which is incorporated by reference in its entirety), and/or fatty acid receptor (GPR120) active compounds (as described in International Application No. PCT/US15/65106 filed Dec. 10, 2015, which is incorporated by reference in its entirety), and/or calcium-sensing receptor (CaSR) active compounds (as described in International Application No. PCT/US17/027698 filed Apr. 14, 2017, which is incorporated by reference in its entirety).

1. Definitions

The terms used in this specification generally have their ordinary meanings in the art, within the context of this invention and in the specific context where each term is used. Certain terms are discussed below, or elsewhere in the specification, to provide additional guidance to the practitioner in describing the compositions and methods of the invention and how to make and use them.

As used herein, the use of the word "a" or "an" when used in conjunction with the term "comprising" in the claims and/or the specification can mean "one," but it is also consistent with the meaning of "one or more," "at least one," and "one or more than one." Still further, the terms "having," "including," "containing" and "comprising" are interchangeable and one of skill in the art is cognizant that these terms are open ended terms.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value.

As used herein, "taste" refers to a sensation caused by activation or inhibition of receptor cells in a subject's taste buds. In certain embodiments, taste can be selected from the group consisting of sweet, sour, salt, bitter, kokumi and umami. In certain embodiments, a taste is elicited in a subject by a "tastant." In certain embodiments, a tastant is a synthetic tastant. In certain embodiments, the tastant is prepared from a natural source.

In certain embodiments, "taste" can include kokumi taste. See, e.g., Ohsu et al., J. Biol. Chem., 285(2): 1016-1022 (2010), the contents of which are incorporated herein by reference. In certain embodiments, kokumi taste is a sensation caused by activation or inhibition of receptor cells in a subject's taste buds, for example the receptor CaSR, and is separate than other tastes, for example, sweet, salty, and umami tastes, although it can act as a taste enhancer for these tastes.

As used herein, "taste profile" refers to a combination of tastes, such as, for example, one or more of a sweet, sour, salt, bitter, umami, kokumi and free fatty acid taste. In certain embodiments, a taste profile is produced by one or more tastant that is present in a composition at the same or different concentrations. In certain embodiments, a taste profile refers to the intensity of a taste or combination of tastes, for example, a sweet, sour, salt, bitter, umami, kokumi and free fatty acid taste, as detected by a subject or any assay known in the art. In certain embodiments, modifying, changing or varying the combination of tastants in a taste profile can change the sensory experience of a subject.

As used herein, "flavor" refers to one or more sensory stimuli, such as, for example, one or more of taste (gustatory), smell (olfactory), touch (tactile) and temperature (thermal) stimuli. In certain non-limiting embodiments, the sensory experience of a subject exposed to a flavor can be classified as a characteristic experience for the particular flavor. For example, a flavor can be identified by the subject as being, but not limited to, a floral, citrus, berry, nutty, caramel, chocolate, peppery, smoky, cheesy, meaty, etc., flavor. As used herein, a flavor composition can be selected from a liquid, solution, dry powder, spray, paste, suspension and any combination thereof. The flavor can be a natural composition, an artificial composition, a nature identical, or any combination thereof.

As used interchangeably herein, "aroma" and "smell" refer to an olfactory response to a stimulus. For example, and not by way of limitation, an aroma can be produced by aromatic substances that are perceived by the odor receptors of the olfactory system.

As used herein, "flavor profile" refers to a combination of sensory stimuli, for example, tastes, such as sweet, sour, bitter, salty, umami, kokumi and free fatty acid tastes, and/or olfactory, tactile and/or thermal stimuli. In certain embodiments, the flavor profile comprises one or more flavors which contribute to the sensory experience of a subject. In certain embodiments, modifying, changing or varying the combination of stimuli in a flavor profile can change the sensory experience of a subject.

As used herein "admixing," for example, "admixing the flavor composition or combinations thereof of the present application with a food product," refers to the process where the flavor composition, or individual components of the flavor composition, is mixed with or added to the completed product or mixed with some or all of the components of the product during product formation or some combination of these steps. When used in the context of admixing, the term "product" refers to the product or any of its components. This admixing step can include a process selected from the step of adding the flavor composition to the product, spraying the flavor composition on the product, coating the flavor composition on the product, suspending the product in the flavor composition, painting the flavor composition on the product, pasting the flavor composition on the product, encapsulating the product with the flavor composition, mixing the flavor composition with the product and any combination thereof. The flavor composition can be a liquid, emulsion, dry powder, spray, paste, suspension and any combination thereof.

In certain embodiments, the compounds of a flavor composition can be generated during the processing of a pet food product, e.g., sterilization, retorting and/or extrusion, from precursor compounds present in the pet food product. In certain embodiments, a compound of a flavor composition can be generated during the processing of a pet food product and additional components of the flavor composition can be added to the pet food product by admixing.

As used herein, "ppm" means parts-per-million and is a weight relative parameter. A part-per-million is a microgram per gram, such that a component that is present at 10 ppm is present at 10 micrograms of the specific component per 1 gram of the aggregate mixture.

As used herein, "ppb" means parts-per-billion and is a weight relative parameter. A part-per-billion is a microgram per kilogram, such that a component that is present at 10 ppb is present at 10 micrograms of the specific component per 1 kilogram of the aggregate mixture.

As used herein, "palatability" can refer to the overall willingness of an animal to eat a certain food product. Increasing the "palatability" of a pet food product can lead to an increase in the enjoyment and acceptance of the pet food by the companion animal to ensure the animal eats a "healthy amount" of the pet food. The term "healthy amount" of a pet food as used herein refers to an amount that enables the companion animal to maintain or achieve an intake contributing to its overall general health in terms of micronutrients, macronutrients and calories, such as set out in the "Mars Petcare Essential Nutrient Standards." In certain embodiments, "palatability" can mean a relative preference of an animal for one food product over another. For example, when an animal shows a preference for one of two or more food products, the preferred food product is more "palatable," and has "enhanced palatability." In certain embodiments, the relative palatability of one food product compared to one or more other food products can be determined, for example, in side-by-side, free-choice comparisons, e.g., by relative consumption of the food products, or other appropriate measures of preference indicative of palatability. Palatability can be determined by a standard testing protocol in which the animal has equal access to both food products such as a test called "two-bowl test" or "versus test." Such preference can arise from any of the animal's senses, but can be related to, inter alia, taste, aftertaste, smell, mouth feel and/or texture.

The term "pet food" or "pet food product" means a product or composition that is intended for consumption by a companion animal, such as cats, dogs, guinea pigs, rabbits, fish, birds and horses. For example, but not by way of limitation, the companion animal can be a "domestic" cat such as *Felis domesticus*. In certain embodiments, the companion animal can be a "domestic" dog, e.g., *Canis lupus familiaris*. A "pet food" or "pet food product" includes any food, feed, snack, food supplement, liquid, beverage, treat, toy (chewable and/or consumable toys), and meal substitute or meal replacement.

As used herein "nutritionally-complete" refers to a pet food product that contains all known required nutrients for the intended recipient of the pet food product, in appropriate amounts and proportions based, for example, on recommendations of recognized or competent authorities in the field of companion animal nutrition. Such foods are therefore capable of serving as a sole source of dietary intake to maintain life, without the addition of supplemental nutritional sources.

As used herein "flavor composition" refers to at least one compound or biologically acceptable salt thereof that modulates, including enhancing, multiplying, potentiating, decreasing, suppressing, or inducing, the tastes, smells, flavors and/or textures of a natural or synthetic tastant, flavoring agent, taste profile, flavor profile and/or texture profile in an animal or a human. In certain embodiments, the flavor composition comprises a combination of compounds or biologically acceptable salts thereof. In certain embodiments, the flavor composition includes one or more excipients.

As used herein, the terms "modulates" or "modifies" refers an increase or decrease in the amount, quality or effect of a particular activity of a receptor and/or an increase or decrease in the expression, activity or function of a receptor. "Modulators," as used herein, refer to any inhibitory or activating compounds identified using in silico, in vitro and/or in vivo assays for, e.g., agonists, antagonists and their homologs, including fragments, variants and mimetics.

"Inhibitors" or "antagonists," as used herein, refer to modulating compounds that reduce, decrease, block, prevent, delay activation, inactivate, desensitize or downregulate biological activity and/or expression of receptors or pathway of interest.

"Inducers," "activators" or "agonists," as used herein, refer to modulating compounds that increase, induce, stimulate, open, activate, facilitate, enhance activation, sensitize or upregulate a receptor or pathway of interest.

In certain embodiments, an "active compound" is a compound that modulates, i.e., is active against, a taste receptor, e.g., a GPR92 receptor. For example, an active compound can be active against the GPR92 receptor as an agonist, antagonist, positive allosteric modulator (PAM), negative allosteric modulator, or by showing a mix of activities, for example, as agonist activity as well as positive allosteric modulation activity, or agonist activity as well as negative allosteric modulation activity.

As used herein, the terms "vector" and "expression vector" refer to DNA molecules that are either linear or circular, into which another DNA sequence fragment of appropriate size can be integrated. Such DNA fragment(s) can include additional segments that provide for transcription of a gene encoded by the DNA sequence fragment. The additional segments can include and are not limited to: promoters, transcription terminators, enhancers, internal ribosome entry sites, untranslated regions, polyadenylation signals, selectable markers, origins of replication and such like. Expression vectors are often derived from plasmids, cosmids, viral vectors and yeast artificial chromosomes. Vectors are often recombinant molecules containing DNA sequences from several sources.

The term "operably linked," when applied to DNA sequences, e.g., in an expression vector, indicates that the sequences are arranged so that they function cooperatively in order to achieve their intended purposes, i.e., a promoter sequence allows for initiation of transcription that proceeds through a linked coding sequence as far as the termination signal.

The term "nucleic acid molecule" and "nucleotide sequence," as used herein, refers to a single or double stranded covalently-linked sequence of nucleotides in which the 3' and 5' ends on each nucleotide are joined by phosphodiester bonds. The nucleic acid molecule can include deoxyribonucleotide bases or ribonucleotide bases, and can be manufactured synthetically in vitro or isolated from natural sources.

The terms "polypeptide," "peptide," "amino acid sequence" and "protein," used interchangeably herein, refer to a molecule formed from the linking of at least two amino acids. The link between one amino acid residue and the next is an amide bond and is sometimes referred to as a peptide bond. A polypeptide can be obtained by a suitable method known in the art, including isolation from natural sources, expression in a recombinant expression system, chemical synthesis or enzymatic synthesis. The terms can apply to amino acid polymers in which one or more amino acid residue is an artificial chemical mimetic of a corresponding naturally occurring amino acid, as well as to naturally occurring amino acid polymers and non-naturally occurring amino acid polymers.

The term "amino acid," as used herein, refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, e.g., hydroxyproline, gamma-carboxyglutamate and O-phosphoserine. Amino acid analogs and derivatives can refer to compounds that have the same basic chemical structure as a naturally occurring amino acid, i.e., a carbon that is bound to a hydrogen, a carboxyl group, an amino group and an R group, e.g., homoserine, norleucine, methionine sulfoxide and methionine methyl sulfonium. Such analogs can have modified R groups (e.g., norleucine) or modified peptide backbones, but retain the same basic chemical structure as a naturally occurring amino acid. Amino acid mimetics means chemical compounds that have a structure that is different from the general chemical structure of an amino acid, but that functions in a manner similar to a naturally occurring amino acid.

The terms "isolated" or "purified," used interchangeably herein, refers to a nucleic acid, a polypeptide, or other biological moiety that is removed from components with which it is naturally associated. The term "isolated" can refer to a polypeptide that is separate and discrete from the whole organism with which the molecule is found in nature or is present in the substantial absence of other biological macromolecules of the same type. The term "isolated" with respect to a polynucleotide can refer to a nucleic acid molecule devoid, in whole or part, of sequences normally associated with it in nature; or a sequence, as it exists in nature, but having heterologous sequences in association therewith; or a molecule disassociated from the chromosome.

As used herein, the term "recombinant" can be used to describe a nucleic acid molecule and refers to a polynucleotide of genomic, RNA, DNA, cDNA, viral, semisynthetic or synthetic origin which, by virtue of its origin or manipulation is not associated with all or a portion of polynucleotide with which it is associated in nature.

The term "fusion," as used herein, refers to joining of different peptide or protein segments by genetic or chemical methods wherein the joined ends of peptide or protein segments can be directly adjacent to each other or can be separated by linker or spacer moieties such as amino acid residues or other linking groups.

The term "alkyl" refers to a straight or branched $C_1$-$C_{20}$ hydrocarbon group consisting solely of carbon and hydrogen atoms, containing no unsaturation, and which is attached to the rest of the molecule by a single bond, e.g., methyl, ethyl, n-propyl, 1-methylethyl (isopropyl), n-butyl, n-pentyl, 1,1-dimethylethyl (t-butyl).

2. GPR92 Receptor

The presently disclosed subject matter provides GPR92 receptors for use in the disclosed methods. The GPR92 receptors of the present disclosure can include mammalian GPR92 receptors such as, but not limited to, feline, canine and human GPR92 receptors.

In certain non-limiting embodiments, the GPR92 receptor of the present disclosure is encoded by a nucleic acid as described by International Application No. PCT/US17/027626, filed Apr. 14, 2017, which is incorporated by reference in its entirety herein. In certain non-limiting embodiments, the GPR92 receptor of the present disclosure comprises an amino acid sequence as described by International Application No. PCT/US17/027626, filed Apr. 14, 2017.

In certain non-limiting embodiments, the GPR92 receptor comprises a feline, canine or human GPR92 receptor nucleotide sequence as described by International Application No. PCT/US17/027626, filed Apr. 14, 2017.

In certain non-limiting embodiments, the GPR92 receptor comprises a feline, canine or human GPR92 receptor amino acid sequence as described by International Application No. PCT/US17/027626, filed Apr. 14, 2017.

In certain embodiments, the GPR92 receptor for use in the presently disclosed subject matter can include a receptor comprising a nucleotide sequence having at least 85%, at least 90%, at least 91%, at least 92%, at least 93%, at least 94%, at least 95%, at least 96%, at least 97%, at least 98% or at least 99% identity to a feline, canine or human GPR92 receptor nucleotide sequence, e.g., a feline, canine or human GPR92 receptor nucleotide sequence set forth in SEQ ID NO: 1, 2 or 3, respectively.

In certain embodiments, the GPR92 receptor for use in the presently disclosed subject matter can include a receptor comprising an amino acid sequence having at least 85%, at least 90%, at least 91%, at least 92%, at least 93%, at least 94%, at least 95%, at least 96%, at least 97%, at least 98% or at least 99% identity to a feline, canine or human GPR92 receptor amino acid sequence, e.g., a feline, canine or human GPR92 receptor amino acid sequence set forth in SEQ ID NO: 4, 5 or 6, respectively.

In certain embodiments, the disclosed subject matter provides for the use of an isolated or purified GPR92 receptor and/or variants and fragments thereof. The disclosed subject matter also encompasses the use of sequence variants. In certain embodiments, variation can occur in either or both the coding and non-coding regions of a nucleotide sequence of a GPR92 receptor. Variants can include a substantially homologous protein encoded by the same genetic locus in an organism, i.e., an allelic variant. Variants also encompass proteins derived from other genetic loci in an organism, e.g., feline, but having substantial homology to the GPR92 receptor, i.e., a homolog. Variants can also include proteins substantially homologous to the GPR92 receptor but derived from another organism, i.e., an ortholog. Variants also include proteins that are substantially homologous to the GPR92 receptor that are produced by chemical synthesis. Variants also include proteins that are substantially homologous to the GPR92 receptor that are produced by recombinant methods.

The disclosed subject matter also provides for fusion proteins that comprise a GPR92 receptor, or fragment thereof. In certain embodiments, a fusion protein of the present disclosure can include a detectable marker, a functional group such as a carrier, a label, a stabilizing sequence or a mechanism by which GPR92 receptor agonist binding can be detected. Non-limiting embodiments of a label include a FLAG tag, a His tag, a MYC tag, a maltose binding protein and others known in the art. The presently disclosed subject matter also provides nucleic acids encoding such fusion proteins, vectors containing fusion protein-encoding nucleic acids and host cells comprising such nucleic acids or vectors. In certain embodiments, fusions can be made at the amino terminus (N-terminus) of a GPR92 receptor or at the carboxy terminus (C-terminus) of a GPR92 receptor.

In certain embodiments, the GPR92 receptors disclosed herein can contain additional amino acids at the N-terminus and/or at the C-terminus end of the sequences, e.g., when used in the methods of the disclosed subject matter. In certain embodiments, the additional amino acids can assist with immobilizing the polypeptide for screening purposes, or allow the polypeptide to be part of a fusion protein, as disclosed above, for ease of detection of biological activity.

3. GPR92 Receptor Modulating Compounds

The present disclosure relates to flavor compositions comprising at least one compound that can modulate the activity of a GPR92 receptor, e.g., a fGPR92 receptor. In certain embodiments, the compositions comprise a phospholipid. The compounds disclosed herein were identified through an in vitro assay wherein the ability of the compounds to activate a feline GPR92 receptor (fGPR92) expressed by cells in culture was determined, and/or an in silico assay, wherein the compounds' ability to bind to fGPR92 was determined in silico. The flavor compositions can be used to enhance or modify the palatability, taste or flavor of pet food products. In certain embodiments, the compounds are comprised in a flavor composition without other palatability enhancing agents. In certain embodiments, the compounds are comprised in one or more flavor compositions with one or more additional palatability enhancing agents, for example, nucleotides, nucleotide derivatives, amino acids, furanones, fatty acid receptor activating compounds, umami receptor activating compounds, and calcium-sensing receptor activating compounds described herein.

In certain embodiments, the GPR92 receptor modulating compounds, which can be referred to as GPR92 receptor modulators, of the present application are identified through in silico modeling of a GPR92 receptor e.g., a fGPR92 receptor, wherein the GPR92 receptor modulators of the present application comprise a structure that fits within a binding site of the GPR92 receptor.

In certain embodiments, the GPR92 receptor modulators of the present application are identified through an in vitro method, e.g., wherein the GPR92 receptor agonist compounds activate and/or modulate a GPR92 receptor, disclosed herein, expressed by cells in vitro. In certain embodiments, the in vitro method comprises the in vitro methods described herein and in the Examples section of the present application.

In certain embodiments, at least one GPR92 receptor modulating compound is a compound of Formula I comprising the structure:

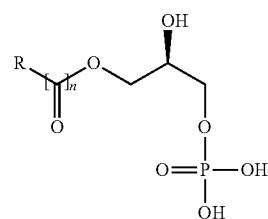

or any salt thereof,
wherein n is 0 or 1; and R is a substituted or unsubstituted hydrocarbon chain.

In particular embodiments, the compound of Formula I is selected from the group consisting of 1-(9Z-octadecenyl)-2-hydroxy-sn-glycero-3-phosphate (LPA C18:1),
1-myristoyl-2-hydroxy-sn-glycero-3-phosphate (LPA 14:0),
1-palmitoyl-2-hydroxy-sn-glycero-3-phosphate (LPA 16:0),
1-stearoyl-2-hydroxy-sn-glycero-3-phosphate (LPA 18:0),
D-(+)-sn-1-O-linoleoyl-glyceryl-3-phosphate (LPA 18:2).
D-H-sn-1-O-linolenoyl-glyceryl-3-phosphate (LPA 18:3),
1-oleoyl-2-hydroxy-sn-glycero-3-phosphate (LPA 18:1),
1-hexadecyl-2-hydroxy-sn-glycero-3-phosphate (AGP 16:0),
1-octadecyl lysophosphatidic Acid (1-Octadecyl LPA),
1-heptadecanoyl-2-hydroxy-sn-glycero-3-phosphate (LPA 17:0),
(R)-2-amino-3-((3-octylphenyl)amino)-3-oxopropyl dihydrogen phosphate (VPC 23019, Cayman),
D-(+)-sn-1-O-arachidonoyl-glyceryl-3-phosphate (LPA 20:4), and
any analog or derivative thereof,
and any combination thereof.

In certain embodiments, at least one GPR92 receptor modulating compound is a compound of Formula II comprising the structure:

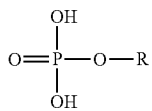

or any salt thereof,
wherein R is a substituted or unsubstituted hydrocarbon chain.

In particular embodiments, the compound of Formula II is selected from the group consisting of 9Z-octadecenyl phosphate, sphingosine-1-phosphate, 1-mercaptoundecylphosphoric acid, trans,trans-farnesyl monophosphate, and any analog or derivative thereof, and any combination thereof.

In certain embodiments, R is a hydrocarbon chain having a carbon length of between about $C_2$ and about $C_{40}$, or between about $C_4$ and about $C_{35}$, or between about $C_6$ and about $C_{30}$, or between about $C_8$ and about $C_{28}$, or between about $C_{10}$ and about $C_{26}$, or between about $C_{12}$ and about $C_{24}$, or between about $C_{14}$ and about $C_{22}$, or between about $C_{16}$ and about $C_{20}$. In certain embodiments, the hydrocarbon chain has a carbon length of between about $C_{14}$ and about $C_{22}$.

In certain embodiments, the hydrocarbon chain can be unsubstituted or substituted with one or more of H, $CH_3$, $C_1$-$C_{20}$ alkyl, COOH, $SO_3H$, CHO, $C(O)R_1$, $C=CR_1R_2$, $C=NOH$, $OP(O)(OR_1)(OR_2)$, $OR_1$, $SR_1$, CN, $COOR_1$, $CONR_1R_2$, $NO_2$, NHOH, F, Cl, Br, I, and $NR_1R_2$, where $R_1$, $R_2$ are each independently selected from H and branched or unbranched lower alkyl (e.g., $C_1$-$C_6$).

In certain embodiments the hydrocarbon chain comprises zero to eight double bonds, for example, positioned alternately with single bonds along the hydrocarbon chain. In certain embodiments, the compound is an (E) isomer. In certain embodiments, the compound is a (Z) isomer. In certain embodiments, the double bonds can optionally be substituted with one or more of hydrogen, methyl, or lower alkyl groups, for example, an alkyl having a carbon length of between about $C_1$ and Cu.

In certain embodiments, one or more of the carbons in the hydrocarbon chain is substituted by an oxygen, sulfur, nitrogen, ketone, sulfone, sulfoxide, amide, urea, or sulfonamide.

In certain embodiments, the compounds of the present disclosure comprise one or more negatively charged groups attached to a hydrocarbon chain. In certain embodiments, the negatively charged group comprises, for example, a carboxyl group, or a bioisosteric replacement for a caboxylate such as, but not limited to, a phosphate, boronic acid, phosphoester, phosphodiester, phosphinic acid, sulfonamide, malonic acid, 2-sulfoacetic acid, sulfonic acid, hydroxamic acid, tetrazole, hydroxylurea, phosphoramide, or any other bioisosteric replacement for a caboxylate known to a practitioner in the art.

In certain embodiments, at least one GPR92 receptor modulating compound is selected from the following compounds:

1-(9Z-octadecenyl)-2-hydroxy-sn-glycero-3-phosphate (also known as lysophosphatidic acid, LPA, LPA C18:1, and AGP 18:1),
1-myristoyl-2-hydroxy-sn-glycero-3-phosphate (also known as LPA 14:0 and myristoyl lysophosphatidic acid),
1-palmitoyl-2-hydroxy-sn-glycero-3-phosphate (also known as LPA 16:0 and palmitoyl lysophosphatidic acid),
1-stearoyl-2-hydroxy-sn-glycero-3-phosphate (also known as LPA 18:0),
D-(+)-sn-1-O-linoleoyl-glyceryl-3-phosphate (also known as LPA 18:2, 1-linoleoyl-2-hydroxy-sn-glycero-3-phosphate and linoleoyl LPA),
D-(+)-sn-1-O-linolenoyl-glyceryl-3-phosphate (also known as LPA 18:3 and linolenoyl LPA),
1-oleoyl-2-hydroxy-sn-glycero-3-phosphate (also known as LPA 18:1),
1-hexadecyl-2-hydroxy-sn-glycero-3-phosphate (also known as AGP 16:0, alkyl-glycerol phosphate 16:0 and 1-Hexadecyl LPA),
1-octadecyl Lysophosphatidic Acid (also known as 1-Octadecyl LPA, LPA 0-18:0 and LPA 18:0e),
1-heptadecanoyl-2-hydroxy-sn-glycero-3-phosphate (LPA 17:0),
9Z-octadecenyl phosphate (also known as octadecenyl phosphate),
16:0 Lyso-PG 1-palmitoyl-2-hydroxy-sn-glycero-3-phosphoglycerol,
(R)-2-amino-3-((3-octylphenyl)amino)-3-oxopropyl dihydrogen phosphate (VPC 23019, Cayman),
sphingosine-1-phosphate,
D-(+)-sn-1-O-arachidonoyl-glyceryl-3-phosphate (LPA 20:4),
1 mercaptoundecylphosphoric acid,
trans,trans-farnesyl monophosphate;
any analog or derivative thereof,
and any combination thereof.

In certain embodiments, the compound is disodium pyrophosphate ($Na_2H_2P_2O_7$) or sodium tripolyphosphate ($Na_5P_3O_{10}$). In certain embodiments, the compound is comprised in fish hydrolysate or in GPR92 peptone.

The present disclosure also provides for salts, stereoisomers and comestible forms of the compounds described herein.

In certain embodiments, the compound is a saturated phospholipid.

In certain embodiments, the compound is an unsaturated or polyunsaturated phospholipid.

In certain embodiments, the GPR92 receptor modulators of the present disclosure comprise a salt of the GPR92 receptor modulator, for example, but not limited to, an acetate salt or a formate salt. In certain embodiments, the GPR92 receptor modulator salt comprises an anion (−) (for example, but not limited to, $Cl^-$, $O^{2-}$, $CO_3^{2-}$, $HCO_3^-$, $OH^-$, $NO_3^-$, $PO_4^{3-}$, $SO_4^{2-}$, $CH_3COO^-$, $HCOO^-$ and $C_2O_4^{2-}$) bonded via an ionic bond with a cation (+) (for example, but not limited to, $Al^{3+}$, $Ca^{2+}$, $Na^+$, $K^+$, $Cu^{2+}$, $H^+$, $Fe^{3+}$, $Mg^{2+}$, $NH_4^+$ and $H_3O^+$). In other embodiments, the GPR92 receptor agonist salt comprises a cation (+) bonded via an ionic bond with an anion (−). In certain embodiments, the compounds of the present disclosure comprise a sodium salt or potassium salt of the compound.

In certain embodiments, the GPR92 receptor modulators of the present application are identified through in silico modeling of a GPR92 receptor (such as a GPR92 receptor), e.g., a feline or a canine GPR92 receptor, wherein the GPR92 receptor modulating compounds of the present application comprise a structure that fits within a binding site of the GPR92 receptor.

In certain embodiments, the GPR92 receptor modulators of the present application are identified through an in vitro method, wherein the GPR92 receptor agonist compounds activate and/or modulate a GPR92 receptor, disclosed herein, expressed by cells in vitro. In certain embodiments, the in vitro method comprises the in vitro methods described herein and in the Examples section of the present application.

In certain embodiments, the compounds are comprised in a flavor composition without other palatability enhancing agents. In certain embodiments, the compounds are comprised in a composition with one or more additional palatability enhancing agents, for example, nucleotides, nucleotide derivatives, amino acids, furanones and the GPR92 receptor modulating compounds described herein.

In certain embodiments, a compound disclosed herein are comprised in a flavor composition in an amount of from about 0.001% to about 100% w/w, from about 0.1% to about 99.9% w/w, from about 1% to about 99% w/w, from about 1% to about 80% w/w, from about 1% to about 50% w/w, from about 1% to about 20% w/w, from about 50% to about 100% w/w, from about 20% to about 80% w/w, from about 30% to about 70% w/w.

4. Methods for Identifying GPR92 Receptor Modulating Compounds

The present disclosure further provides methods for identifying compounds that modulate the activity and/or expression of a GPR92 receptor. For example, and not by way of limitation, the modulator can be an agonist or an antagonist. The presently disclosed subject matter provides in silico and in vitro methods for identifying compounds that modulate the activity and/or expression of a GPR92 receptor, disclosed above.

4.1 in Silico Methods

The presently disclosed subject matter further provides in silico methods for identifying compounds that can potentially interact with a GPR92 receptor and/or modulate the activity and/or expression of a GPR92 receptor.

In certain embodiments, the method can include predicting the three-dimensional structure (3D) of GPR92 and screening the predicted 3D structure with putative GPR92 modulating compounds (i.e., test compounds). The method can further include predicting whether the putative compound would interact with the binding site of the receptor by analyzing the potential interactions with the putative compound and the amino acids of the receptor. The method can further include identifying a test compound that can bind to and/or modulate the biological activity of GPR92 by determining whether the 3D structure of the compound fits within the binding site of the 3D structure of the receptor.

In certain embodiments, GPR92 for use in the disclosed method can have the amino acid sequence of SEQ ID NO: 4, 5 or 6, or a fragment or variant thereof. In certain embodiments, GPR92 for use in the presently disclosed subject matter can include a receptor comprising an amino acid sequence having at least 85%, at least 90%, at least 91%, at least 92%, at least 93%, at least 94%, at least 95%, at least 96%, at least 97%, at least 98% or at least 99% identity to SEQ ID NO: 4, 5 or 6, or a fragment or variant thereof. In certain embodiments, GPR92 for use in the disclosed method can have the nucleotide sequence of SEQ ID NO: 1, 2 or 3, or a fragment or variant thereof. In certain embodiments, GPR92 for use in the presently disclosed subject matter can include a receptor comprising a nucleotide sequence having at least 85%, at least 90%, at least 91%, at least 92%, at least 93%, at least 94%, at least 95%, at least 96%, at least 97%, at least 98% or at least 99% identity to SEQ ID NO: 1, 2 or 3, or a fragment or variant thereof.

Non-limiting examples of compounds (e.g., potential GPR92 modulators) that can be tested using the disclosed methods include any small chemical compound, or any biological entity, such as peptides, salts, and amino acids known in the art. In certain embodiments, the test compound can be a small chemical molecule. In certain embodiments, the test compound can be a protein hydrolysate. In certain embodiments, the test compound can be a GPR92 agonist, for example, but not limited to, NAG (N-Arachidonylglycine), FPP (3,7,11-Trimethyl-2,6,10-dodecatrien-1-yl pyrophosphate), LPA (18:0) (1-stearoyl-2-hydroxy-sn-glycero-3-phosphate), CPA (18:1) (1-oleoyl-sn-glycero-2,3-cyclic-phosphate), LPA (14:0) (1-myristoyl-2-hydroxy-sn-glycero-3-phosphate), LPA (16:0) (1-palmitoyl-2-hydroxy-sn-glycero-3-phosphate), and LPA (18:1) (1-oleoyl-2-hydroxy-sn-glycero-3-phosphate). In certain embodiments, the test compound can be farnesyl monophosphate (FMP), alkyl-glycerophosphate (AGP, also known as alkyl-LPA), cyclic phosphatidic acid (CPA); carba-CPA (CCPA), 2-carba-CPA (2CCPA), or 3-carba-CPA (3CCPA). In certain embodiments, the test compound can be any GPR92 agonists disclosed in Williams, et al., The Journal of Biological Chemistry VOL. 284, NO. 25, pp. 17304-17319, Jun. 19, 2009. In certain embodiments, the test compound can be LPA C18:1 (1-(9Z-octadecenyl)-2-hydroxy-sn-glycero-3-phosphate), AGP 16:0 (1-hexadecyl-2-hydroxy-sn-glycero-3-phosphate) or octadecenyl phosphate (9Z-octadecenyl phosphate). In certain embodiments, the test compound can be 16:0 lyso-PG 1-palmitoyl-2-hydroxy-sn-glycero-3-phosphoglycerol, (R)-2-amino-3-((3-octylphenyl)amino)-3-oxopropyl dihydrogen phosphate (VPC 23019, Cayman), Sphingosine-1-phosphate, D-(+)-sn-1-O-arachidonoyl-glyceryl-3-phosphate (LPA 20:4), 1-mercaptoundecylphosphoric acid or trans,trans-farnesyl monophosphate.

In certain embodiments, structural models of a GPR92 receptor can be built using crystal structures of other GPCRs as templates for homology modeling. For example, and not by way of limitation, structural models can be generated using the crystal structures of other Class A GPCRs. In certain embodiments, a structural model of GPR92 can be based on a known or a combination of known crystal structures of Class A GPCRs. (See, e.g., Lee et al., Eur. J Pharmacol. 2015 May 14. pii: S0014-2999(15)30012-1, and Berman et al., Nucleic Acids Research, 28: 235-242 (2000), each of which is incorporated by reference in its entirety herein). Examples of crystal structures of other Class A GPCRs include 4N6H of the Human Delta Opioid receptor;

and/or 4MBS of the CCR5 Chemokine Receptor; and/or 4PHU of the human GPR40. Any suitable modeling software known in the art can be used. In certain embodiments, the Modeller software package (Eswar et al., Curr Protoc Bioinformatics, John Wiley & Sons, Inc., Supplement 15, 5.6.1-5.6.30 (2006)) and/or the I-TASSER suite of programs (Yang et al., Nature Methods, 12: 7-8 (2015) can be used to generate the three-dimensional protein structure.

In certain embodiments, the in silico methods of identifying a compound that binds to GPR92 comprises determining whether a test compound interacts with one or more amino acids of a GPR92 interacting domain, as described herein.

Compounds that are identified by the disclosed in silico methods can be further tested using the in vitro methods disclosed herein.

4.2 GPR92 Receptor Binding Site

The present application provides for methods of screening for compounds that modulate the activity of a GPR92 receptor, for example, a feline, canine or human GPR92 receptor, wherein the compounds interact with one or more amino acids of the GPR92 receptor. In certain embodiments, the binding site of a GPR92 receptor comprises amino acids within the transmembrane domain, for example, 7-transmembrane (7TM) domain, of the receptor, and can be identified by generating an interaction map of the receptor using in silico modeling, as described herein. In one non-limiting example, the presence of an amino acid in the transmembrane interaction map means that the residue is in the vicinity of the ligand binding environment, and interacts with the ligand.

In certain embodiments, the interaction between a compound and one or more amino acids of the GPR92 receptors described herein can comprises one or more hydrogen bond, covalent bond, non-covalent bond, salt bridge, physical interaction, and combinations thereof. The interactions can also be any interaction characteristic of a ligand receptor interaction known in the art. Such interactions can be determined by, for example, site directed mutagenesis, x-ray crystallography, x-ray or other spectroscopic methods, Nuclear Magnetic Resonance (NMR), cross-linking assessment, mass spectroscopy or electrophoresis, cryo-microscopy, displacement assays based on known agonists, structural determination and combinations thereof. In certain embodiments, the interactions are determined in silico, for example, by theoretical means such as docking a compound into a feline or canine GPR92 receptor binding pocket as described herein, for example, using molecular docking, molecular modeling, molecular simulation, or other means known to persons of ordinary skill in the art.

In certain embodiments, the interaction is a hydrogen bond interaction.

In certain embodiments, the interaction is a hydrophobic interaction.

In certain embodiments, the compounds identified according to the methods described herein that modulate the activity of a GPR92 receptor interact with one or more amino acids in a transmembrane domain of the GPR92 receptor, for example, a seven transmembrane domain (7TM). In certain embodiments, the amino acids that the compounds interact with comprise 1, 2, 3, 4, 5, 6, 7, 8, 9, 10, 11, 12, 13, 14, 15, 16, 17, 18, 19 or more of Arg83 on Helix 2; Gly103, Phe106, Gln107, Met110, Cys114 on Helix 3; Thr161, His165 on Helix 4; Ala200, Gly204, Pro208 on Helix 5; Phe248, Phe252, Tyr255, Asn256, Leu259 on Helix 6; Arg281, Met285, Val288 on Helix 7; and Glu182 on the second extracellular (EC2) loop of a GPR92 receptor, for example, a GPR92 receptor comprising a feline GPR92 receptor, or the corresponding amino acids of a canine GPR92 receptor or a human GPR92 receptor.

In certain embodiments, the methods for identifying a composition that modulates the activity of a feline GPR92 receptor comprises (a) contacting a test agent with a GPR92 receptor, for example, a feline GPR92 receptor comprising an amino acid sequence of SEQ ID NO: 4, (b) detecting an interaction between the test agent and one or more amino acids in an interacting site of the GPR92 receptor selected from the group consisting of Arg83 on Helix 2; Gly103, Phe106, Gln107, Met110, Cys114 on Helix 3; Thr161, His165 on Helix 4; Ala200, Gly204, Pro208 on Helix 5; Phe248, Phe252, Tyr255, Asn256, Leu259 on Helix 6; Arg281, Met285, Val288 on Helix 7; Glu182 on the second extracellular ($EC_2$) loop; and combinations thereof, and (c) selecting as the composition, a test agent that interacts with one or more of the amino acids.

In certain embodiments, the method further comprises determining the activity of the GPR92 receptor after step (a), and selecting as the composition, a test agent that increases the activity of the GPR92 receptor.

In certain embodiments, the method further comprises contacting the GPR92 receptor with a ligand, for example an agonist, and selecting as the composition, a test agent that increases or enhances the agonist's ability to activate the GPR92 receptor.

4.3 In Vitro Methods

The presently disclosed subject matter further provides in vitro methods for identifying compounds that can modulate the activity and/or expression of a GPR92 receptor.

The GPR92 receptors for use in the presently disclosed methods can include isolated or recombinant GPR92 receptors or cells expressing a GPR92 receptor, disclosed herein. In certain embodiments, the GPR92 receptor for use in the disclosed methods can have an amino acid or nucleotide sequence as described by International Application No. PCT/US17/027626, filed Apr. 14, 2017, or a fragment or variant thereof.

In certain embodiments, the method for identifying compounds that modulate the activity and/or expression of a GPR92 receptor comprises measuring the biological activity of a GPR92 receptor in the absence and/or presence of a test compound. In certain embodiments, the method can include measuring the biological activity of a GPR92 receptor in the presence of varying concentrations of the test compound. The method can further include identifying the test compounds that result in a modulation of the activity and/or expression of the GPR92 receptor compared to the activity and/or expression of the GPR92 receptor in the absence of the test compound.

In certain embodiments, the compounds identified according to the methods described herein increase the biological activity of a GPR92 receptor by at least about 5%, 10%, 15%, 20%, 25%, 30%, 35%, 40%, 45%, 50%, 55%, 60%, 65%, 70%, 75%, 80%, 85%, 90%, 95%, 100%, or more, compared to the biological activity of the GPR92 receptor when the compound is not present. In certain embodiments, the compounds identified according to the methods described herein increase the biological activity of a GPR92 receptor by at least about 30% compared to the biological activity of the GPR92 receptor when the compound is not present.

In certain embodiments, the method can further include analyzing two or more, three or more or four or more test compounds in combination. In certain embodiments, the two or more, three or more or four or more test compounds can be from different classes of compounds, e.g., amino acids and small chemical compounds. For example, and not by way of limitation, the method can include analyzing the effect of one or more small chemical test compounds on the biological activity and/or expression of a GPR92 receptor in the presence of one or more amino acid test compounds. In certain embodiments, the method for identifying a compound's effect on the activity and/or expression of a GPR92 receptor comprises analyzing the effect of a test compound on the biological activity and/or expression of a GPR92 receptor in the presence of one or more nucleotide or nucleotide derivative test compounds.

In certain embodiments, the method for identifying compounds that modulate the activity and/or expression of a GPR92 receptor comprises determining whether a compound modulates the receptor directly, for example, as an agonist or antagonist. In certain embodiments, the method comprises determining whether a compound indirectly modulates the activity of the receptor (e.g., as an allosteric modulator), for example, by enhancing or decreasing the effect of other compounds on activating or inhibiting receptor activity.

In certain embodiments, the method for identifying compounds that modulate the activity and/or expression of a GPR92 receptor comprises expressing a GPR92 receptor in a cell line and measuring the biological activity of the receptor in the presence and/or absence of a test compound. The method can further comprise identifying test compounds that modulate the activity of the receptor by determining if there is a difference in receptor activation in the presence of a test compound compared to the activity of the receptor in the absence of the test compound. In certain embodiments, the selectivity of the putative GPR92 receptor modulator can be evaluated by comparing its effects on other GPCRs or taste receptors, e.g., umami, CaSR, T1R, etc. receptors.

Activation of the receptor in the disclosed methods can be detected using a labelling compound and/or agent. In certain embodiments, the activity of the GPR92 receptor can be determined by the detection of secondary messengers such as, but not limited to, cAMP, cGMP, IP3, DAG or calcium. In certain embodiments, the activity of the GPR92 receptor can be determined by the detection of the intracellular calcium levels. Monitoring can be by way of luminescence or fluorescence detection, such as by a calcium sensitive fluorescent dye. In certain embodiments, the intracellular calcium levels can be determined using a cellular dye, e.g., a fluorescent calcium indicator such as Calcium 4. In certain embodiments, the intracellular calcium levels can be determined by measuring the level of calcium binding to a calcium-binding protein, for example, calmodulin. Alternatively and/or additionally, activity of the GPR92 receptor can be determined by detection of the phosphorylation, transcript levels and/or protein levels of one or more downstream protein targets of the GPR92 receptor.

The cell line used in the disclosed methods can include any cell type that is capable of expressing a GPR92 receptor. Non-limiting examples of cells that can be used in the disclosed methods include HeLa cells, Chinese hamster ovary cells (CHO cells), African green monkey kidney cells (COS cells), *Xenopus* oocytes, HEK-293 cells and murine 3T3 fibroblasts. In certain embodiments, the method can include expressing a GPR92 receptor in CHO-K1 cells. In certain embodiments, the method can include expressing a GPR92 receptor in HEK-293 cells. In certain embodiments, the method can include expressing a GPR92 receptor in COS cells. In certain embodiments, the cells constitutively express the GPR92 receptor. In another embodiment, expression of the GPR92 receptor by the cells is inducible.

In certain embodiments, the cell expresses a calcium-binding photoprotein, wherein the photoprotein luminesces upon binding calcium. In certain embodiments, the calcium binding photoprotein comprises the protein clytin. In certain embodiments the clytin is a recombinant clytin. In certain embodiments, the clytin comprises an isolated clytin, for example, a clytin isolated from *Clytia gregarium*. In certain embodiments, the calcium-binding photoprotein comprises the protein aequorin, for example, a recombinant aequorin or an isolated aequorin, such as an aequorin isolated from *Aequorea victoria*. In certain embodiments, the calcium-binding photoprotein comprises the protein obelin, for example, a recombinant obelin or an isolated obelin, such as an obelin isolated from *Obelia longissima*.

In certain embodiments, expression of a GPR92 receptor in a cell can be performed by introducing a nucleic acid encoding a GPR92 receptor into the cell. For example, and not by way of limitation, a nucleic acid having the nucleotide sequence set forth in International Application No. PCT/US17/027626, filed Apr. 14, 2017, or a fragment thereof, can be introduced into a cell. In certain embodiments, the introduction of a nucleic acid into a cell can be carried out by any method known in the art, including but not limited to transfection, electroporation, microinjection, infection with a viral or bacteriophage vector containing the nucleic acid sequences, cell fusion, chromosome-mediated gene transfer, microcell-mediated gene transfer, spheroplast fusion, etc. Numerous techniques are known in the art for the introduction of foreign genes into cells (see, e.g., Loeffler and Behr, Meth. Enzymol. 217:599-618 (1993); Cohen et al., Meth. Enzymol. 217:618-644 (1993); Cline, Pharmacol. Ther. 29:69-92 (1985), the disclosures of which are hereby incorporated by reference in their entireties) and can be used in accordance with the disclosed subject matter. In certain embodiments, the technique can provide for stable transfer of nucleic acid to the cell, so that the nucleic acid is expressible by the cell and inheritable and expressible by its progeny. In certain embodiments, the technique can provide for a transient transfer of the nucleic acid to the cell, so that the nucleic acid is expressible by the cell, wherein heritability and expressibility decrease in subsequent generations of the cell's progeny.

In certain embodiments, the method can include identifying compounds that bind to a GPR92 receptor. The method can comprise contacting a GPR92 receptor with a test compound and measuring binding between the compound and the GPR92 receptor. For example, and not by way of limitation, the methods can include providing an isolated or purified GPR92 receptor in a cell-free system, and contacting the receptor with a test compound in the cell-free system to determine if the test compound binds to the GPR92 receptor. In certain embodiments, the method can comprise contacting a GPR92 receptor expressed on the surface of a cell with a test compound and detecting binding of the test compound to the GPR92 receptor. The binding can be measured directly, e.g., by using a labeled test compound, or can be measured indirectly. In certain embodiments, the detection comprises detecting a physiological event in the cell caused by the binding of the compound to the GPR92 receptor, e.g., an increase in the intracellular calcium levels. For example, and not by way of limitation, detection can be performed by way of fluorescence detection, such as a calcium sensitive fluorescent dye, by detection of luminescence, or any other method of detection known in the art.

In certain non-limiting embodiments, the in vitro assay comprises cells expressing a GPR92 receptor that is native to the cells. Examples of such cells expressing a native GPR92 receptor include, for example but not limited to, dog (canine) and/or cat (feline) taste cells (e.g., primary taste receptor cells). In certain embodiments, the dog and/or cat taste cells expressing a GPR92 receptor are isolated from a dog and/or cat and cultured in vitro. In certain embodiments, the taste receptor cells can be immortalized, for example, such that the cells isolated from a dog and/or cat can be propagated in culture.

In certain embodiments, expression of a GPR92 receptor in a cell can be induced through gene editing, for example, through use of the CRISPR gene editing system to incorporate a GPR92 receptor gene into the genome of a cell, or to edit or modify a GPR92 receptor gene native to the cell.

In certain embodiments, the in vitro methods of identifying a compound that binds to a GPR92 receptor comprises determining whether a test compound interacts with one or more amino acids of a GPR92 receptor interacting domain, as described herein.

In certain embodiments, compounds identified as modulators of a GPR92 receptor can be further tested in other analytical methods including, but not limited to, in vivo assays, to confirm or quantitate their modulating activity.

In certain embodiments, methods described herein can comprise determining whether the GPR92 receptor modulator is a GPR92 taste enhancing compound, e.g., a GPR92 receptor agonist.

In certain embodiments, the methods of identifying a GPR92 receptor modulator can comprise comparing the effect of a test compound to a GPR92 receptor agonist. For example, a test compound that increases the activity of the receptor compared to the activity of the receptor when contacted with a GPR92 receptor agonist can be selected as a GPR92 receptor modulating compound (e.g., as an agonist).

In certain embodiments, the methods of identifying a GPR92 receptor modulator can comprise determining whether a test compound modulates the activity of the receptor when the receptor is contacted with an agonist, or whether the test compound can modulate the activity of a positive allosteric modulator (PAM). Test compounds that increase or decrease the effect of said agonist or PAM on the receptor can be selected as a GPR92 receptor modulating compound (e.g., as an allosteric modulator).

5. Flavor Compositions

In certain embodiments, the flavor compositions of the present disclosure can be used to increase the palatability of pet food products, such as cat food products. The flavor compositions can include combinations of compounds, and can be added to the pet food product in various delivery systems.

In certain embodiments, the present disclosure relates to methods for modulating the GPR92 taste (for example, the activity of a GPR92, including fGPR92) and/or the palatability of a pet food product comprising: a) providing at least one pet food product, or a precursor thereof, and b) combining the pet food product, or precursor thereof, with at least an effective amount of at least one flavor composition, for example, comprising one or more compounds, or a comestibly acceptable salt thereof, so as to form an enhanced pet food product.

In certain embodiments, the flavor compositions of the present disclosure can enhance the activity of a GPR92 receptor and/or palatability of a pet food product, such as, for example, a pet food product including wet pet food products, dry pet food products, moist pet food products, pet beverage products and/or snack pet food products.

In certain embodiments, one or more of the flavor compositions of the present disclosure can be added to a pet food product, in an amount effective to modify, enhance or otherwise alter a taste or taste profile of the pet food product. The modification can include, for example, an increase or enhancement in the palatability of the pet food product, as determined by animals, e.g., cats and/or dogs, or in the case of formulation testing, as determined by a panel of animal taste testers, e.g., cats and/or dogs, via procedures known in the art.

In certain embodiments of the present disclosure, a pet food product can be produced that contains a sufficient amount of at least one flavor composition described herein. In certain embodiments of the present disclosure, a pet food product can be produced that contains a sufficient amount of a flavor composition comprising at least one, two, three, four, five, six or more compounds.

In certain embodiments, an amount effective to modulate a GPR92 receptor of one or more of the flavor compositions of the present disclosure can be added to the pet food product, so that the pet food product has an increased palatability as compared to a pet food product prepared without the flavor composition, as determined by animals, e.g., cats and/or dogs, or in the case of formulation testing, as determined by a panel of animal taste testers, via procedures known in the art.

In certain embodiments of the present disclosure, the flavor composition is added to a pet food product in an amount effective to increase, enhance and/or modify the palatability of the pet food product.

The concentration of flavor composition admixed with a pet food product to modulate and/or improve the palatability of the pet food product can vary depending on variables, such as, for example, the specific type of pet food product, what GPR92 active compounds are already present in the pet food product and the concentrations thereof, and the enhancer effect of the particular flavor composition on such GPR92 active compounds.

A broad range of concentrations of the flavor compositions can be employed to provide such palatability modification. In certain embodiments of the present application, the flavor composition is admixed with a pet food product wherein the flavor composition is present in an amount of from about 0.01 ppm to about 1,000 ppm. For example, but not by way of limitation, the flavor composition can be present in the amount from about 0.01 ppm to about 750 ppm, from about 0.01 ppm to about 500 ppm, from about 0.01 ppm to about 250 ppm, from about 0.01 ppm to about 150 ppm, from about 0.01 ppm to about 100 ppm, from about 0.01 ppm to about 75 ppm, from about 0.01 ppm to about 50 ppm, from about 0.01 ppm to about 25 ppm, from about 0.01 ppm to about 15 ppm, from about 0.01 ppm to about 10 ppm, from about 0.01 ppm to about 5 ppm, from about 0.01 ppm to about 4 ppm, from about 0.01 ppm to about 3 ppm, from about 0.01 ppm to about 2 ppm, from about 0.01 ppm to about 1 ppm, from about 0.01 ppm to about 1,000 ppm, from about 0.1 ppm to 1,000 ppm, from about 1 ppm to 1,000 ppm, from about 2 ppm to about 1,000 ppm, from about 3 ppm to about 1,000 ppm, from about 4 ppm to about 1,000 ppm, from about 5 ppm to about 1,000 ppm, from about 10 ppm to about 1,000 ppm, from about 15 ppm to about 1,000 ppm, from about 25 ppm to about 1,000 ppm, from about 50 ppm to about 1,000 ppm, from about 75 ppm to about 1,000 ppm, from about 100 ppm to about 1,000 ppm, from about 150 ppm to about 1,000 ppm, from about 250 ppm to about 1,000 ppm, from about 250 ppm to about 1,000 ppm, from about 500 ppm to about 1,000 ppm or from about 750 ppm to about 1,000 ppm, and values in between.

In certain embodiments of the present application, the flavor composition is admixed with a pet food product wherein the flavor composition is present in an amount of from about 0.01 ppm to about 500 ppm, or from about 0.1 ppm to about 500 ppm, or from about 1 ppm to about 500 ppm, and values in between.

In certain embodiments of the present application, the flavor composition is admixed with a pet food product wherein the flavor composition is present in an amount of from about 0.01 ppm to about 100 ppm, or from about 0.1 ppm to about 100 ppm, or from about 1 ppm to about 100 ppm, and values in between.

In certain embodiments, the flavor composition is present in the pet food product at an amount greater than about 0.01 ppm, greater than about 0.1 ppm, greater than about 1 ppm, greater than about 2 ppm, greater than about 3 ppm, greater than about 4 ppm, greater than about 5 ppm, greater than about 10 ppm, greater than about 25 ppm, greater than about 50 ppm, greater than about 75 ppm, greater than about 100 ppm, greater than about 250 ppm, greater than about 500 ppm, greater than about 750 ppm or greater than about 1000 ppm, and values in between.

In certain embodiments, a compound of the present disclosure is present in a food product in an amount that is sufficient to modulate, activate and/or enhance a GPR92 receptor, e.g., a feline GPR92 receptor. For example, but not by way of limitation, a compound can be present in a food product in an amount from about 10 pM to about 1 M, from about 1 nM to about 1 M, from about 1 µM to about 1 M, from about 1 mM to about 1 M, from about 10 mM to about 1 M, from about 100 mM to about 1 M, from about 250 mM to about 1 M, from about 500 mM to about 1 M, from about 750 mM to about 1 M, from about 0.001 µM to about 1 M, from about 0.001 µM to about 750 mM, from about 0.001 µM to about 500 mM, from about 0.001 µM to about 250 mM, from about 0.001 µM to about 100 mM, from about 0.001 µM to about 50 mM, from about 0.001 µM to about 25 mM, from about 0.001 µM to about 10 mM, from about 0.001 µM to about 1 mM, from about 0.001 µM to about 100 µM or from about 0.001 µM to about 10 µM, and values in between.

In certain embodiments of the present application, the flavor composition is admixed with a pet food product wherein the flavor composition is present in an amount of from about 10 pM to about 1 M, or from about 1 pM to about 1 M, or from about 0.1 pM to about 1 M, and values in between.

In certain embodiments of the present application, the flavor composition is admixed with a pet food product wherein the flavor composition is present in an amount of from about 10 pM to about 0.5 M, or from about 1 pM to about 0.5 M, or from about 0.1 pM to about 0.5 M, and values in between.

In certain embodiments of the present application, the flavor composition is admixed with a pet food product wherein the flavor composition is present in an amount of from about 10 pM to about 0.1 M, or from about 1 pM to about 0.1 M, or from about 0.1 pM to about 0.1 M, and values in between.

In certain embodiments of the present application, the flavor composition is admixed with a food product wherein the flavor composition is present in an amount of from about 0.001 to about 10% weight/weight (w/w) of the food product. For example, but not by way of limitation, the flavor composition can be present in the amount from about 0.001% to about 10%, from about 0.01% to about 20% w/w, from about 0.001% to about 1%, from about 0.001% to about 0.1%, from about 0.001% to about 0.01%, from about 0.01% to about 10%, from about 0.01% to about 1%, or from about 0.1% to about 10%, or from about 0.1% to about 1% w/w, and values in between.

In certain embodiments of the present application, the flavor composition is admixed with a food product wherein the flavor composition is present in an amount of from about 0.001% to about 5%, or from about 0.01% to about 5%, or from about 0.1% to about 5% w/w, and values in between.

In certain embodiments of the present application, the flavor composition is admixed with a food product wherein the flavor composition is present in an amount of from about 0.001% to about 1%, or from about 0.01% to about 1%, or from about 0.1% to about 1% w/w, and values in between.

In certain embodiments of the present application, the flavor composition is admixed with a food product wherein the flavor composition is present in an amount of from about 0.01% to about 10% w/w.

In certain embodiments, the compounds of the present application are blended together in various ratios or are blended together with other compounds, including amino acids, nucleotides, and furanones (as described in International Application Nos. PCT/EP2013/072788 filed Oct. 31, 2013, PCT/EP2013/072789 filed Oct. 31, 2013, PCT/EP2013/072790 filed Oct. 31, 2013, and PCT/EP2013/072794 filed Oct. 31, 2013, each of which is incorporated by reference in its entirety), and/or umami receptor activating transmembrane compounds (as described in International Application No. PCT/US15/65036 filed Dec. 10, 2015, which is incorporated by reference in its entirety), and/or nucleotide derivatives (as described in International Application No. PCT/US15/65046 filed Dec. 10, 2015, which is incorporated by reference in its entirety), and/or fatty acid receptor (GPR120) active compounds (as described in International Application No. PCT/US15/65106 filed Dec. 10, 2015, which is incorporated by reference in its entirety), and/or calcium-sensing receptor (CaSR) active compounds (as described in International Application No. PCT/US17/027698 filed Apr. 14, 2017, which is incorporated by reference in its entirety).

5.1 Nucleotides and Nucleotide Derivatives

In certain embodiments of the present disclosure, the flavor composition comprises at least one compound disclosed herein and at least one nucleotide and/or nucleotide derivative as described herein and by International Application No. PCT/US15/65046 filed Dec. 10, 2015, which is incorporated herein by reference in its entirety.

In certain embodiments of the present disclosure, the flavor composition comprises at least one compound disclosed herein and at least two, three, four, five or more nucleotide and/or nucleotide derivatives as described herein. Non-limiting examples of nucleotides include guanosine monophosphate (GMP), inosine monophosphate (IMP), adenosine monophosphate (AMP), cytidine monophosphate (CMP), thymine monophosphate (TMP), xanthosine monophosphate (XMP), uridine monophosphate (UMP) and combinations thereof.

In certain embodiments, the flavor composition can include a nucleotide and/or nucleotide derivative present in a food product which can be present in an amount of from about 1 pM to about 1 M, from about 1 nM to about 1 M, from about 1 µM to about 1 M, from about 1 mM to about 1 M, from about 10 mM to about 1 M, from about 100 mM to about 1 M, from about 250 mM to about 1 M, from about 500 mM to about 1 M, from about 750 mM to about 1 M, from about 1 µM to about 1 M, from about 1 µM to about 750 mM, from about 1 µM to about 500 mM, from about 1 µM to about 250 mM, from about 1 µM to about 100 mM, from about 1 µM to about 50 mM, from about 1 µM to about 25 mM, from about 1 µM to about 10 mM, from about 1 µM to about 1 mM, from about 1 µM to about 100 µM or from about 1 µM to about 10 µM, and values in between.

In certain embodiments, the nucleotide and/or nucleotide derivative can be present in an amount of greater than about 1 mM or greater than about 2.5 mM of the pet food product. In certain non-limiting embodiments, the nucleotide and/or nucleotide derivative can be present in an amount of less than about 100 mM, less than about 50 mM, less than about 20 mM or less than about 10 mM of the pet food product. In certain non-limiting embodiments, the nucleotide and/or nucleotide derivative is present in an amount of about 5 mM of the pet food product.

5.2 Amino Acids

In certain embodiments of the present disclosure, the flavor composition comprises at least one compound disclosed herein and at least one amino acid as described herein, and by International Application Nos. PCT/EP2013/072788 filed Oct. 31, 2013, PCT/EP2013/072789 filed Oct. 31, 2013, PCT/EP2013/072790 filed Oct. 31, 2013, and PCT/EP2013/072794 filed Oct. 31, 2013, each of which is incorporated herein by reference in its entirety. In certain embodiments, the flavor composition comprises at least one compound disclosed herein and at least two, three, four, five or more amino acids as described herein.

In certain embodiments, the flavor composition comprises at least one compound disclosed herein, at least one, two, three, four, five or more first amino acids and/or at least one, two, three, four, five or more second amino acids.

In certain embodiments of the present disclosure, the flavor composition comprises at least one compound disclosed herein, at least one first amino acid and at least one second amino acid.

In certain embodiments of the present disclosure, the flavor composition comprises at least one compound disclosed herein, at least two first amino acids and at least one second amino acid.

In certain embodiments of the present disclosure, the flavor composition comprises at least one compound disclosed herein, at least one first amino acid and at least two second amino acids.

In certain embodiments of the present disclosure, the flavor composition comprises at least one compound disclosed herein, at least two first amino acids and at least two second amino acids.

Non-limiting examples of a first amino acid include tryptophan, phenylalanine, histidine, glycine, cysteine, alanine, tyrosine, serine, methionine, asparagine, leucine and combinations thereof. Non-limiting examples of a second amino acid include threonine, isoleucine, proline, glutamic acid, aspartic acid, hydroxyl proline, arginine, cystine, glutamine, lysine, valine, orthinine, taurine, monosodium glutamate (MSG) and combinations thereof.

In certain embodiments, the at least one first amino acid and/or the second amino acid, alone or in combination, can be present in an amount of from about 1 mM to about 1 M, or from about 250 mM to about 1 M, or from about 5 mM to about 500 mM, or from about 10 mM to about 100 mM, or from about 15 mM to about 50 mM, or from about 20 mM to about 40 mM of the pet food product. In certain embodiments, the amino acid(s) can be present at an amount less than about 1 M, less than about 200 mM, less than about 100 mM, less than about 50 mM, less than about 20 mM or less than about 10 mM of the pet food product. In certain embodiments, the first amino acid and/or the second amino acid, alone or in combination, can be present in an amount of about 25 mM of the pet food product.

5.3 Transmembrane Compounds

In certain embodiments of the present disclosure, the flavor composition comprises at least one compound disclosed herein as described by the present application, and at least one transmembrane compound as described by International Application No. PCT/US15/65036 filed Dec. 10, 2015, which is incorporated herein by reference in its entirety, and in Table 1 below.

In certain embodiments of the present disclosure, the flavor composition comprises at least one compound disclosed herein and at least two, three, four, five or more transmembrane compounds.

In certain embodiments of the present disclosure, the flavor composition includes at least one compound disclosed herein, at least one transmembrane compound and at least one amino acid as described herein.

In certain embodiments, a transmembrane compound of the present disclosure can be present in a food product in an amount from about 1 pM to about 1 M, from about 1 nM to about 1 M, from about 1 µM to about 1 M, from about 1 mM to about 1 M, from about 10 mM to about 1 M, from about 100 mM to about 1 M, from about 250 mM to about 1 M, from about 500 mM to about 1 M, from about 750 mM to about 1 M, from about 1 µM to about 1 M, from about 1 µM to about 750 mM, from about 1 µM to about 500 mM, from about 1 µM to about 250 mM, from about 1 µM to about 100 mM, from about 1 µM to about 50 mM, from about 1 µM to about 25 mM, from about 1 µM to about 10 mM, from about 1 µM to about 1 mM, from about 1 µM to about 100 µM or from about 1 µM to about 10 µM, and values in between.

In certain embodiments, the transmembrane compound can be a salt, stereoisomer or a comestible form of a transmembrane compound described herein.

TABLE 1

| Compound Name |
|---|
| 5-bromo-N-(pentan-3-yl)furan-2-carboxamide |
| 3,4-dimethyl-N-(pentan-3-yl)benzamide; N-(1-ethylpropyl)-3,4-dimethylbenzamide |
| 4-methoxy-3-methyl-N-(1-phenylethyl)benzamide |
| N-(2,3-dimethylcyclohexyl) benzo[d][1,3]dioxole-5-carboxamide |
| Ethyl 2-(benzo[d][1,3]dioxole-5-carboxamido)-3-methylbutanoate; ethyl N-(1,3-benzodioxol-5 ylcarbonyl) valinate |
| 4-methoxy-3-methyl-N-(pentan-2-yl)benzamide |
| N-(pentan-3-yl)-2,3-dihydrobenzo[b][1,4]dioxine-6-carboxamide |
| 3,4-dimethoxy-N-(pentan-3-yl)benzamide |

TABLE 1-continued

Compound Name (E)-methyl 3-methyl-2-(3-(thiophen-2-yl) acrylamido)butanoate
(E)-3-(3,4-dimethoxyphenyl)-N-(pentan-2-yl)acrylamide; (2E)-3-(3,4-dimethoxyphenyl)-N-(pentan-2-yl)prop-2-enamide
(E)-3-(4-methoxyphenyl)-N-(2-methylcyclohexyl) acrylamide
N1-phenethyl-N2-(pyridin-3-ylmethyl)oxalamide; N-(2-phenylethyl)-N'-(pyridin-3-ylmethyl)ethanediamide
N-(heptan-4-yl)benzo[d][1,3]dioxole-5-carboxamide
1-(2-bromophenyl)-3-((1R,2S)-2-hydroxy-2,3-dihydro-1H-inden-1-yl)urea
N-(benzo[d][1,3]dioxol-5-yl)-2-propylpentanamide
1-benzyl-3-(2-oxo-2-phenylethyl)imidazolidine-2,4,5-trione
N-(2-amino-2-oxo-1-phenylethyl)-3-chloro-4,5-dimethoxybenzamide
(E)-3-(4-methoxyphenyl)-N-(pentan-3-yl)acrylamide
2-((5-(4-(methylthio)phenyl)-2H-tetrazol-2-yl)methyl)pyridine
N-(heptan-4-yl)benzo[d][1,3]dioxole-5-carboxamide

5.4 Fatty Acid Receptor Active Compounds

In certain embodiments of the present disclosure, the flavor composition comprises at least one compound disclosed herein and at least one fatty acid receptor (GPR120) active compounds as described herein and by International Application No. PCT/US15/65106 filed Dec. 10, 2015, which is incorporated herein by reference in its entirety.

In certain embodiments of the present disclosure, the flavor composition comprises at least one compound disclosed herein and at least two, three, four, five or more fatty acid receptor active compounds as described herein.

Non-limiting examples of fatty acid receptor active compounds include (5Z,8Z,11Z,14Z)-icosa-5,8,11,14-tetraenoic acid (also known as Arachidonic Acid); (5Z,8Z)-icosa-5,8-dienoic acid; 4-[4-(heptyloxy)phenyl]-4-oxobutanoic acid; (11 Z)-octadec-11-enoic acid (also known as cis-Vaccenic acid); (9E)-hexadec-9-enoic acid (also known as Palmitelaidic acid); tridec-12-enoic acid (also known as 12-Tridecenoic acid); S-Farnesyl Thioacetic Acid; (lOZ)-pentadec-1O-enoic acid (also known as (1 0Z)-10-Pentadecenoic acid); 10(E),12(Z)-Conjugated Linoleic Acid (also known as (10Z, 12Z)-10,12-Octadecadienoic acid); (10Z, 13Z)-nonadeca-10, 13-dienoic acid; (9Z,11E)-octadeca-9,11-dienoic acid; cis-7-Hexadecenoic Acid; dodecanoic acid (also known as Laurie acid); (9Z)-tetradec-9-enoic acid (also known as Myristoleic acid); (11Z,14Z,17Z)-icosa-11,14,17-trienoic acid (also known as Dihomo-a-linolenic acid (20:3(n–3))); (6Z,9Z,12Z)-octadeca-6,9,12-trienoic acid (also known as γ-Linolenic acid); (HZ,14Z)-icosa-11,14-dienoic acid (also known as Dihomolinoleic acid (20:2(n–6))); (9Z)-hexadec-9-enoic acid (also known as palmitoleate, (Z)-Palmitoleic acid); 12-methoxydodecanoic acid; (8Z, 11 Z, 14Z)-icosa-8,11,14-trienoic acid; (9Z,12Z)-octadeca-9,12-dienoic acid (also known as Linoleic acid); (lOZ)-heptadec-lO-enoic acid; Pinolenic Acid; (9Z,12Z,15Z)-octadeca-9,12,15-trienoic acid (also known as a-Linolenic acid)1; tridecanoic acid (also known as Tridecylic acid); tetradecanoic acid (also known as Myristic acid); (9Z)-octadec-9-enoic acid (also known as Oleic acid); GW 9508 (also known as 4-[[(3-Phenoxyphenyl)methyl]amino]benzenepropanoic acid); (5Z,8Z,11Z,14Z,17Z)-icosa-5,8,1 1,14, 17-pentaenoic acid (also known as Eicosapentanoic acid); 3-(4-((4-fluoro-4'-methylbiphenyl-2-yl)methoxy)phenyl)propanoic acid (also known as TUG 891 and 4-[(4-Fluoro-4'-methyl[1,1'-biphenyl]-2-yl)methoxy]-benzenepropanoic acid); (10E)-pentadec-10-enoic acid; (9E)-tetradec-9-enoic acid (also known as Myristoleate); (6Z.9Z.12Z, 15Z)-octadeca-6,9, 12, 15-tetraenoic acid; (5Z,8Z,11Z)-icosa-5,8,11-trieiioic acid (also known as Mead acid); Dodecyl dihydrogen phosphate, and combinations thereof.

In certain embodiments, the flavor composition can include a fatty acid receptor active compounds present in a food product which can be present in an amount of from about 1 pM to about 1 M, from about 1 nM to about 1 M, from about 1 µM to about 1 M, from about 1 mM to about 1 M, from about 10 mM to about 1 M, from about 100 mM to about 1 M, from about 250 mM to about 1 M, from about 500 mM to about 1 M, from about 750 mM to about 1 M, from about 1 µM to about 1 M, from about 1 µM to about 750 mM, from about 1 µM to about 500 mM, from about 1 µM to about 250 mM, from about 1 µM to about 100 mM, from about 1 µM to about 50 mM, from about 1 µM to about 25 mM, from about 1 µM to about 10 mM, from about 1 µM to about 1 mM, from about 1 µM to about 100 µM or from about 1 µM to about 10 µM, and values in between.

In certain embodiments, the fatty acid receptor active compounds can be present in an amount of greater than about 1 mM or greater than about 2.5 mM of the pet food product. In certain non-limiting embodiments, the fatty acid receptor active compounds can be present in an amount of less than about 100 mM, less than about 50 mM, less than about 20 mM or less than about 10 mM of the pet food product. In certain non-limiting embodiments, the fatty acid receptor active compounds are present in an amount of about 5 mM of the pet food product.

5.5 Calcium-Sensing Receptor Active Compounds

In certain embodiments of the present disclosure, the flavor composition comprises at least one compound disclosed herein and at least one calcium-sensing receptor active compounds as described herein and by International Application No. PCT/US15/65046 filed Dec. 10, 2015, which is incorporated herein by reference in its entirety.

In certain embodiments of the present disclosure, the flavor composition comprises at least one compound disclosed herein and at least two, three, four, five or more calcium-sensing receptor active compounds as described herein. Non-limiting examples of calcium-sensing receptor active compounds include N-(1-(4-chlorophenyl)ethyl)-3-(4-methoxyphenyl)-6-methylheptan-1-amine, N-(1-(4-chlorophenyl)ethyl)-3-(furan-2-yl)-3-(p-tolyl)propan-1-amine, N-(1-(4-chlorophenyl) ethyl)-3-(4-isopropoxyphenyl)-3-phenylpropan-1-amine, N-(1-(4-chlorophenyl)ethyl)-3-(4-methoxyphenyl)-4-methylpentan-1-amine, N-(1-(4-chlorophenyl)ethyl)-3-(4-isopropoxyphenyl)-3-(2-methoxyphenyl)propan-1-amine, 3-(furan-2-yl)-3-phenyl-N-(1-phenylethyl)propan-1-amine, N-(1-(4-chlorophenyl) ethyl)-3-(furan-2-yl)-3-(2-methoxyphenyl)propan-1-amine, N-(1-(4-chlorophenyl)ethyl)-3-(4-isopropoxyphenyl)-6-methylheptan-1-amine, N-(1-(4-chlorophenyl) ethyl)-3-(4-isopropoxyphenyl)-4-methylpentan-1-amine, 3-(furan-2-yl)-N-(1-phenylethyl)-3-(p-tolyl)propan-1-amine, 3-(2,2-dimethyltetrahydro-2H-pyran-4-yl)-3-phenyl-N-(1-phenylethyl) propan-1-amine, 3-(furan-2-yl)-N-(1-(thiophen-2-yl)ethyl)-3-(p-tolyl)propan-1-amine, and N-(1-(4-chlorophenyl)ethyl)-3-(furan-2-yl)-4-phenylbutan-1-amine, and combinations thereof.

In certain embodiments, the flavor composition can include a calcium-sensing receptor active compounds present in a food product which can be present in an amount of from about 1 pM to about 1 M, from about 1 nM to about 1 M, from about 1 µM to about 1 M, from about 1 mM to about 1 M, from about 10 mM to about 1 M, from about 100 mM to about 1 M, from about 250 mM to about 1 M, from about 500 mM to about 1 M, from about 750 mM to about 1 M, from about 1 µM to about 1 M, from about 1 µM to about 750 mM, from about 1 µM to about 500 mM, from about 1 µM to about 250 mM, from about 1 µM to about 100 mM, from about 1 µM to about 50 mM, from about 1 µM to about 25 mM, from about 1 µM to about 10 mM, from about 1 µM to about 1 mM, from about 1 µM to about 100 µM or from about 1 µM to about 10 µM, and values in between.

In certain embodiments, the calcium-sensing receptor active compounds can be present in an amount of greater than about 1 mM or greater than about 2.5 mM of the pet food product. In certain non-limiting embodiments, the calcium-sensing receptor active compounds can be present in an amount of less than about 100 mM, less than about 50 mM, less than about 20 mM or less than about 10 mM of the pet food product. In certain non-limiting embodiments, the calcium-sensing receptor active compounds is present in an amount of about 5 mM of the pet food product.

In certain embodiments of the present disclosure, the flavor composition further comprises at least one amino acid as described herein.

In certain embodiments of the present disclosure, the flavor composition further comprises at least one transmembrane compound as described herein.

6. Delivery Systems

In certain embodiments, the flavor compositions of the present application can be incorporated into a delivery system for use in pet food products. Delivery systems can be a non-aqueous liquid, solid, or emulsion. Delivery systems are generally adapted to suit the needs of the flavor composition and/or the pet food product into which the flavor composition will be incorporated.

The flavoring compositions can be employed in non-aqueous liquid form, dried form, solid form and/or as an emulsion. When used in dried form, suitable drying means such as spray drying can be used. Alternatively, a flavoring composition can be encapsulated or absorbed onto water insoluble materials. The actual techniques for preparing such dried forms are well-known in the art, and can be applied to the presently disclosed subject matter.

The flavor compositions of the presently disclosed subject matter can be used in many distinct physical forms well known in the art to provide an initial burst of taste, flavor and/or texture; and/or a prolonged sensation of taste, flavor and/or texture. Without being limited thereto, such physical forms include free forms, such as spray dried, powdered, and beaded forms, and encapsulated forms, and mixtures thereof.

In certain embodiments, the compounds of a flavor composition can be generated during the processing of a pet food product, e.g., sterilization, retorting and/or extrusion, from precursor compounds present in the pet food product. In a non-limiting example, the composition can comprise a phospholipid that is from meat (e.g., chicken, beef, pork, fish, and/or tallow) and/or vegetable (e.g., oils such as vegetable and sunflower oil) sources that are processed to produce the pet food.

In certain embodiments, as noted above, encapsulation techniques can be used to modify the flavor systems. In certain embodiments, flavor compounds, flavor components or the entire flavor composition can be fully or partially encapsulated. Encapsulating materials and/or techniques can be selected to determine the type of modification of the flavor system.

In certain embodiments, the encapsulating materials and/or techniques are selected to improve the stability of the flavor compounds, flavor components or flavor compositions; while in other embodiments the encapsulating materials and/or techniques are selected to modify the release profile of the flavor compositions.

Suitable encapsulating materials can include, but are not limited to, hydrocolloids such as alginates, pectins, agars, guar gums, celluloses, and the like, proteins, polyvinyl acetate, polyethylene, crosslinked polyvinyl pyrrolidone, polymethylmethacrylate, polylactidacid, polyhydroxyalkanoates, ethylcellulose, polyvinyl acetatephthalate, polyethylene glycol esters, methacrylicacid-co-methylmethacrylate, ethylene-vinylacetate (EVA) copolymer, and the like, and combinations thereof. Suitable encapsulating techniques can include, but are not limited to, spray coating, spray drying, spray chilling, absorption, adsorption, inclusion complexing (e.g., creating a flavor/cyclodextrin complex), coacervation, fluidized bed coating or other process can be used to encapsulate an ingredient with an encapsulating material.

Encapsulated delivery systems for flavoring agents or sweetening agents can contain a hydrophobic matrix of fat or wax surrounding a sweetening agent or flavoring agent core. The fats can be selected from any number of conventional materials such as fatty acids, glycerides or poly glycerol esters, sorbitol esters, and mixtures thereof. Examples of fatty acids include but are not limited to hydrogenated and partially hydrogenated vegetable oils such as palm oil, palm kernel oil, peanut oil, rapeseed oil, rice bran oil, soybean oil, cottonseed oil, sunflower oil, safflower oil and combinations thereof. Examples of glycerides include, but are not limited to, monoglycerides, diglycerides and triglycerides.

Waxes can be chosen from the group consisting of natural and synthetic waxes and mixtures thereof. Non-limiting examples include paraffin wax, petrolatum, carbowax, microcrystalline wax, beeswax, carnauba wax, candellila wax, lanolin, bayberry wax, sugarcane wax, spermaceti wax, rice bran wax, and mixtures thereof.

The fats and waxes can be used individually or in combination in amounts varying from about 10 to about 70%, and alternatively in amounts from about 30 to about 60%, by weight of the encapsulated system. When used in combination, the fat and wax can be present in a ratio from about 70:10 to 85:15, respectively.

Typical encapsulated flavor compositions, flavoring agent or sweetening agent delivery systems are disclosed in U.S. Pat. Nos. 4,597,970 and 4,722,845, the disclosures of which are incorporated herein by reference in their entireties.

Liquid delivery systems can include, but are not limited to, systems with a dispersion of the flavor compositions of the present application, such as in carbohydrate syrups and/or emulsions. Liquid delivery systems can also include extracts where the compound and/or the flavor compositions are solubilized in a solvent. Solid delivery systems can be created by spray drying, spray coating, spray chilling, fluidized bed drying, absorption, adsorption, coacervation, complexation, or any other standard technique. In some embodiments, the delivery system can be selected to be compatible with or to function in the edible composition. In certain embodiments, the delivery system will include an oleaginous material such as a fat or oil. In certain embodiments, the delivery system will include a confectionery fat such as cocoa butter, a cocoa butter replacer, a cocoa butter substitute, or a cocoa butter equivalent.

When used in dried form, suitable drying means such as spray drying can be used. Alternatively, a flavoring composition can be adsorbed or absorbed onto substrates, such as water insoluble materials, and can be encapsulated. The actual techniques for preparing such dried forms are well known in the art.

7. Pet Food Products

The flavor compositions of the present disclosed subject matter can be used in a wide variety of pet food products. Non-limiting examples of suitable pet food products include wet food products, dry food products, moist food products, pet food supplements (e.g., vitamins), pet beverage products, snack and treats as described herein.

The combination of the flavoring composition(s) of the presently disclosed subject matter together with a pet food product and optional ingredients, when desired, provides a flavoring agent that possesses unexpected taste and imparts, for example, a phospholipid sensory experience, for example, through an increase in activity of a GPR92 receptor. The flavor compositions disclosed herein can be added prior to, during or after formulation processing or packaging of the pet food product, and the components of the flavor composition can be added sequentially or simultaneously. In certain embodiments, the compounds of a flavor composition can be generated during the processing of a pet food product, e.g., sterilization, retorting and/or extrusion, from precursor compounds present in the pet food product. In a non-limiting example, the composition can be a phospholipid that is produced during the processing of a pet food product. In certain embodiments, the phospholipid is produced from meat (e.g., chicken, beef, pork, fish, and/or tallow) and/or vegetable (e.g., oils such as vegetable and sunflower oil) sources that are processed to produce the pet food.

In certain embodiments, the pet food product is a nutritionally complete dry food product. A dry or low moisture-containing nutritionally-complete pet food product can comprise less than about 15% moisture, and include from about 10 to about 60% fat, from about 10% to about 70% protein and from about 30% to about 80% carbohydrates, e.g., dietary fiber and ash.

In certain embodiments, the pet food product is a nutritionally complete wet food product. A wet or high moisture-containing nutritionally-complete pet food product can comprise greater than about 50% moisture. In certain embodiments, the wet pet food product includes from about 40% fat, from about 50% protein and from about 10% carbohydrates, e.g., dietary fiber and ash.

In certain embodiments, the pet food product is a nutritionally complete moist food product. A moist, e.g., semi-moist or semi-dry or soft dry or soft moist or intermediate or medium moisture containing nutritionally-complete pet food product comprises from about 15 to about 50% moisture.

In certain embodiments, the pet food product is a pet food snack product. Non-limiting examples of pet food snack products include snack bars, pet chews, crunchy treats, cereal bars, snacks, biscuits and sweet products.

In certain embodiments, the protein source can be derived from a plant source, such as lupin protein, wheat protein, soy protein and combinations thereof. Alternatively or additionally, the protein source can be derived from a variety of animal sources. Non-limiting examples of animal protein include beef, pork, poultry, lamb, or fish including, for example, muscle meat, meat byproduct, meat meal or fish meal.

8. Methods of Measuring Taste Attributes

In certain embodiments of the present disclosure, the taste, flavor and/or palatability attributes of a pet food product can be modified by admixing a flavor composition with the food product, or generated under food preparation conditions, as described herein. In certain embodiments, the attribute(s) can be enhanced or reduced by increasing or decreasing the concentration of the flavor composition admixed or generated with the food product. In certain embodiments, the taste attributes of the modified food product can be evaluated as described herein, and the concentration of flavor composition admixed or generated with the food product can be increased or decreased based on the results of the evaluation.

In certain embodiments of the present disclosure, the taste and/or palatability attributes can be measured using an in vitro assay, wherein a compound's ability to activate a feline GPR92 receptor expressed by cells in vitro at different concentrations is measured. In certain embodiments, an increase in the activation of the receptor correlates with an increase in the taste and/or palatability attributes of the compound. In certain embodiments, the composition is measured alone or in combination with other compounds. In certain embodiments the in vitro assay comprises the in vitro assays described in the Examples section of the present application.

In certain embodiments of the present disclosure, the taste and/or palatability attributes can be measured using a panelist of taste testers. For example, but not by way of limitation, the panel can contain feline panelists. In certain embodiments, the panel can include canine panelists. In certain embodiments, the palatability of a pet food product can be determined by the consumption of a pet food product containing a flavor composition alone (e.g., the one bowl test, monadic ranking). In certain embodiments, the palatability of a pet food product can be determined by the preferential consumption of a pet food product containing a flavor composition, disclosed herein, versus a pet food product that does not contain the flavor composition or another flavor composition (e.g., the two bowl test for testing preference, difference and/or choice).

In certain embodiments, the palatability of a flavor composition can be determined by the preferential consumption of an emulsion (or any other composition into which a compound of the present application can be admixed with, for example, a gel or gelatin) containing a flavor composition, disclosed herein, versus an emulsion that does not contain the flavor composition or contains a different flavor composition. For example, a gel panel can be used to compare the palatability of a range of concentrations of compounds in a monadic exposure. In certain embodiments, the emulsion can contain a palatability enhancer, for example, L-histidine, as an ingestive/positive tastant to increase baseline emulsion intake, therefore enabling the identification of a potential negative impact of the test compound.

The intake ratio for each pet food product or emulsion can be determined by measuring the amount of one ration consumed divided by the total consumption. The consumption ratio (CR) can then be calculated to compare the consumption of one ration in terms of the other ration to determine the preferential consumption of one food product or emulsion over the other. Alternatively or additionally, the difference in intake (g) can be used to assess the average difference in intake between the two emulsions in a two bottle test or between two pet food products in a two bowl test at a selected significance level, for example, at the 5% significance level to determine an average difference in intake with a 95% confidence interval. However, any significance level can be used, for example, a 1, 2, 3, 4, 5, 10, 15, 20, 25, or 50% significance level. In certain embodiments, percentage preference scores, e.g., the percentage preference for one emulsion or food product by an animal is the percentage of the total emulsion or food product ingested during the test that that emulsion or food product accounts for, can also be calculated.

9. Methods of Generation

In certain embodiments, the compounds of the present disclosure can be generated using standard chemosynthesis processes. In certain embodiments, the chemosynthesis process provides a compound having a purity of at least 99.999%, or at least 99%, or at least 95%, or at least 90%, or at least 85 or at least 80%. In certain embodiments, the compounds can be prepared using standard hydrolysis processes such as those employing acids, enzymes or a combination of acids and enzymes.

In certain embodiments, the compounds of the present disclosure can be generated under food preparation conditions, e.g., during the production of a pet food product. For example, but not by way of limitation, the compounds of the present disclosure can be generated during a thermal food process, e.g., sterilization, retorting and/or extrusion, from precursor compounds present in the pet food. In certain embodiments, a liquid and/or a powder palatant can also be added to enhance the taste of a pet food, e.g., to a dry pet food product, and to increase the palatability of the pet food. The palatant can be a digest of meat (e.g., liver) and/or a digest of a vegetable, and can optionally include other palatants known in the art. In certain embodiments, the compound can be admixed with or generated in the liquid and/or powder palatant prior to its addition to the pet food product. Alternatively or additionally, the compound can be admixed with or generated in the liquid and/or powder palatant after its addition to the pet food product.

10. Non-Limiting Examples of Methods of the Present Disclosure

In certain non-limiting embodiments, the present disclosure provides for a method of increasing the palatability of a pet food product comprising admixing the pet food product with a flavor composition comprising a compound as described herein, wherein the compound is present at a concentration of from about 10 pM to about 1 M in the admixture.

In certain non-limiting embodiments, the present disclosure provides for a method of increasing the palatability of a pet food product, for example, by increasing the activity of a GPR92 receptor, comprising admixing the pet food product with a flavor composition comprising a compound as described herein, wherein the compound is present at a concentration of from 0.01 ppm to 1,000 ppm in the admixture.

In certain non-limiting embodiments, the present disclosure provides for a method of increasing the palatability of a pet food product, for example, by increasing the activity of a GPR92 receptor, comprising admixing the pet food product with a flavor composition comprising a compound as described herein, wherein the flavor composition is present at a concentration of from about 0.001% to about 10% w/w, or from about 0.01% to about 20% w/w, or from about 0.01% to about 5% w/w, or from about 0.01% to about 1% w/w in the admixture.

EXAMPLES

The presently disclosed subject matter will be better understood by reference to the following Examples, which are provided as exemplary of the invention, and not by way of limitation.

Example 1—in Silico Modeling for Identifying Compounds that Interact with GPR92

The present example describes in silico modeling of feline GPR92 to identify putative modulators of GPR92.

Computational approaches were used to analyze the three-dimensional structure of the GPR92 receptor to identify polypeptide regions that can be exploited to selectively modulate the GPR92 receptor. A structural homology model of the 7 Transmembrane domain of the GPR92 receptor was generated based on the structures of Class A GPCRs from the Protein Data Bank (PDB). (See Berman et al., Nucleic Acids Research, 28: 235-242 (2000), which is incorporated by reference herein in its entirety). The homology models were built using the I-TASSER suite of programs (see Yang et al., Nature Methods, 12: 7-8 (2015), which is incorporated by reference herein in its entirety) and the Modeller software package (see Eswar et al., Curr Protoc Bioinformatics, John Wiley & Sons, Inc., Supplement 15, 5.6.1-5.6.30 (2006), which is incorporated by reference herein in its entirety) from the DiscoveryStudio (DS) suite of programs from Dassault Systemes (BIOVIA Corp., San Diego, Calif., USA).

In silico modeling was used to identify amino acids in the 7 Transmembrane (7TM) domain of a fGPR92 receptor that interact with compounds docked in the receptor active site. Class A GPCR receptors include a 7 Transmembrane (7TM) domain.

Residues lining the active site of feline GPR92 include: Arg83 on Helix 2; Gly103, Phe106, Gln107, Met110, and Cys114 on Helix 3; Thr161 and His165 on Helix 4; Ala200, Gly204, and Pro208 on Helix 5; Phe248, Phe252, Tyr255, Asn256, and Leu259 on Helix 6; Arg281, Met285, and Val288 on Helix 7; as well as Glu182 on the second extracellular ($EC_2$) loop. In particular, as described below, Arg83, Arg281, and Tyr255 played critical roles in the homology models by forming salt-bridges and hydrogen-bonding interactions to coordinate the negatively charged head-groups and polar parts of compounds bound to the active site.

Three GPR92 binding compounds were docked into the active site of the 7TM domain of feline GPR92.

Figure 28C:
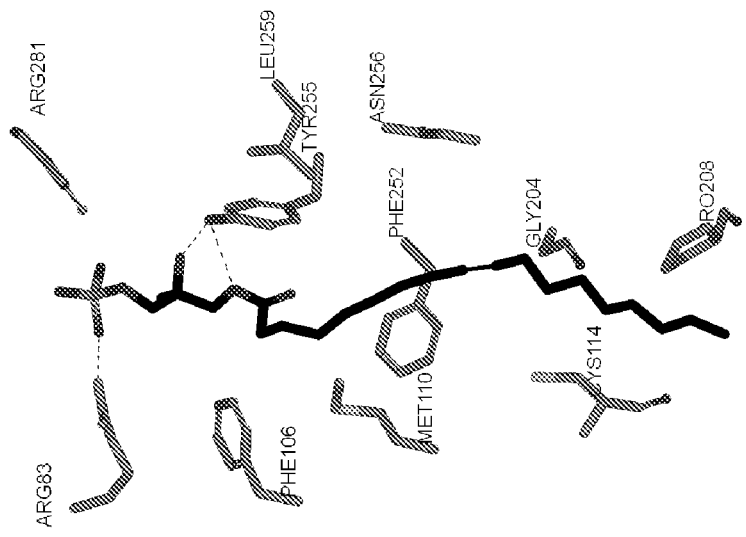
FIGS. 28A-28C show in silico modeling of the binding of compound LPA C18:1 (1-(9Z-octadecenyl)-2-hydroxy-sn-glycero-3-phosphate) to the 7TM domain of a feline GPR92 receptor. (A) shows the structure of the binding compound, (B) shows a model of the compound binding to GPR92, and (C) shows the putative GPR92 amino acid residues that interact with the binding compound. Positively charged residues are present at the extracellular side of the GPR92 GPCR domain that coordinate phosphates of active phospholipids. The ligand forms a salt bridge with Arg83 and hydrogen bonds with Tyr255. The tail of the phospholipid extends through a long hydrophobic channel forming multiple hydrophobic interactions.
Figure 28B:
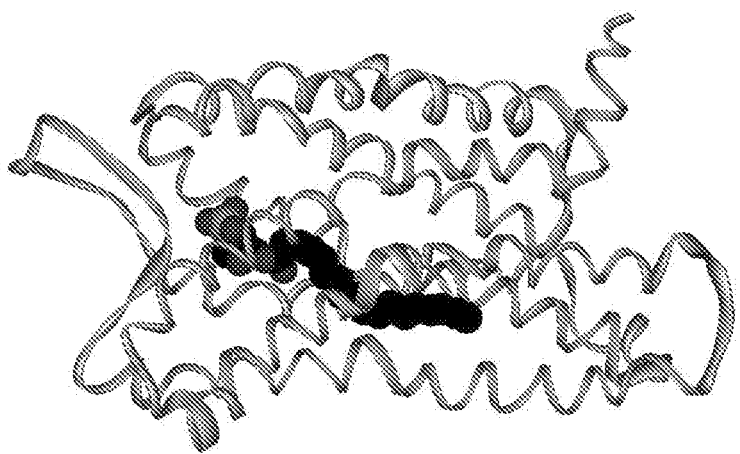
Figure 28A:
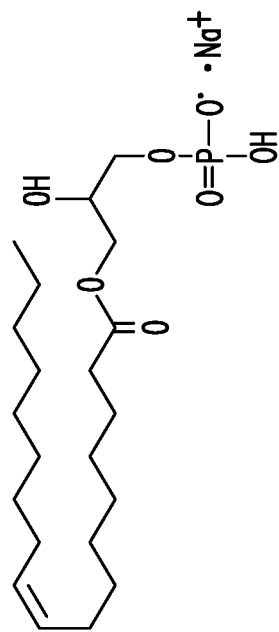

As shown in FIG. 28C, LPA C18:1 (1-(9Z-octadecenyl)-2-hydroxy-sn-glycero-3-phosphate) formed a salt bridge with Arg83 and hydrogen bonds with Tyr255. The tail of LPA C18:1 extended through a long hydrophobic channel forming multiple hydrophobic interactions.

As shown in FIG. 29C, AGP 16:0 (1-hexadecyl-2-hydroxy-sn-glycero-3-phosphate) positioned the phosphate to potentially form electrostatic interactions with Arg281 and Arg83 and hydrogen bonds with Tyr255. The tail of AGP 16:0 extended through a long hydrophobic channel forming multiple hydrophobic interactions.

As shown in FIG. 30C, octadecenyl phosphate (9Z-octadecenyl phosphate) forming a salt bridge to Arg281 and ARG83, hydrogen bonds with ARG281. The tail of octadecenyl phosphate extended through a long hydrophobic channel forming multiple hydrophobic interactions.

Example 2—Compounds/Compositions that Activate the fGPR92 Receptor

The present example describes the activation of the cat GPR92 receptor (fGPR92) by various compounds and compositions in vitro.

Samples that can function as GPR92 agonists were identified by in vitro functional characterization. The effectiveness of a sample in activating the fGPR92 receptor was evaluated.

Methods: CHO-K1 cells stably expressing fGPR92 were used to screen 118 test samples to identify samples that can activate the fGPR92 receptor. Activation of the fGPR92 receptor was detected by changes in intracellular calcium levels using a calcium sensitive fluorescent dye. Cells without fGPR92 receptor expression (mock cells) were used as a control. A FLIPR® Tetra system was used for data capture.

Each sample was first tested for its ability to activate fGPR92 at three different dose levels in both agonist mode and positive allosteric modulator mode. Active samples were further tested at eight different dose levels in both agonist mode and positive allosteric modulator mode. Peptone from Sigma-Aldrich (product number: P5905; CAS number 73049-73-7) was used in this Example. Dose response curves were then generated for each sample. Menthol and cinnamaldehyde were used as negative controls. In the agonist mode (AGO), 14:0 LPA at 10 μM ($EC_{100}$) was used as a positive control and the assay buffer was used as a negative control. In the positive allosteric modulator mode (PAM) 14:0 LPA at 10 μM (ECHO was used as a positive control and 14:0 LPA at 10 nM ($EC_{20}$) was used as a negative control.

Results: 21 active samples were identified as selective agonists from the initial testing. None of the samples showed a positive allosteric modulator activity. These samples were selected for further testing.

FIGS. 1-23 show the dose response curves of the selected samples and negative controls (menthol and cinnamaldehyde) using eight or ten different dose levels in both agonist mode and positive allosteric modulator mode. In the agonist mode, each selected sample activated fGPR92 at various concentrations and exhibited an $EC_{50}$ value below 0.02 mM. Menthol and cinnamaldehyde did not activate fGPR92 receptor as expected. None of the samples showed a positive allosteric modulator activity. These results are summarized in FIG. 24.

Example 3—Animal Feeding Tests

Cats were allowed access to solution pairs specified in the following tests: Test 1: 0.1% peptone and plain water; Test 2: 1% peptone and plain water; and Test 3: 0.1% peptone and 1% peptone. Peptone from Sigma-Aldrich (product number: P5905; CAS number 73049-73-7) was used in this Example.

The methodology used a 2-bottle choice test with 24 cats (the final number of cats for each test can vary due to data being discarded for spillage, etc.). Cats were housed individually during testing periods and had free access to water between testing periods. Each test involved a choice test between peptone at a given concentration dissolved in deionized water versus peptone at another given concentration dissolved in deionized water or deionized water only. Control was made for positional bias (e.g., A/B for a first exposure and B/A for a second exposure) and evaporation loss. The testing time was 1 hour per day, allowing a two-day crossover. Following two consecutive days of each testing, cats had two consecutive days of rest. Cats were offered a dry diet as a single meal at the start of each test period for 30 min., calculated to meet the individual requirements for each cat.

Figure 25:
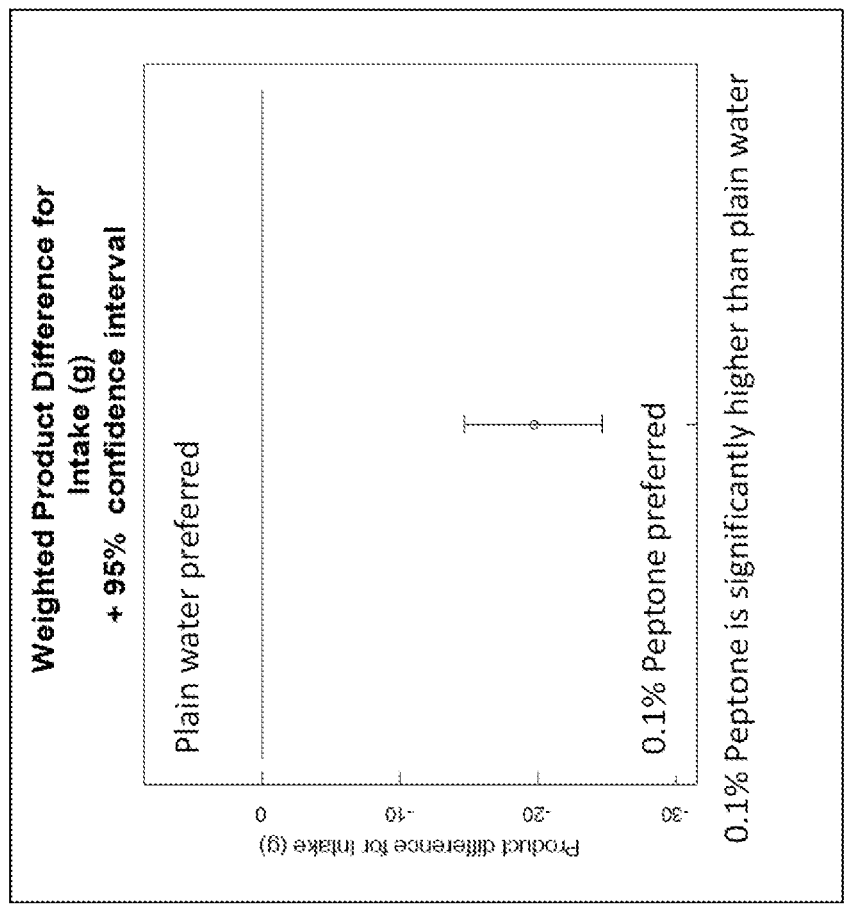
FIG. 25 shows the results of a difference test between 0.1% GPR92 peptone water and plain water. The intake of the 0.1% GPR92 peptone water was on average 19.65 g more that the intake of the plain water.
Figure 26:
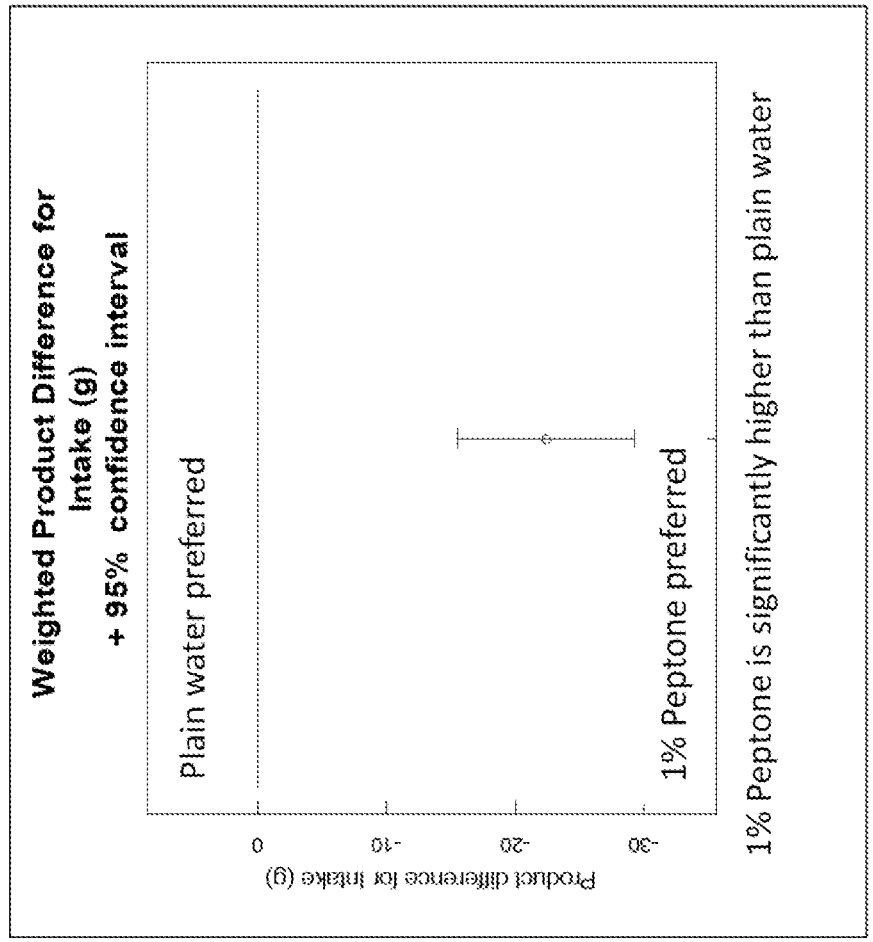
FIG. 26 shows the results of a difference test between 1% GPR92 peptone water and plain water. The intake of the 1% GPR92 peptone was on average 22.38 g more that the intake of the plain water.
Figure 27:
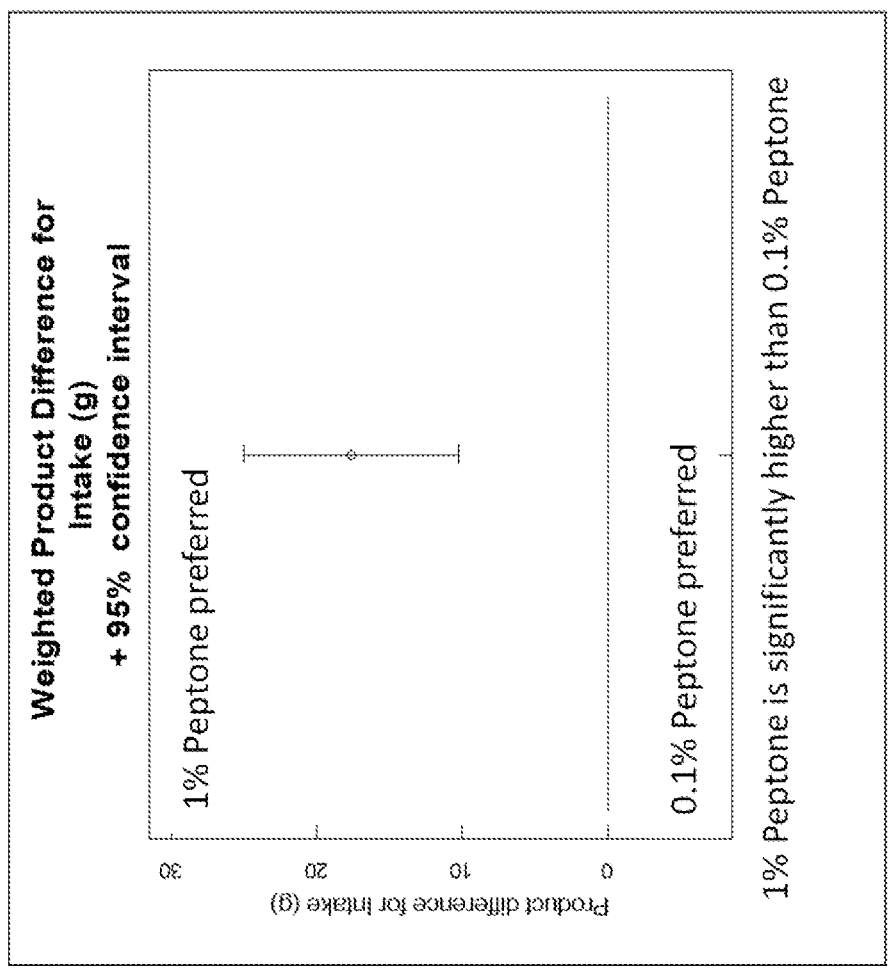
FIG. 27 shows the results of a difference test between 1% GPR92 peptone water and 0.1% peptone water. The intake of the 1% GPR92 peptone water was on average 17.60 g more that the intake of the 0.1% GPR92 peptone water.

The results are shown in Tables 2-4 below and FIGS. 25-27. The results demonstrated that cats preferred peptone water over plain water, and preferred 1% peptone water over 0.1% peptone water.

TABLE 2

Test 1: 0.1% peptone and plain water.
ANOVA Table for Fixed Effects

| Factor | Degrees of Freedom | | F-value | P-value |
|---|---|---|---|---|
| | Numerator | Denominator | | |
| Product Difference | 1 | 24 | 65.99 | 0.0000 |

Table of Mean Product Difference,
Standard Error & 95% Confidence Intervals

| Product Difference | Mean | Standard Error | 95% Confidence Interval | |
|---|---|---|---|---|
| | | | Lower | Upper |
| Water-0.1% Peptone | −19.65 | 2.42 | −24.65 | −14.66 |

Intake of 0.1% Peptone was on average 19.65 g more than the intake of plain water.

TABLE 3

Test 2: 1% peptone and plain water.
ANOVA Table for Fixed Effects

| Factor | Degrees of Freedom | | F-value | P-value |
|---|---|---|---|---|
| | Numerator | Denominator | | |
| Product Difference | 1 | 24 | 44.86 | 0.0000 |

Table of Mean Product
Difference, Standard Error & 95% Confidence Intervals

| Product Difference | Mean | Standard Error | 95% Confidence Interval | |
|---|---|---|---|---|
| | | | Lower | Upper |
| Water-1% Peptone | −22.38 | 3.34 | −29.27 | −15.48 |

Intake of 1% Peptone was on average 22.38 g more than the intake of plain water.

TABLE 4

Test 3: 0.1% peptone and 1% peptone.
ANOVA Table for Fixed Effects

| | Degrees of Freedom | | | |
|---|---|---|---|---|
| Factor | Numerator | Denominator | F-value | P-value |
| Product Difference | 1 | 24 | 24.45 | 0.0000 |

Table of Mean Product
Difference, Standard Error & 95% Confidence Intervals

| | | Standard | 95% Confidence Interval | |
|---|---|---|---|---|
| Product Difference | Mean | Error | Lower | Upper |
| 1% Peptone-0.1% Peptone | 17.60 | 3.56 | 10.26 | 24.95 |

Intake of 1% Peptone was on average 17.60 g more than the intake of 0.1% Peptone.

Although the presently disclosed subject matter and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the presently disclosed subject matter, processes, machines, manufacture, compositions of matter, means, methods, or steps, presently existing or later to be developed that perform substantially the same function or achieve substantially the same result as the corresponding embodiments described herein may be utilized according to the presently disclosed subject matter. Accordingly, the appended claims are intended to include within their scope such processes, machines, manufacture, compositions of matter, means, methods, or steps.

Patents, patent applications, publications, product descriptions and protocols are cited throughout this application the disclosures of which are incorporated herein by reference in their entireties for all purposes.

What is claimed is:

1. A food product comprising the flavor composition comprising
   (a) a compound selected from the group consisting of 1-(9Z-octadecenyl)-2-hydroxy-sn-glycero-3-phosphate (LPA C18:1), D-(+)-sn-1-O-linoleoyl-glyceryl-3-phosphate (LPA 18:2), D-(+)-sn-1-O-linolenoyl-glyceryl-3-phosphate (LPA 18:3), 1-hexadecyl-2-hydroxy-sn-glycero-3-phosphate (AGP 16:0), 1-octadecyl lysophosphatidic Acid (1-Octadecyl LPA), 1-heptadecanoyl-2-hydroxy-sn-glycero-3-phosphate (LPA 17:0), and D-(+)-sn-1-O-arachidonoyl-glyceryl-3-phosphate (LPA 20:4); and
   (b) peptone or fish hydrolysate.

2. The food product of claim 1, wherein the flavor composition is present at a concentration of from about 10 pM to about 1 M in the food product.

3. The food product of claim 1, wherein the flavor composition is present at a concentration of from about 0.01 ppm to 1,000 ppm in the food product.

4. The food product of claim 1, wherein the flavor composition is present at a concentration of from about 0.01% to about 10% w/w in the food product.

5. The food product of claim 1, wherein the flavor composition is present at a concentration of from about 1 nM to about 0.1 M in the food product.

6. The food product of claim 1, wherein the flavor composition is present at a concentration of from about 0.1% w/w to about 10% w/w in the food product.

7. The food product of claim 1, wherein the food product comprises a pet food product.

8. The food product of claim 1, wherein the food product is a feline pet food product or a canine pet food product.

9. The food product of claim 8, wherein the pet food product is a wet pet food product.

10. The food product of claim 8, wherein the pet food product is a dry pet food product.

* * * * *